(12) United States Patent
Shvets et al.

(10) Patent No.: US 7,459,222 B2
(45) Date of Patent: Dec. 2, 2008

(54) MAGNETORESISTIVE MEDIUM INCLUDING NANOWIRES

(75) Inventors: Igor Shvets, Dublin (IE); Sunil Kumar Arora, Dublin (IE); Sumesh Sofin Ramakrishna Pilli, Dublin (IE)

(73) Assignee: Provost Fellows and Scholars of the College of the Holy and Undivided Trinity of Queen Elizabeth Near Dublin, Dublin (IE)

( * ) Notice: Subject to any disclaimer, the term of this patent is extended or adjusted under 35 U.S.C. 154(b) by 333 days.

(21) Appl. No.: 11/078,405

(22) Filed: Mar. 14, 2005

(65) Prior Publication Data

US 2005/0264958 A1 Dec. 1, 2005

Related U.S. Application Data

(63) Continuation of application No. PCT/IE2004/000034, filed on Mar. 12, 2004.

(51) Int. Cl.
*G11B 5/64* (2006.01)

(52) U.S. Cl. ............... 428/826; 428/800; 428/593; 428/409; 360/131

(58) Field of Classification Search .......... None
See application file for complete search history.

(56) References Cited

U.S. PATENT DOCUMENTS

| | | | |
|---|---|---|---|
| 4,755,897 A | 7/1988 | Howard | |
| 4,823,177 A | 4/1989 | Prinz et al. | |
| 4,949,039 A | 8/1990 | Grunberg | |
| 5,070,387 A * | 12/1991 | Van Gorkum | 257/627 |
| 5,159,513 A | 10/1992 | Dieny et al. | |
| 5,206,590 A | 4/1993 | Dieny et al. | |
| 5,422,571 A | 6/1995 | Gurney et al. | |
| 5,578,385 A | 11/1996 | Saito et al. | |
| 5,585,196 A | 12/1996 | Inomata et al. | |
| 5,589,278 A | 12/1996 | Kamijo | |
| 5,629,922 A | 5/1997 | Moodera et al. | |
| 5,656,381 A | 8/1997 | Maeda et al. | |
| 5,680,091 A | 10/1997 | Maeda et al. | |

(Continued)

OTHER PUBLICATIONS

IBM Corp., IBM Technical Disclosure Bulletin, vol. 40, No. 04, Apr. 1997, pp. 61-65.

(Continued)

*Primary Examiner*—Kevin M Bernatz
(74) *Attorney, Agent, or Firm*—Birch, Stewart, Kolasch & Birch, LLP

(57) ABSTRACT

A magnetoresistive medium (1) includes a substrate (2) which has been treated to provide a miscut vicinal surface (3) in the form of terraces (4) and steps (5) of atomic and nanometer scale. There are discrete separated spacer nanowires (7) provided by an intermediate partial spacer film on each terrace (4) against each step (5). A further main film (11) provides main nanowires (10(*a*), 10(*b*)). A thin protective layer (15) covers the main nanowires (10(*a*), 10(*b*)) which form two separate subsets of main nanowires with different exchange interaction with the substrate and thus a different response to an external magnetic field. In use, when an external magnetic field (H) is applied the response of the main nanowires (10(*a*), 10(*b*)) changes as the exchange coupling with the substrate (2) varies and the magnetisation on the main nanowires (10(*a*), 10(*b*)) change. This is shown by the arrows while prior to the application of the external magnetic field, they might, for example, be aligned. Many different constructions of magnetoresistive media are described.

22 Claims, 48 Drawing Sheets

U.S. PATENT DOCUMENTS

| | | |
|---|---|---|
| 5,734,605 A | 3/1998 | Zhu et al. |
| 5,736,921 A | 4/1998 | Maeda et al. |
| 5,738,929 A | 4/1998 | Maeda et al. |
| 5,764,567 A | 6/1998 | Parkin |
| 5,818,323 A | 10/1998 | Maeda et al. |
| 5,835,314 A | 11/1998 | Moodera et al. |
| 5,858,455 A | 1/1999 | Chambliss et al. |
| 5,867,025 A | 2/1999 | Allenspach et al. |
| 5,923,504 A | 7/1999 | Araki et al. |
| 5,958,611 A | 9/1999 | Ohta et al. |
| 5,978,257 A | 11/1999 | Zhu et al. |
| 6,015,632 A | 1/2000 | Chambliss et al. |
| 6,168,845 B1 | 1/2001 | Fontana, Jr. et al. |
| 6,172,858 B1 * | 1/2001 | Yoda et al. .................. 360/313 |
| 6,330,135 B1 | 12/2001 | Manako et al. |
| 6,335,081 B1 | 1/2002 | Araki et al. |
| 6,365,286 B1 | 4/2002 | Inomata et al. |
| 6,387,530 B1 | 5/2002 | Liu et al. |
| 6,480,411 B1 | 11/2002 | Koganei |
| 6,594,120 B2 * | 7/2003 | Odagawa et al. ............ 360/313 |
| 6,843,902 B1 * | 1/2005 | Penner et al. .................. 205/76 |
| 2006/0202292 A1 * | 9/2006 | Shvets et al. ................ 257/422 |

OTHER PUBLICATIONS

American Institute of Physics, Applied Physics Letters, vol. 81, No. 10, Sep. 2002, pp. 1-3.

Conference of the Materials Research Society, Dec. 1-5, 2003, Boston, Massachusetts, USA, p. 777, Session FF5.3, by D. Zhou et al.

* cited by examiner

MAGNETORESISTIVE MEDIUM INCLUDING NANOWIRES

This application is a Continuation of copending PCT International Application No. PCT/IE04/00034 filed on Mar. 12, 2004, which designated the United States, and on which priority is claimed under 35 U.S.C. § 120.

INTRODUCTION

The present invention relates to a magnetoresistive medium comprising a crystalline substrate and a thin film thereon. The invention is further directed towards a method of preparing such a magnetoresistive medium.

Magnetoresistive media are media whose resistance to an electric current is sensitive to an external magnetic field. Such media are widely used in information and communication technologies e.g. in disk drive read heads, magnetic tape read heads, random access memory devices and in numerous other applications. Magnetoresistive media are also commonly used as sensors for a magnetic field in applications that are not directly related to the domain of information and communication technologies, e.g. in the automotive and aviation industries, security devices, goods labeling, position encoders, medical devices and numerous other applications. The best known magnetoresistive material is permalloy.

U.S. Pat. No. 4,949,039 (Gruenberg) describes a magnetic field sensor. The sensor comprises of a stack of ferromagnetic layers separated in such a way that the magnetisation of the layers can be rotated with respect to each other. Typically magnetisation of the layers is switched from mutually parallel to mutually anti-parallel. As the direction of the layers' magnetisation is reversed, the resistance of the stack changes. At present this sensor known as the spin valve, is commonly used in read heads of computer disk drives. U.S. Pat. No. 5,159,513 (Dieny et al) and U.S. Pat. No. 5,206,590 (Dieny et al) describe improvements to the magnetoresistive sensor based on the spin valve effect utilising two ferromagnetic layers. U.S. Pat. No. 5,422,571 (Gurney et al) also describes an improvement of the spin valve sensor. U.S. Pat. No. 5,578,385 (Saito et al) describes yet another improvement to the spin-valve sensor based on a stack of magnetic and nonmagnetic layers.

Virtually any spin valve sensor utilises coupling of one of the ferromagnetic layers to an antiferromagnetic layer. Such coupling, known as exchange pinning or exchange bias, has been well known for decades. It has been utilised in magnetoresistive sensors preceding the spin valve. For example, U.S. Pat. No. 4,755,897 (Howard) describes such a magnetoresistive sensor. This patent teaches the issues related to biasing a ferromagnetic layer by means of exchange interaction coupling with an antiferromagnetic layer.

There are inventions focusing on the utilisation of exchange bias in spin valve sensors. For example, U.S. Pat. No. 5,958,611 (Ohta et al) describes the magnetoresistance effect element based on a multilayered film. In this invention one of the ferromagnetic layers is pinned by the exchange interaction to a layer of antiferromagnetic oxide. It is interesting to note that according to the inventors, the roughness of the antiferromagnetic layer must be small in order to achieve good magnetoresistance sensitivity.

U.S. Pat. No. 5,923,504 (Araki et al.) is another invention describing exchange pinning in a spin-valve-like magnetoresistance device. In this invention one of two ferromagnetic layers is pinned by exchange to an antiferromagnetic layer of $FeO_x$. In some embodiments of this invention there is an oxygen-blocking layer between the pinning layer and the pinned ferromagnetic layer.

There are also inventions in which magnetisation in one of the two layers is fixed without the use of the antiferromagnetic layer. For example, U.S. Pat. No. 5,867,025 (Allenspach et. al.) describes a magnetic spin valve utilising a terraced substrate. The approach in this U.S. Pat. No. 5,867,025 capitalises on the finding by the inventors that when a Co film is deposited on a Cu terraced substrate there is a critical film thickness above which the direction of magnetisation of the film is pinned. This is known as step-induced anisotropy. Therefore, the magnetic spin valve proposed in this U.S. Pat. No. 5,867,025 comprises of two ferromagnetic layers separated by a nonmagnetic metal film like in a conventional spin valve with the difference that one of the two ferromagnetic layers is thinner than the critical thickness and the other one is thicker than it. In this arrangement, magnetisation in the first of the two layers can freely rotate and in the second layer it is pinned.

It is commonly held that surface roughness in a spin valve magnetoresistive medium should be small (Conference of the Materials Research Society (Dec. 1-5, 2003, Boston, Mass., USA, talk FF 5.3 by D. Zhou et. al).

Another recent class of devices sensitive to the external magnetic field are called magnetic tunnel junctions. U.S. Pat. No. 5,629,922 (Moodera et al) and subsequently U.S. Pat. No. 5,835,314 (Moodera et al) describe such electron tunnel junction devices. The devices include two ferromagnetic electrodes separated by a dielectric layer to form a tri-layer tunnel junction. Magnetisations of one of the ferromagnetic electrodes can be reversed with respect to the other. As the electric current passes between the two magnetic electrodes, the current value is sensitive to the relative orientation of the magnetisation directions in them. Therefore, the direction of magnetisation of one of the layers with respect to the other one can be identified. U.S. Pat. No. 5,835,314 further suggests that the greatest magnetoresistance effect is obtained when the tunneling resistance is comparable to the electrode resistance. U.S. Pat. Nos. 5,734,605 and 5,978,257 (Zhu et al.) describe a tunnel junction element similar to the one described in U.S. Pat. No. 5,629,922 and further teach how it could be utilised in a memory cell. U.S. Pat. No. 6,335,081 (Araki et al) describes an improved tunnel magnetoresistance effect element based on a multilayered film with a tunnel barrier having reduced the roughness of the layers. In most magnetic tunnel junction devices magnetisation of one of the two ferromagnetic layers is pinned by exchange to an antiferromagnetic layer. There are inventions that deal with improvements of the pinning characteristics. For example, U.S. Pat. No. 5,764,567 (Parkin) describes a magnetic tunnel junction device consisting of two ferromagnetic layers separated by a dielectric barrier layer. Magnetisation in one of the ferromagnetic layers is pinned to the antiferromagnetic layer. This invention teaches that an extra non-ferromagnetic layer should be added between the dielectric barrier layer and the second ferromagnetic layer in order to reduce the coupling between the fixed and free ferromagnetic layers.

U.S. Pat. No. 6,365,286 (Inomata et al) describes a magnetic element and magnetic memory device utilising spin dependent tunnelling between a ferromagnetic metal and a ferromagnetic-dielectric mixed layer. The tunnelling occurs through a dielectric layer of $Al_2O_3$. The tunnel current depends on the orientation of magnetisations in the two layers: the ferromagnetic metal layer and the ferromagnetic-dielectric mixed layer. This patent also describes structures comprising of three ferromagnetic layers: ferromagnetic metal layer, ferromagnetic-dielectric layer and again ferromagnetic metal layer all separated from each other by dielectric layers.

Yet another group of magnetoresistive media includes media in which the magnetoresistive effect is enhanced by utilising the array of particles or grains of different materials. The inventions that fall within this group are usually concerned with ways of forming such particulate media. For example, U.S. Pat. No. 6,015,632 (Chambliss et al) describes a self-assembled lateral multilayer for a magnetoresistive sensor. This invention utilises the finding that in the case of growth on Mo(110) substrate by simultaneous co-deposition of a ferromagnetic metal such as Co or Fe and nonferromagnetic metal (Ag) stripes of different material are formed by self assembly. Although the patent contains no magnetic measurements, the inventors expect that neighbouring stripes of ferromagnetic metal should be aligned antiferromagnetically in the absence of the external magnetic field. The patent disclosure is limited to analysis of STM topography data. It remains to be seen what magnetoresistance effect if any could be achieved in such a lateral multilayer. The invention is further limited to co-deposition of immiscible materials. U.S. Pat. No. 5,858,455 describes the method of forming of such a multilayer by simultaneous co-deposition.

Another representative invention related to the same group of magnetoresistive devices and materials is described in U.S. Pat. No. 5,818,323 (Maeda et al.). According to the invention, the device is comprised of Ag/Co composite. The composite is a nonmagnetic conducting matrix of Ag that includes ferromagnetic anisotropic grains. The grains and the matrix are made of immiscible metals. The magnetoresistance material is produced by simultaneous co-deposition of the two metals. Further stripes are formed in the composite film by means of photolithography. The purpose of forming the stripes is to reduce the coercivity field and enhance magnetoresistance of the film. The invention further describes a multilayer of Cu and another Co/Cu composite. In the Co/Cu composite the Co grains are embedded into the Cu matrix and again the grains are anisotropic. Another U.S. Pat. No. 5,738,929 (Maeda et al.) describes a magnetoresistance effect element. The element comprises of ferromagnetic areas formed by photolithography covered by a non-magnetic metal overlayer. Again the magnetic areas and the nonmagnetic overlayer are made of non-soluble materials, e.g. Co and Cu. In a further U.S. Pat. No. 5,656,381 (Maeda et al.), the inventors utilise a similar composite film of immiscible materials. The film forms the magnetoresistive element. To reduce the operating magnetic field of the element, there are at least three areas of soft magnetic films magnetically coupled to the composite film. The areas are typically formed by means of photolithography. In U.S. Pat. No. 5,736,921 (Maeda et al), the magnetoresistive element is based on a similar composite material of immiscible nonmagnetic and magnetic materials. The inventors further suggest that forming a gradient of concentration of magnetic particles in the nonmagnetic matrix creates a positive effect on the magnetoresistance properties of the element. U.S. Pat. No. 5,585,196 (Koichiro et al.) is another example of a magnetoresistance effect element that utilises the particles of magnetic metals (Fe, Co or Ni) dispersed in a matrix of noble metal. The magnetic and nonmagnetic metals are again immiscible and again the composite is produced by co-deposition of the two metals.

U.S. Pat. No. 6,168,845 (Fontana at al) describes another class of patterned magnetic media and method of making the same. The media is comprised of magnetic and nonmagnetic zones. These are obtained by selective oxidation process. Selective oxidation is achieved by subjecting a magnetic layer to oxygen plasma through voids in a patterned mask made by embossing and the reactive ion etching process. The media are not used as a sensor of magnetic field but rather as an information carrier for storage disks of high density. One of the advantages is that the media has minimal topography.

U.S. Pat. No. 6,387,530 (Chunling Liu et al) also describes a patterned magnetic media for high-density information storage. The media is formed by thermally induced phase transition in an initially amorphous layer of e.g. Ni—P. By heating the layer using a heat/light source the particles of at least a partially crystalline ferromagnetic material are formed in it. It is proposed that the multiplicity of light sources can be used to create an array of particles simultaneously.

Usually substrates for most magnetoresistive devices preferably need to be flat. However, there are inventions in which the magnetoresistive media are grown on non-flat and vicinal substrates. For example, U.S. Pat. No. 6,330,135 (Manako et al.) describes a magnetoresistance effect element based on a ferromagnetic oxide thin film grown on a stepped layer oxide. This invention utilises the fact that the crystal structure of some magnetic oxides (e.g. SrFeO3) is such that antiphase boundaries are formed at the step edges of the substrate. The antiphase boundary is a crystal defect associated with the break in the translation symmetry of the material. The invention suggests that the antiphase boundaries result in additional magnetoresistance of the film.

U.S. Pat. No. 5,589,278 (Kamijo) describes magnetoresistive thin film and device. The patent teaches how to grow ferromagnetic film so that it forms pillars or staircase facets. It is suggested that such film has greater magnetoresistance. The patent further teaches how to control the width of the staircase facets and make them more homogeneous. It should be appreciated that the key motivation for the development of materials and elements with improved magnetoresistance response is to further utilise them for numerous applications, e.g. in magnetic read heads, non-volatile memory elements, random access memory elements, encoders, security devices, etc. Some of these applications are described in the patents listed above. There are also numerous patents focusing on the development of specific devices utilising magnetoresistive materials. For example, memory cell utilising a magnetoresistance element is described in U.S. Pat. No. 6,480,411 (Koganei).

In principle, the structures of magnetic layers described above are not limited to utilisation as passive magnetoresistive elements sensing the value of the external magnetic field. Some of these can also be used in various switching devices controlled by means of the current driven in the device or current injected in the structure. For example, U.S. Pat. No. 4,823,177 (Prinz et al.) describes a method and device for magnetising thin films by injecting spin polarised current. According to the invention, the device has two electrodes deposited at two different locations on a material. One of the electrodes is ferromagnetic. When a spin polarised current is passed in between the electrodes, the magnetisation of the material changes.

An object of the present invention is to develop a magnetoresistive medium for applications in information and communications technologies and also for a range of sensor applications.

Another object of the present invention is to provide materials other than those sensitive to magnetic field in general or magnetoresistance in particular. More specifically these materials could be called directional nanowires. These can be thought of as an array of sub-micron size rods with strongly anisotropic shapes: they are elongated in one direction but in two other orthogonal directions the dimensions of the material are limited to typically between 0.2 nm and 50 nm only. Thus, the term "nanowires" is used for rods with small dimensions along two essentially orthogonal directions in the nanometer range combined with elongation along the third essentially orthogonal direction. Unlike conventional nanowires, these nanowires do not have to entirely consist of metal atoms. The nanowire could consist of atoms of any sort, e.g. atoms of semiconductor elements and oxygen atoms forming oxide, or metal atoms and atoms of the sulphur element group or indeed any combination of atoms. The term nanowire, therefore, refers to the shape rather the electric conductance. However, it should be appreciated that if nanowires consist of e.g. metal atoms then their assembly will have strongly anisotropic electric conductance provided most of the nanowires are aligned along the same direction. Nanowires may have strongly anisotropic optical characteristics: e.g. for the polarisation of electric field along- and perpendicular to the direction of the elongation of the nanowires, optical and optoelectronic characteristics may be different. Magnetic susceptibility along- and perpendicular to the elongated direction may also differ. These materials are very new and their range of applications is yet to be fully explored.

The present invention is further directed to a method of fabrication of arrays of nanowires.

An objective of the invention is to develop a magnetoresistive medium, i.e. the material the resistance of which changes in response to changes in the value of an external magnetic field.

Yet another objective is to provide a method of fabrication of magnetoresistive media according to the invention.

Another objective is to develop a method for forming arrays of nanowires for a range of different applications including magnetic, electronic, optical and optoelectronic.

SUMMARY OF THE INVENTION

According to the invention, there is provided a magnetoresistive medium comprising a crystalline substrate which is vicinally treated to form stepped terraces of atomic and nanometer scale. Then there are essentially two films. One is a thin main film and the other is a fractional layer of spacer film which may be placed directly on the substrate or above the thin main film. The fractional layer of spacer film will form one set of spaced-apart discrete separated spacer nanowires. The effect of the spacer nanowires is to form two sets of main nanowires in the main film, each set having a different response to an external magnetic field. These main nanowires are formed in the main film by the interaction of the main film with the spacer nanowires and the substrate. The thin main film, as stated above, can be above or below the substrate and can be directly in contact with the substrate or indeed there can be more than one fractional layer to provide more than one set of spacer nanowires. It is possible, for example, to have many sets of spacer nanowires, in which case there will be many sets of main nanowires Generally, the spacer nanowires are interposed between the main film and the substrate and usually there are two sets of spacer nanowires covering substantially all of the stepped terraces. However, the spacer nanowires can be positioned on top of the main film.

The invention also provides a composite substrate comprising one or more of vicinally treated antiferromagnetic and vicinally treated ferromagnetic upper substrate and a non-magnetic lower substrate or indeed these can be reversed with the non-magnetic material forming the upper substrate.

In one magnetoresistance medium in accordance with the invention, the atomic composition of the main and spacer films are different to provide different concentrations of atoms inter-diffusing between the main nanowires and the rest of the medium.

The substrate, the main film and the spacer nanowires may be ferromagnetic, antiferromagnetic and non-magnetic materials. If all three are of the same material, at least one must have a different ferromagnetic or antiferromagnetic property.

One set of the main nanowires may or may not be epitaxially grown or indeed both sets can be epitaxially grown with different crystallographic orientations or with different amounts of lattice strain.

The spacer nanowires may be one of a ferromagnetic material of relatively high coercivity, a ferromagnetic material of relatively low coercivity, and an antiferromagnetic material.

It will be appreciated that the magnetoresistive material may be a stack of a plurality of each of these media with one medium being placed on top of the other and indeed these media, for instance, can have different miscut angles. The substrates may be so arranged as to have miscut angles offset with respect to each other such as by substantially 90°.

In another embodiment of the invention, the thickness of the spacer nanowires may be such as to vary the spacing between some of the main nanowires and the substrate from 1 to 50 atomic layers.

It is also possible to have spacer and main nanowires which are non-magnetic once their lattice constants are different or there is a lattice mismatch between the main nanowires, spacer nanowires and the substrate. It is also possible to provide spacer nanowires having substantially the same lattice constants and symmetry as the substrate, but different densities of structural defects. This will cause different densities of structural defects in the sets of main nanowires and hence of response to an external magnetic field.

It is possible also to provide two sets of spacer nanowires of different material covering substantially all the substrate and then there would be two sets of main nanowires with different response to an external magnetic field. Equally, the two sets of spacer nanowires of different materials might not cover the whole of the substrate and then there would be formed three sets of main nanowires. It is also possible to manufacture the substrate such that it is of one of a ferromagnetic material, a semi-conductor material and an antiferromagnetic material, each material having a relatively high resistance to electrical current, whereby the resistance of the substrate is sufficiently greater than that of the film to prevent, in use, the substrate shunting the current in the main film. Various materials may be used to form the substrate such as NiO, FeO, CoO, Si, Ge, GaAs, InP, $ZrO_2$, $HfO_2$, $TiO_2$ and various other materials or indeed a ferromagnetic material of high coercivity.

In constructing the magnetoresistive medium, the substrate is pre-annealed in an externally applied magnetic field. The substrate can be a composite substrate comprising a base of non-magnetic material carrying a layer of one of antiferromagnetic and ferromagnetic material deposited thereon on which is formed the vicinal surface.

The substrate can comprise:
  a base layer of non-magnetic material;
  a buffer layer on the base layer; and
  an upper layer of one of antiferromagnetic and ferromagnetic material deposited on the buffer layer, which upper layer forms the vicinal surface.

Further, the two sets of main nanowires can be characterised by different extents of atomic interdiffusion between the main nanowires and one of the spacer nanowires and the substrate. The substrate can also be formed, for example, from MgO, $Al_2O_3$, and so on.

Ideally, a final stabilising and protective layer is deposited on the magnetoresistive medium, which can be one of $Al_2O_3$, MgO, $SrTiO_3$, ZnO, $SiO_2$, $TiO_2$, $HfO_2$, and $ZrO_2$.

It is also possible to have a substrate having a surface with bunched atomic terraces.

The invention further provides additional magnetic biasing layers in the medium in order to achieve smoother response of the resistance change on the value of the external magnetic field.

The upper nanowires are formed from a film which can be, for example, one of Fe, Ni, Co, Permalloy, alloys containing atoms of Fe, Ni, Co, Mn, Heusler Alloy, $Fe_3Si$, rare earth doped manganites, oxides of transition metals, sulphides of transition metals, selenides of transition metals, tellurides of transition metals, and alloys containing metals of 4f chemical group.

The invention also provides a method of producing a magnetoresistive medium comprising:
  cutting a substrate at a recorded preset miscut angle;
  vicinally treating the cut substrate to provide stepped terraces of atomic and nanometer scale on the substrate;
  depositing a film on the substrate;
  measuring the magnetoresistance of the medium;
  repeating the steps for different miscut angles until the optimum miscut angle is achieved; and
  recording the miscut angle and treatment for that substrate and film for subsequent use as a vicinal treatment.

Generally, a fractional thin film layer is deposited on the substrate after having been vicinally treated to cover part of the substrate by directing a flux of atoms onto the atomic terraces of the substrate. It is also possible to use ion etching to form the spacer nanowires.

Ideally, the spacer nanowires are formed by directing a well collimated flux of atoms onto the terraces. They should generally be directed nearly parallel to the terraces and not substantially greater than the miscut angle of the substrate, or indeed at approximately the miscut angle.

Also, in accordance with the invention, the magnetoresistive medium may be made by depositing a surfactant layer on the vicinal surface.

DETAILED DESCRIPTION OF THE INVENTION

The invention will be more clearly understood from the following description of some embodiments thereof, given by way of example only, with reference to the accompanying drawings, in which.

Figure 13A:
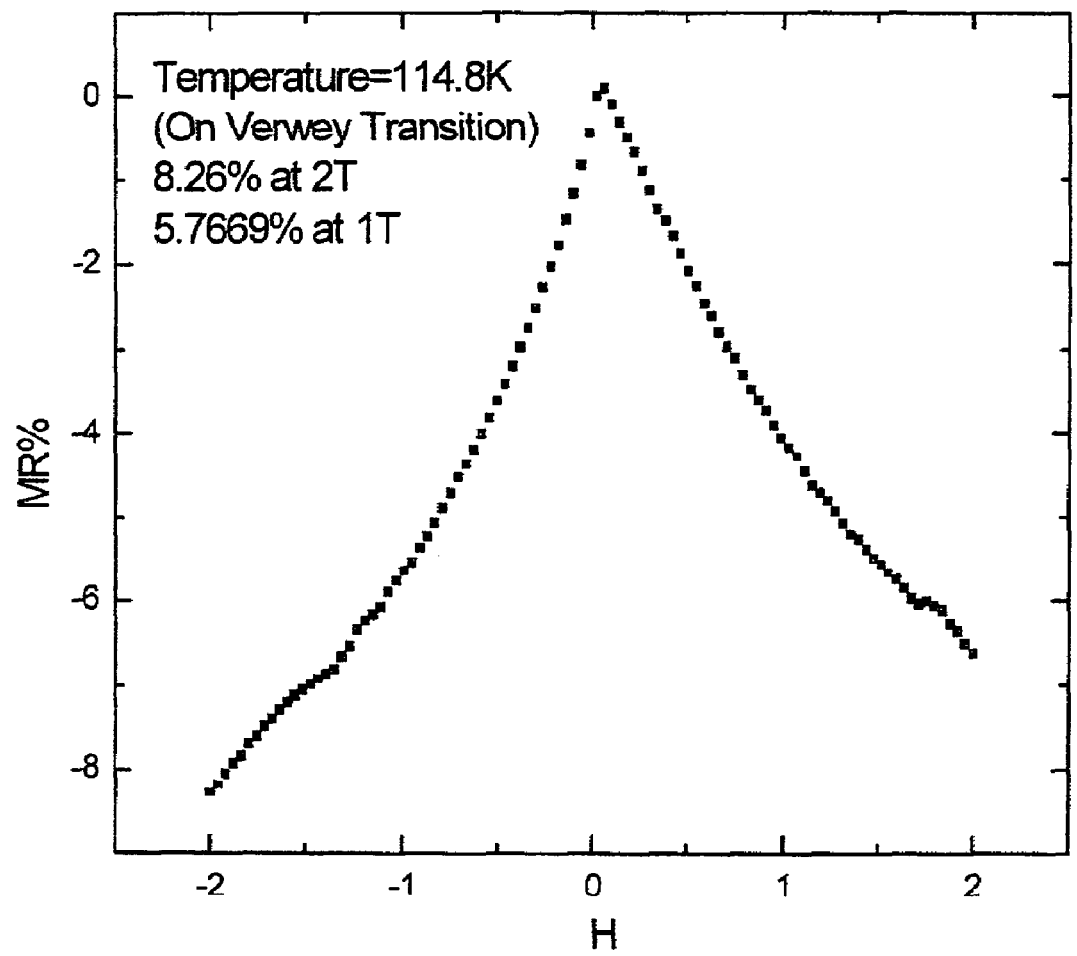
Figure 13B:
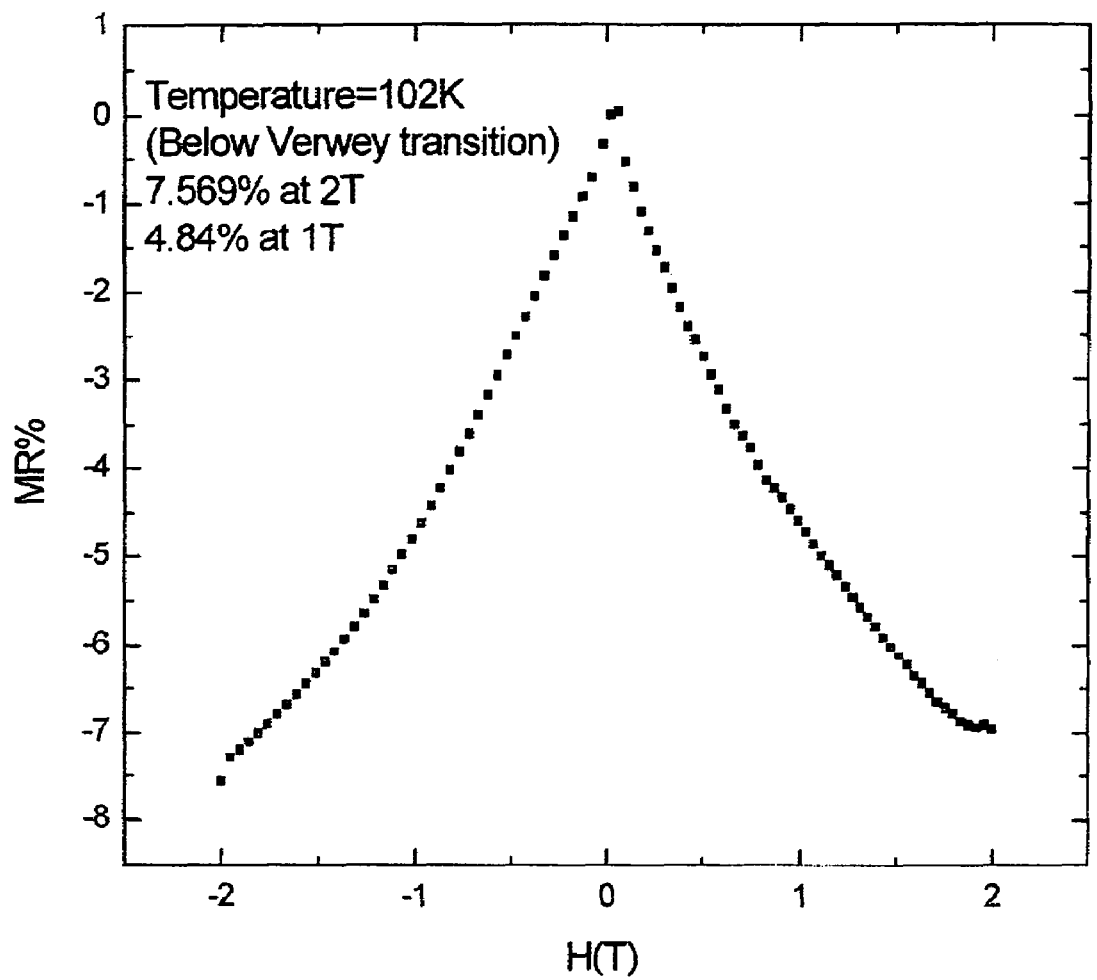
Figure 14A:
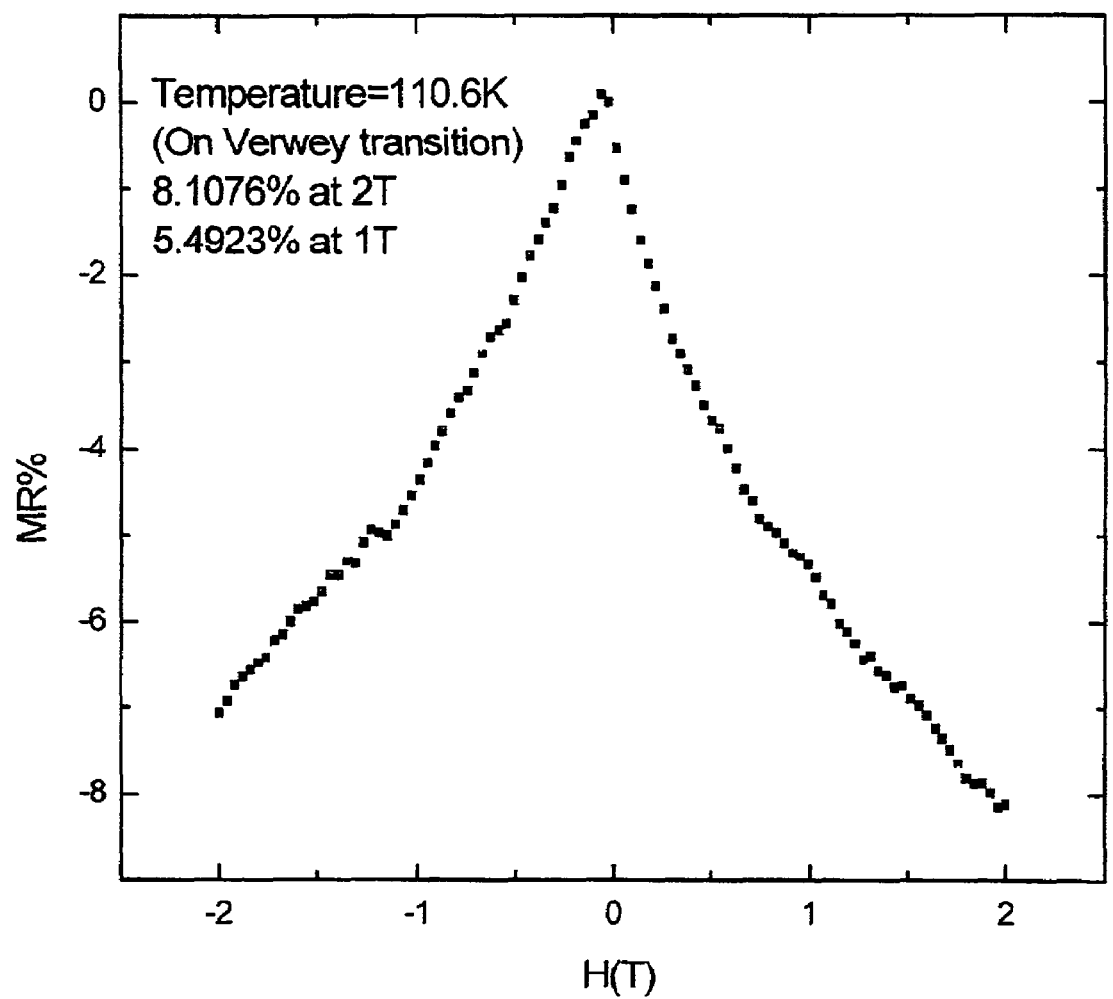
Figure 14B:
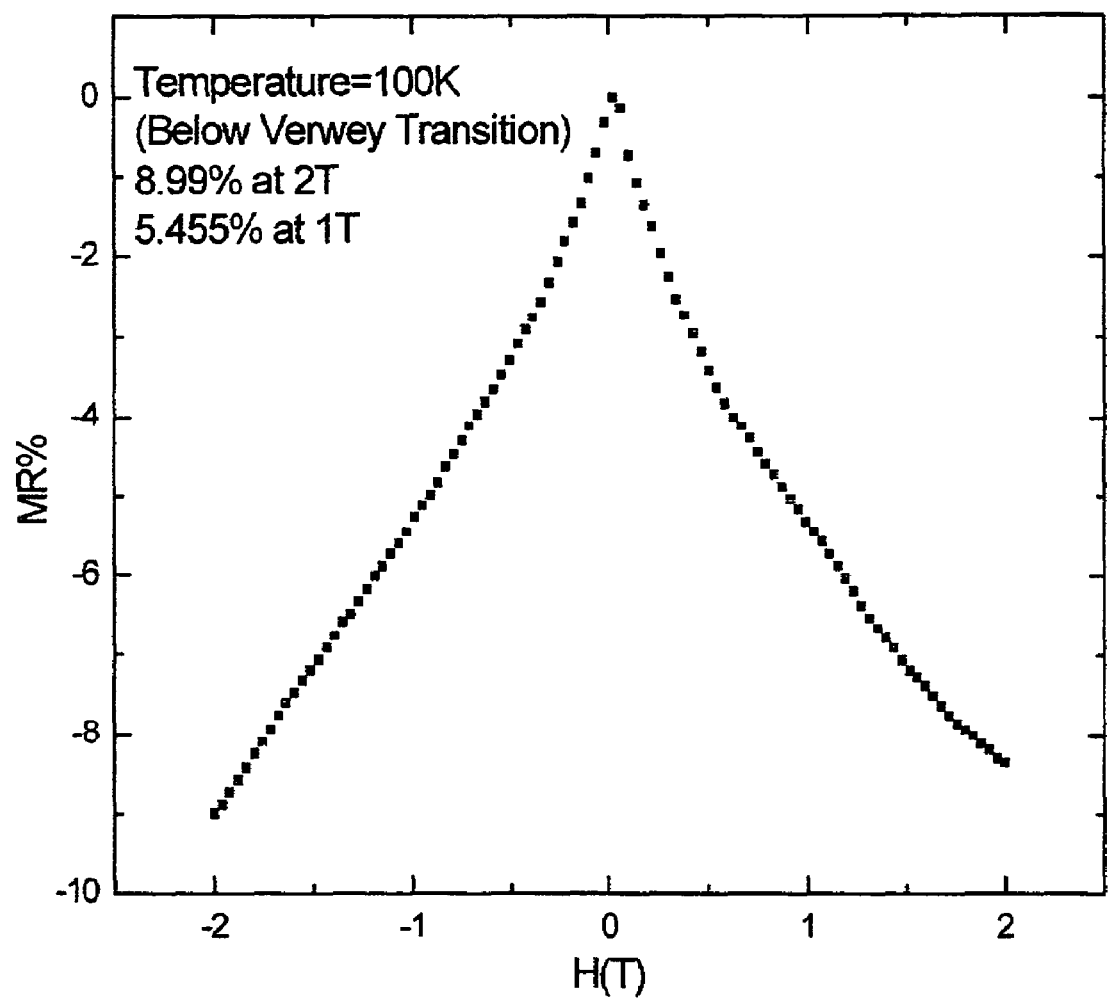
Figure 15A:
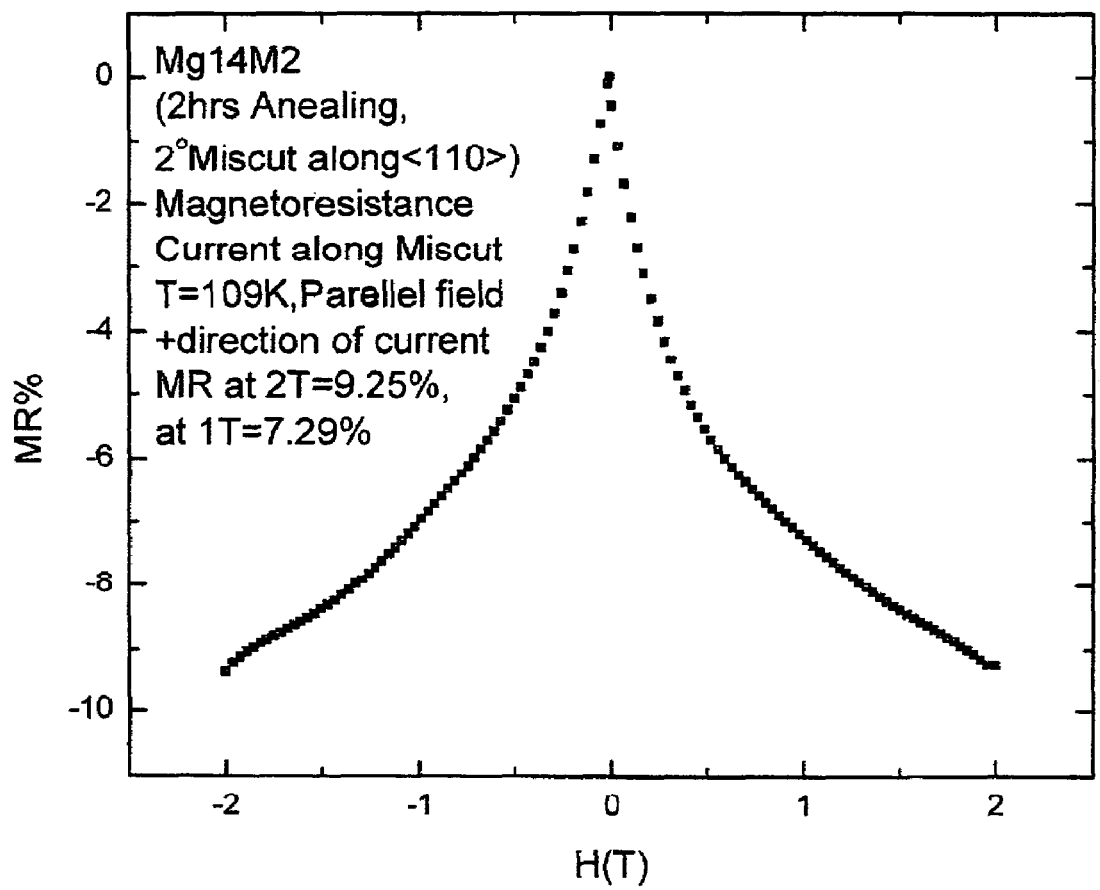
Figure 15B:
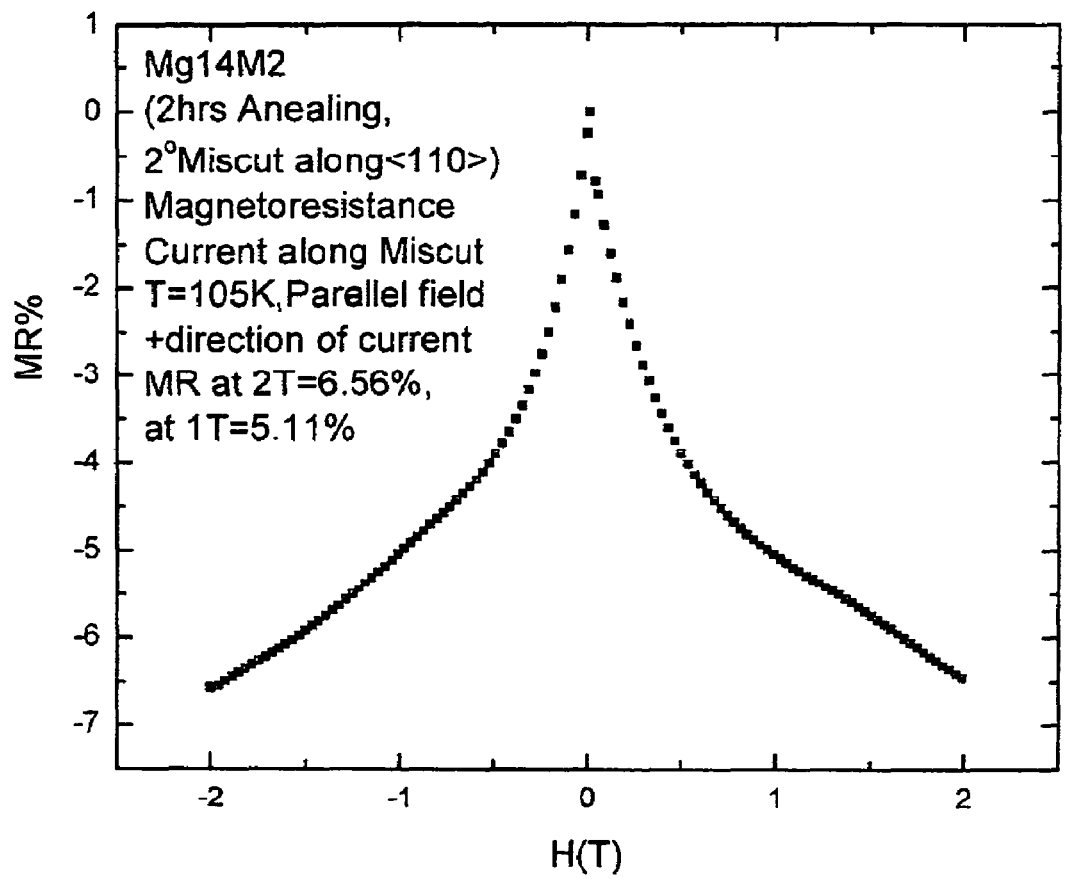
Figure 16A:
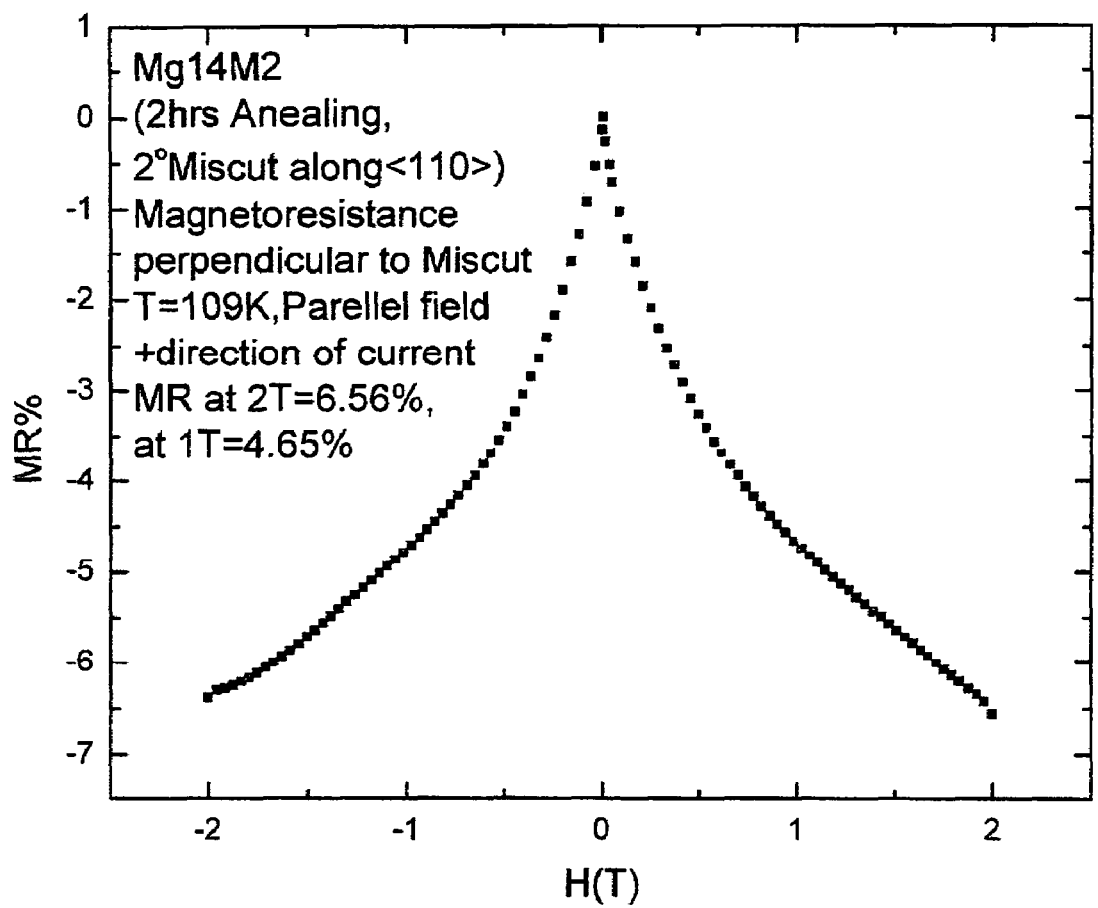
Figure 16B:
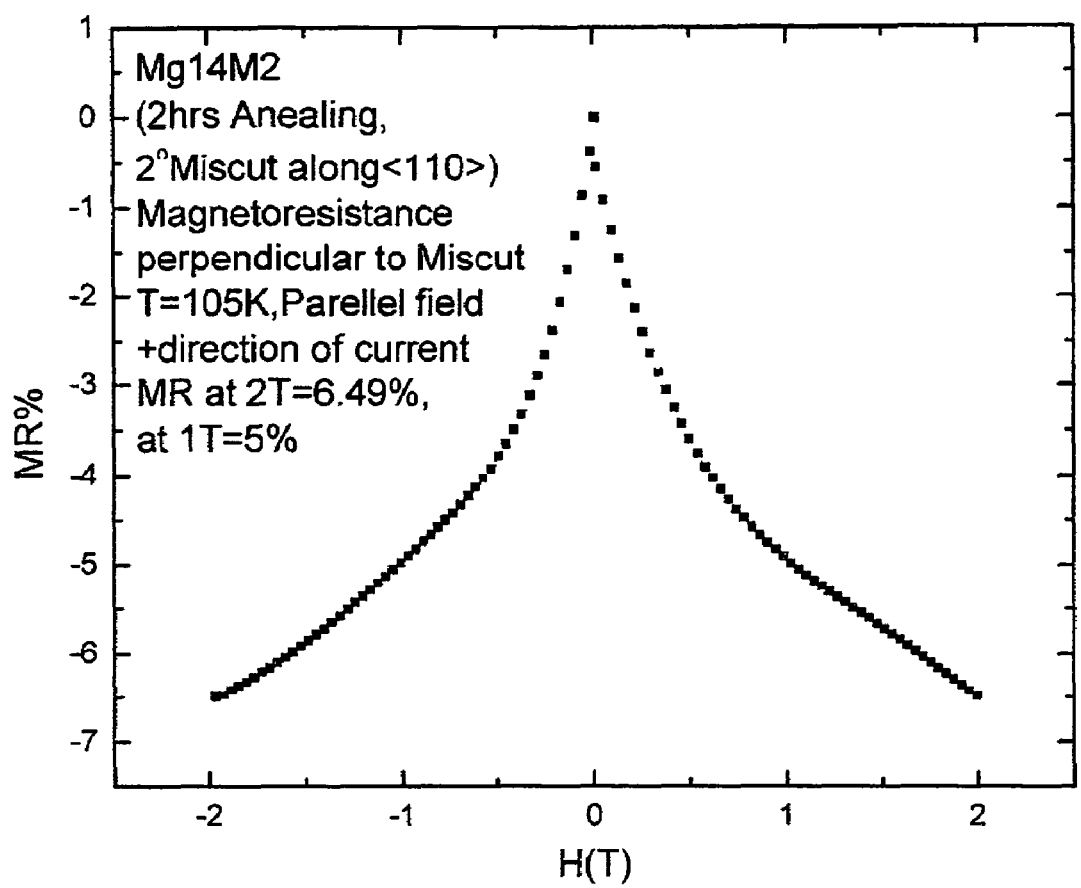
Figure 17A:
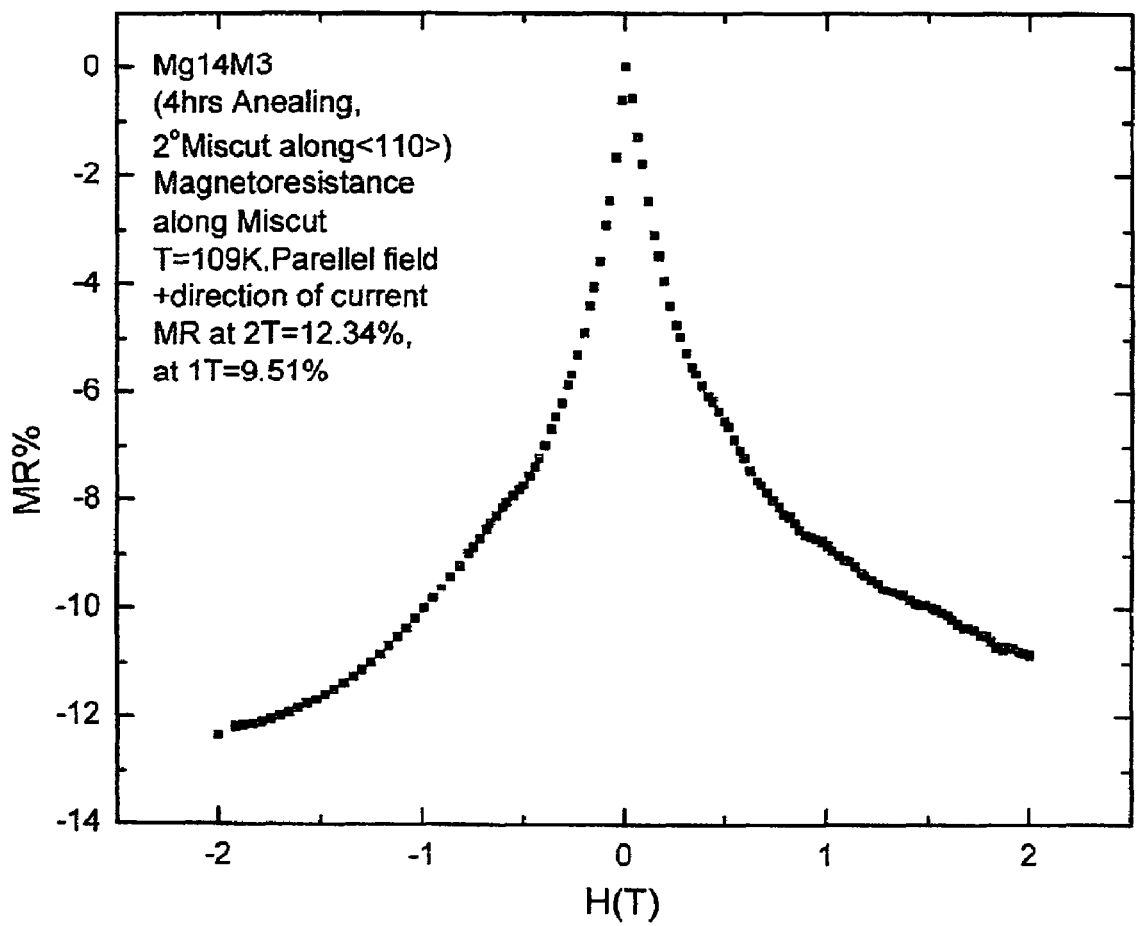
Figure 17B:
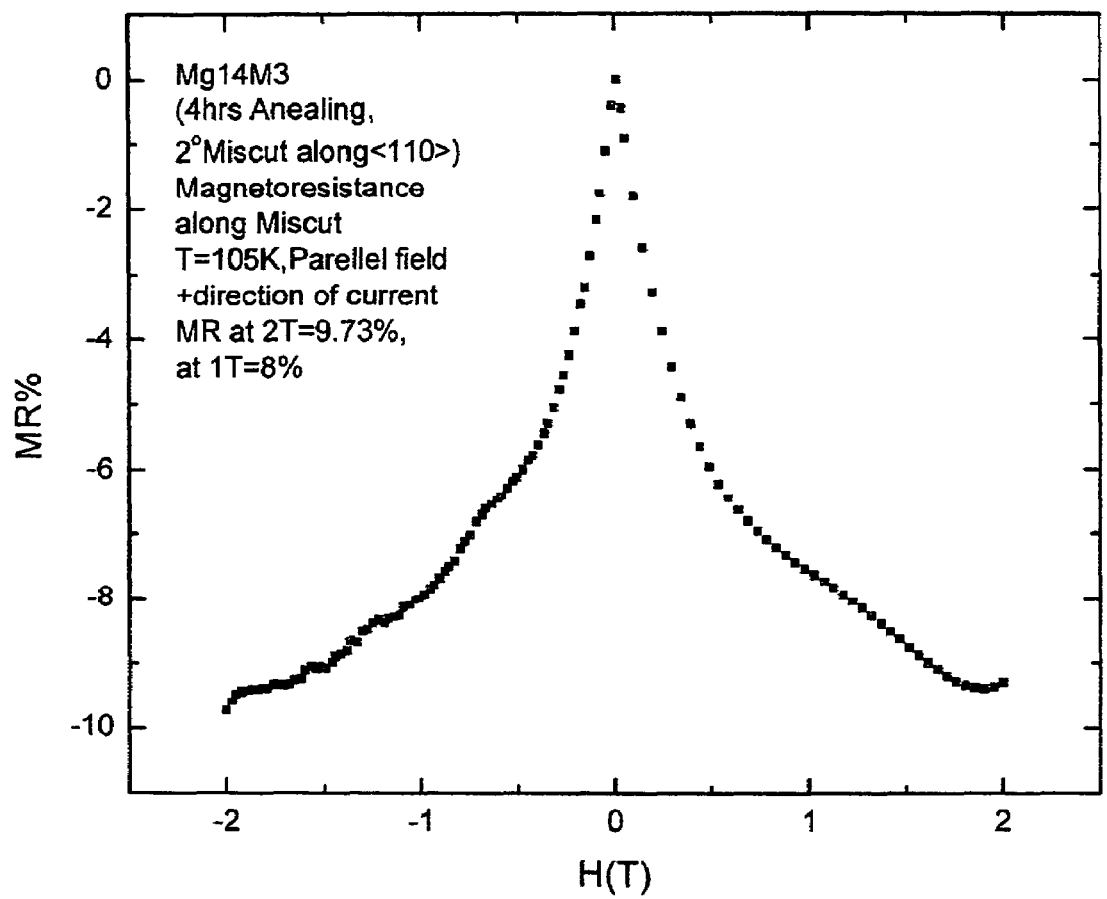
Figure 18A:
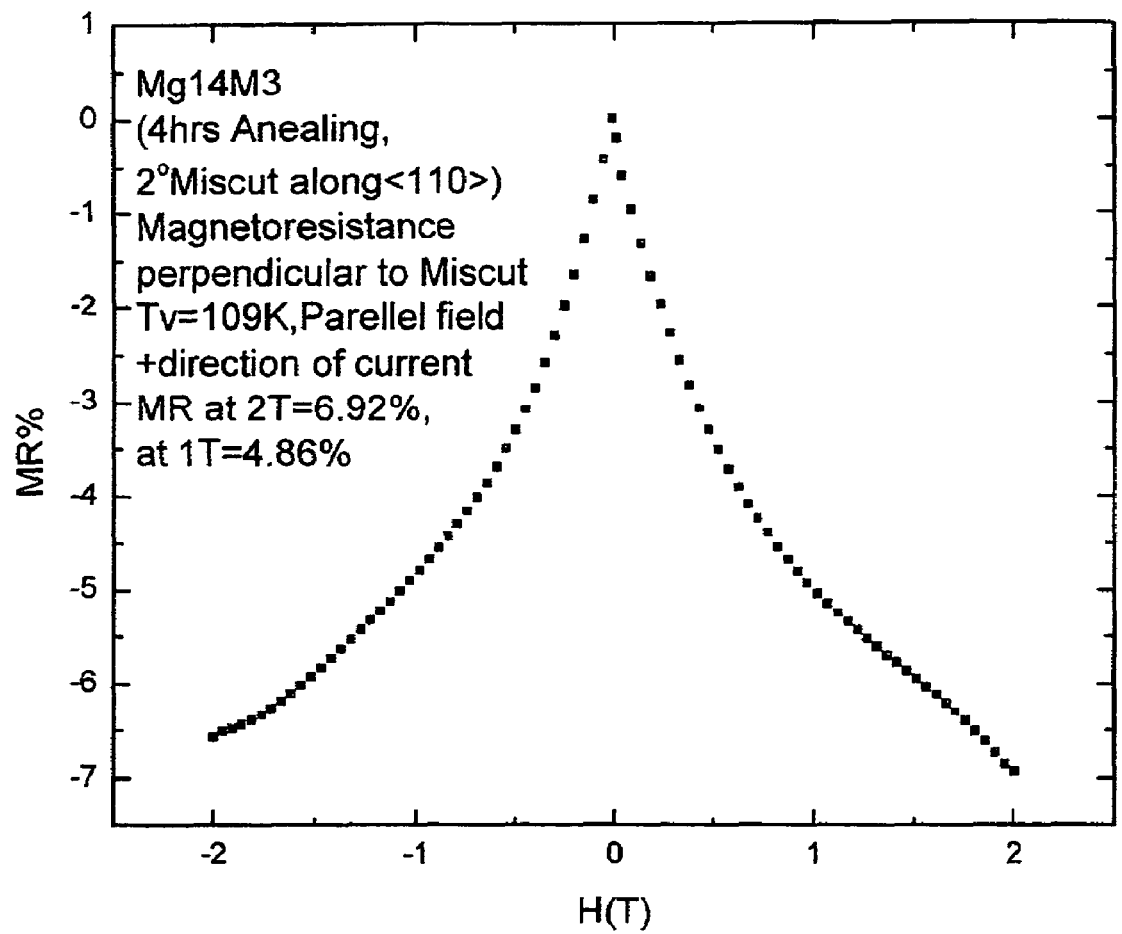
Figure 18B:
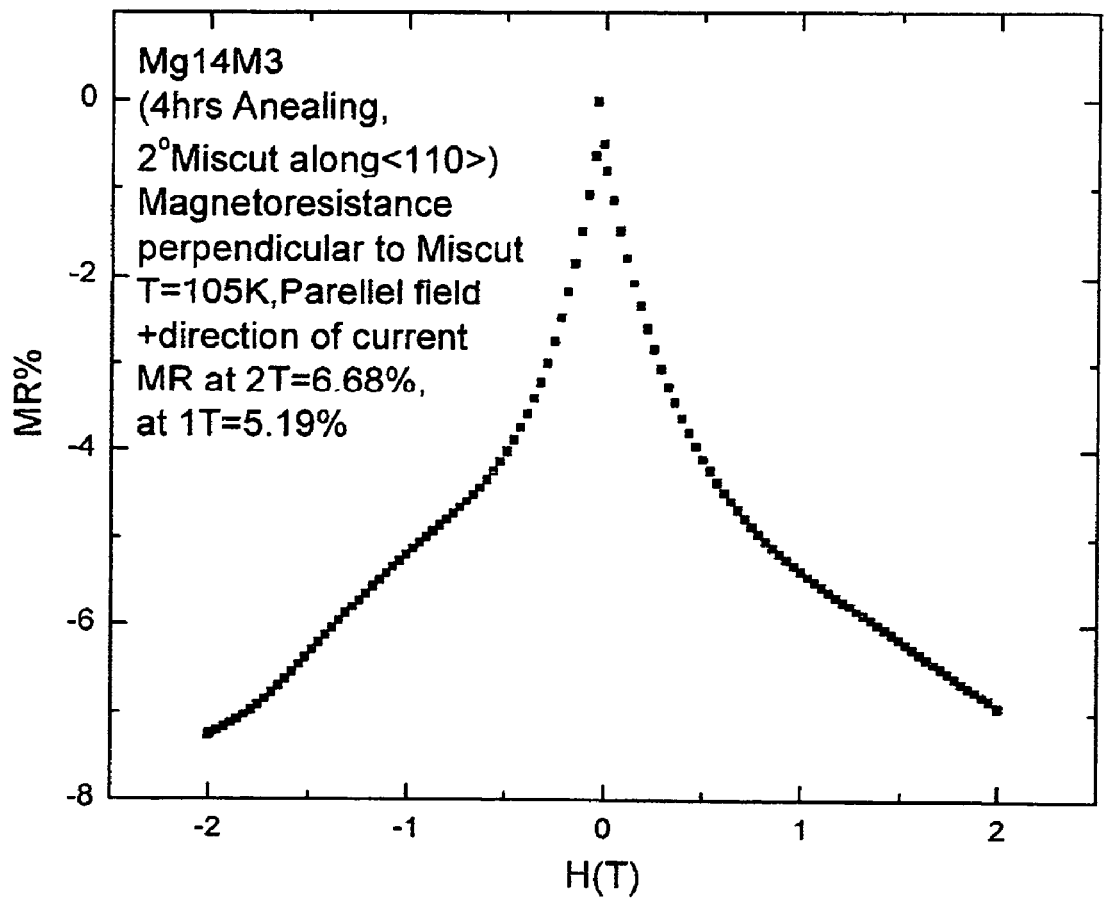
Figure 19A:
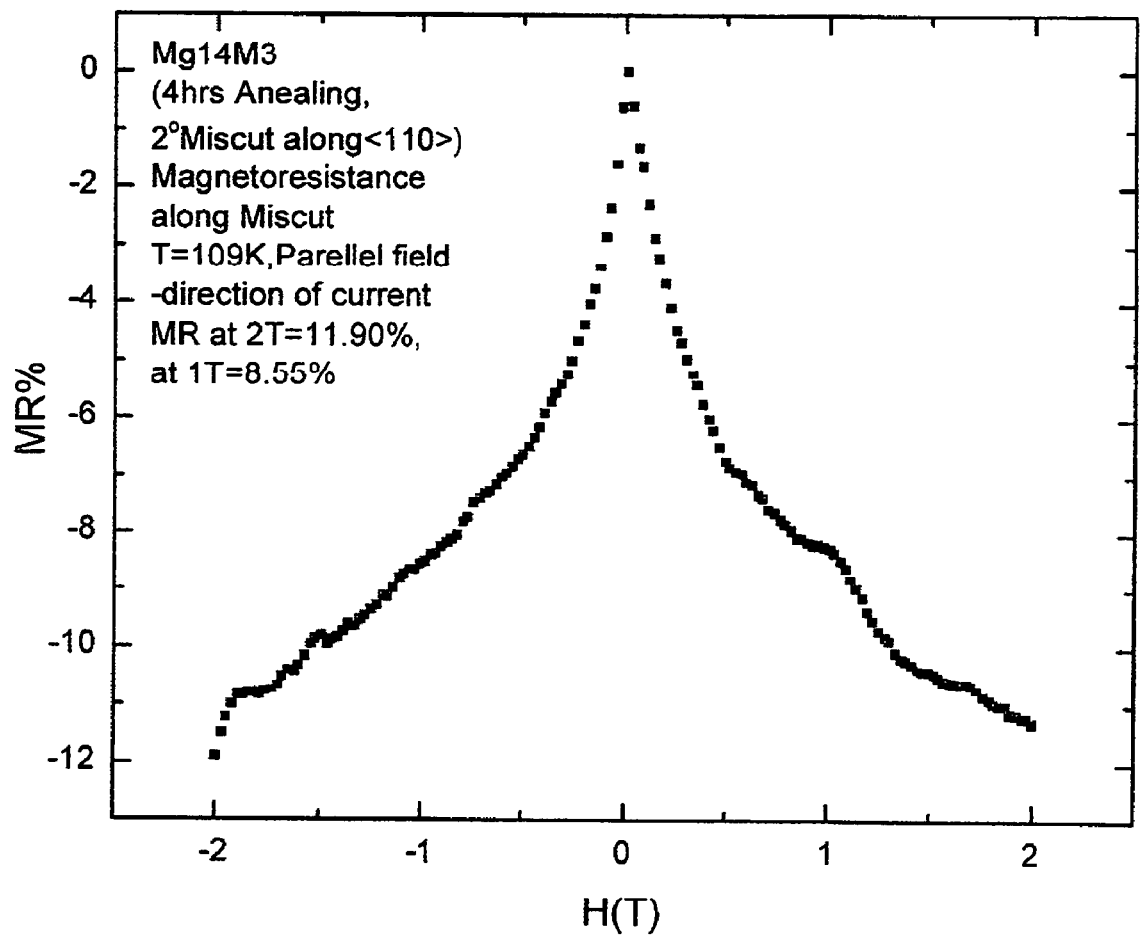
Figure 19B:
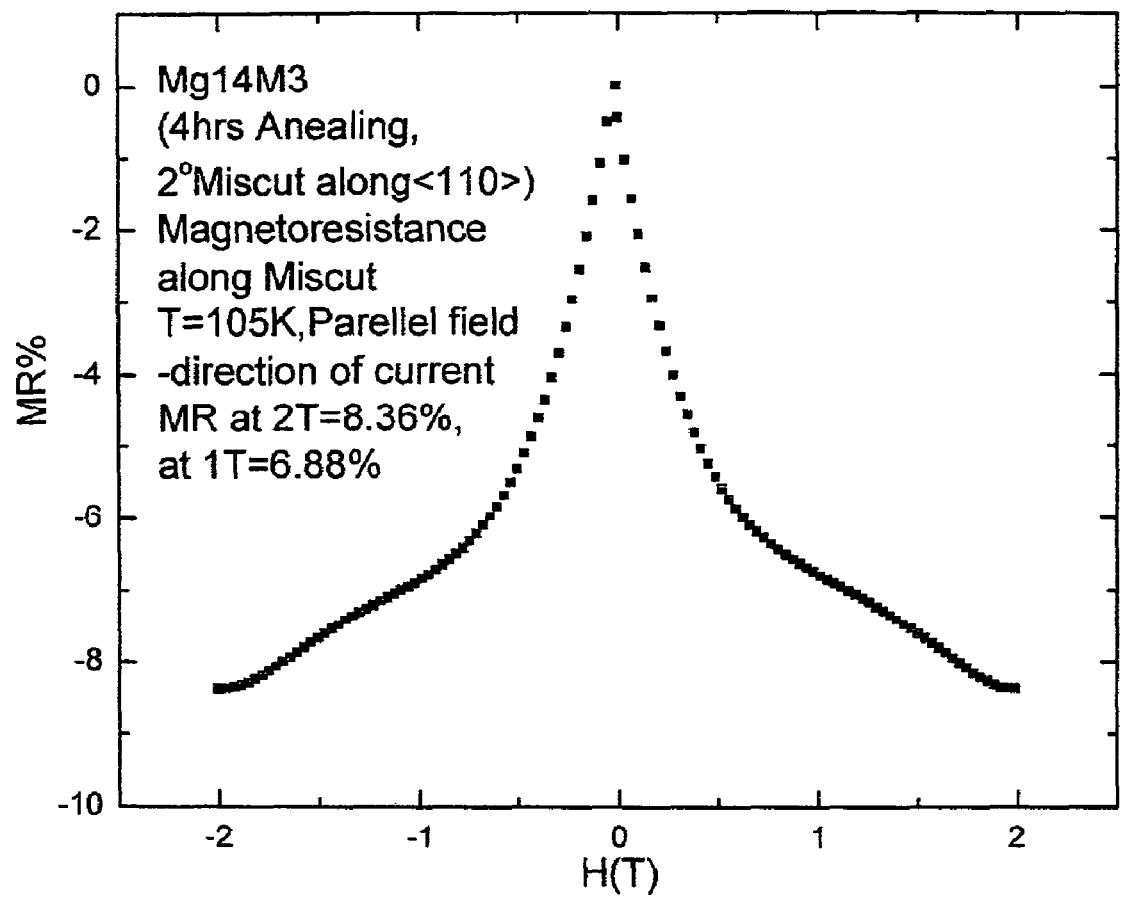
Figure 20A:
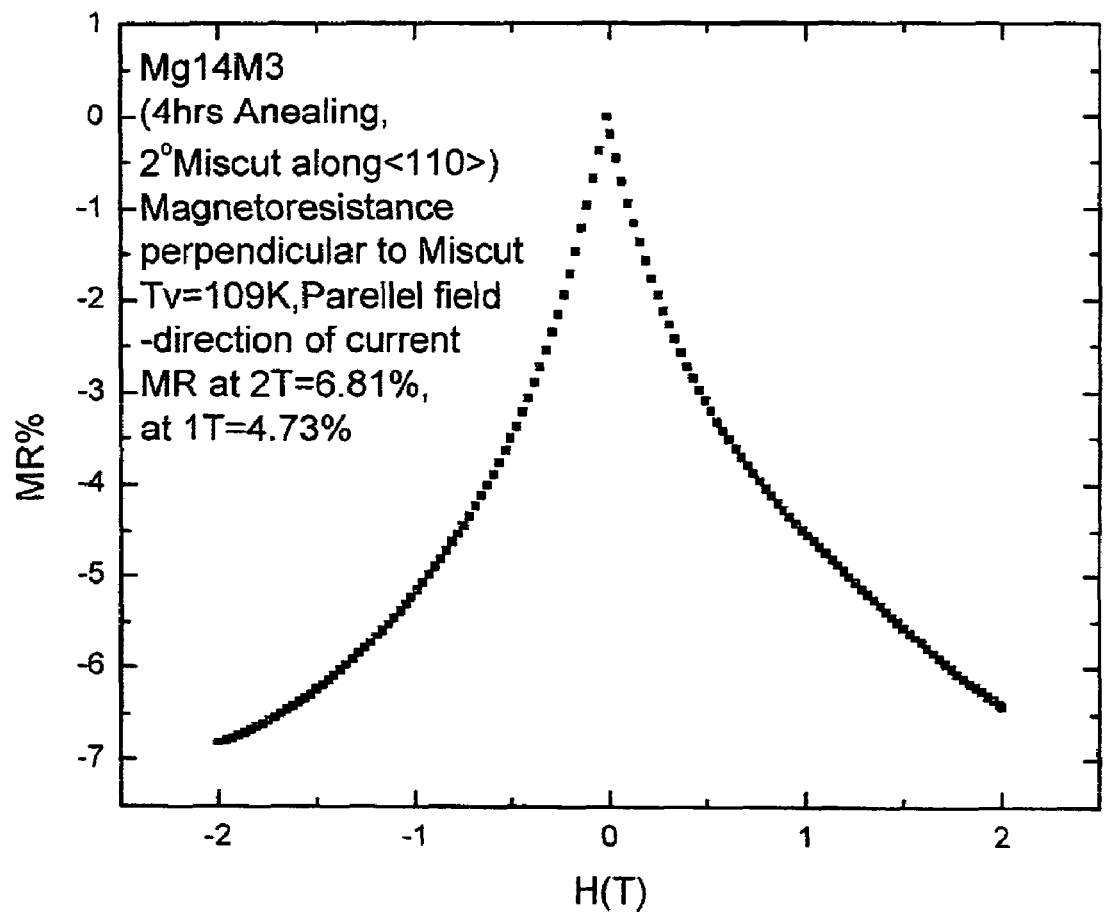
Figure 21:
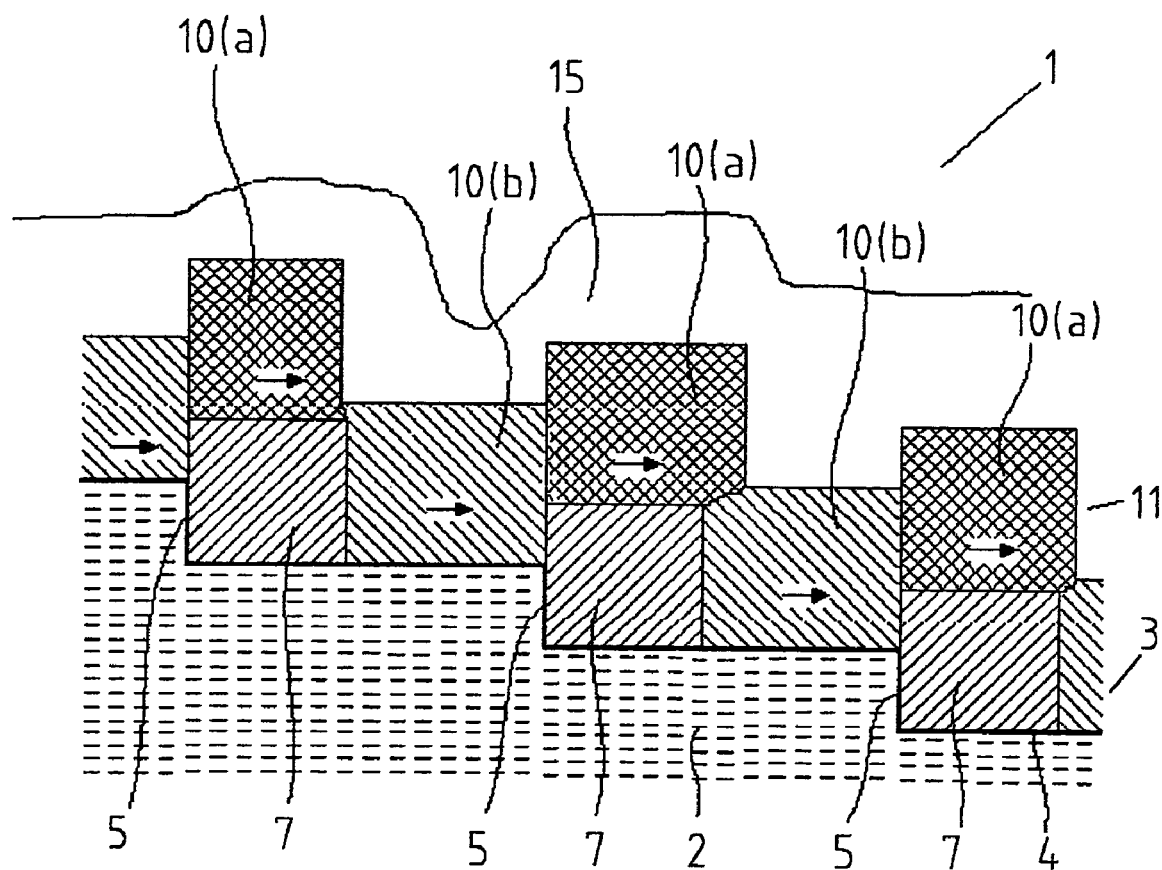
Figure 22:
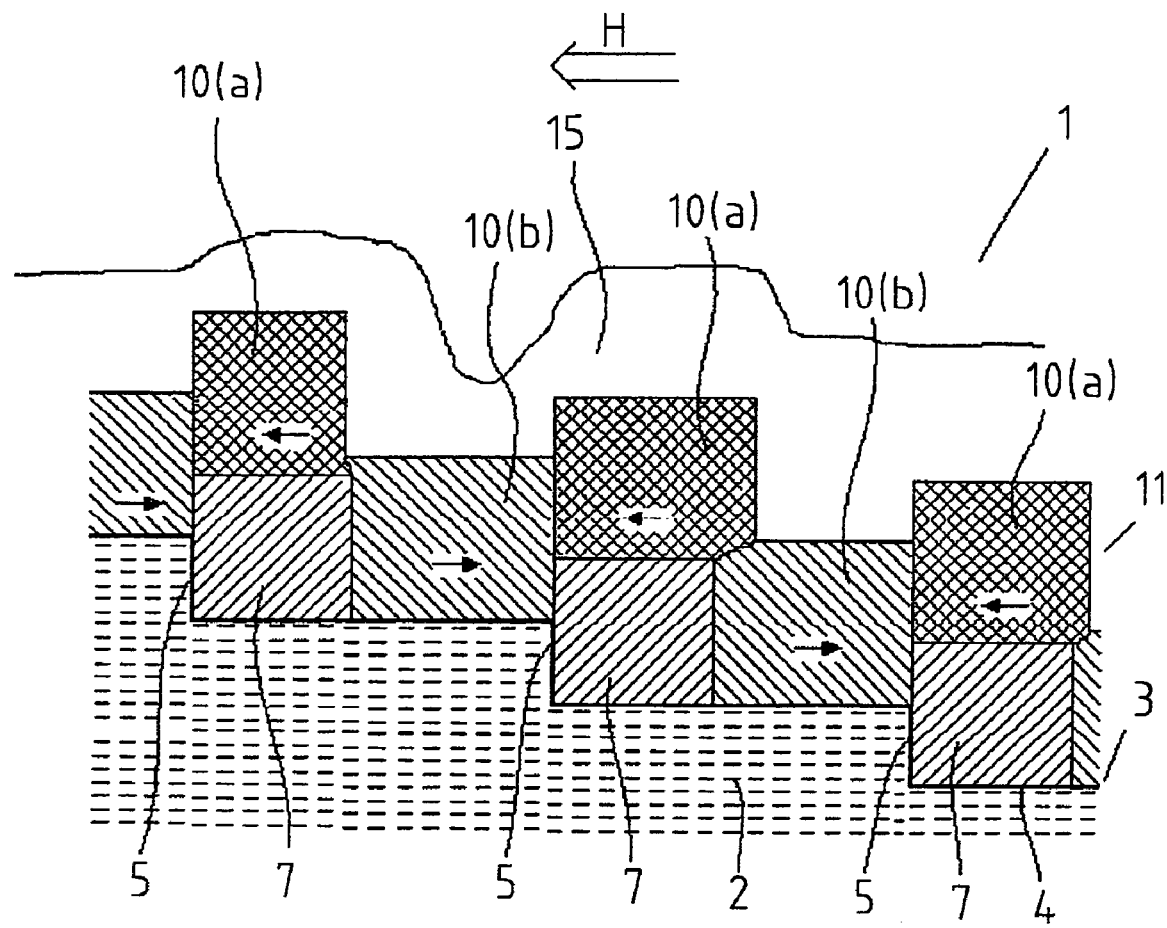
Figure 23:
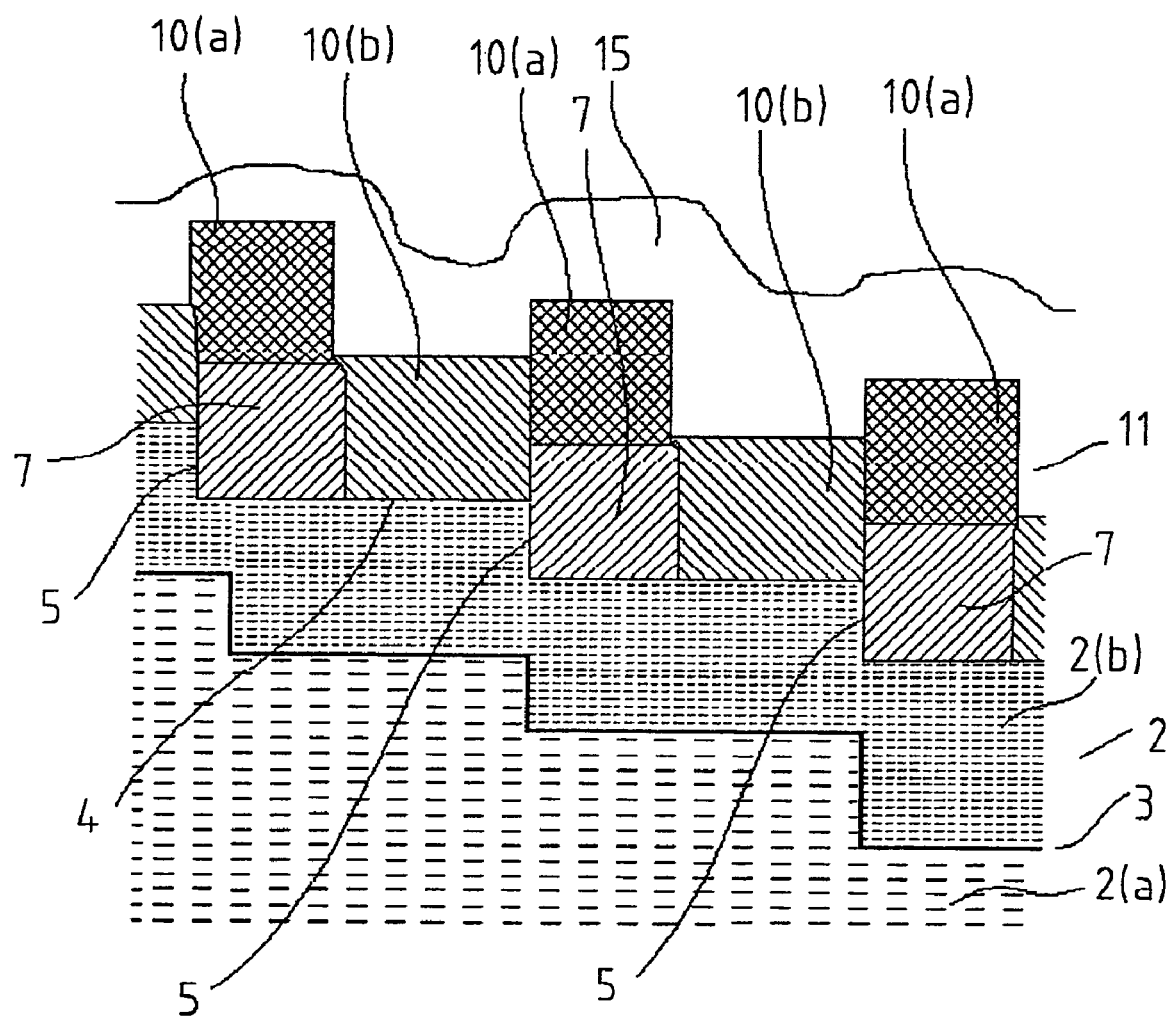
Figure 24:
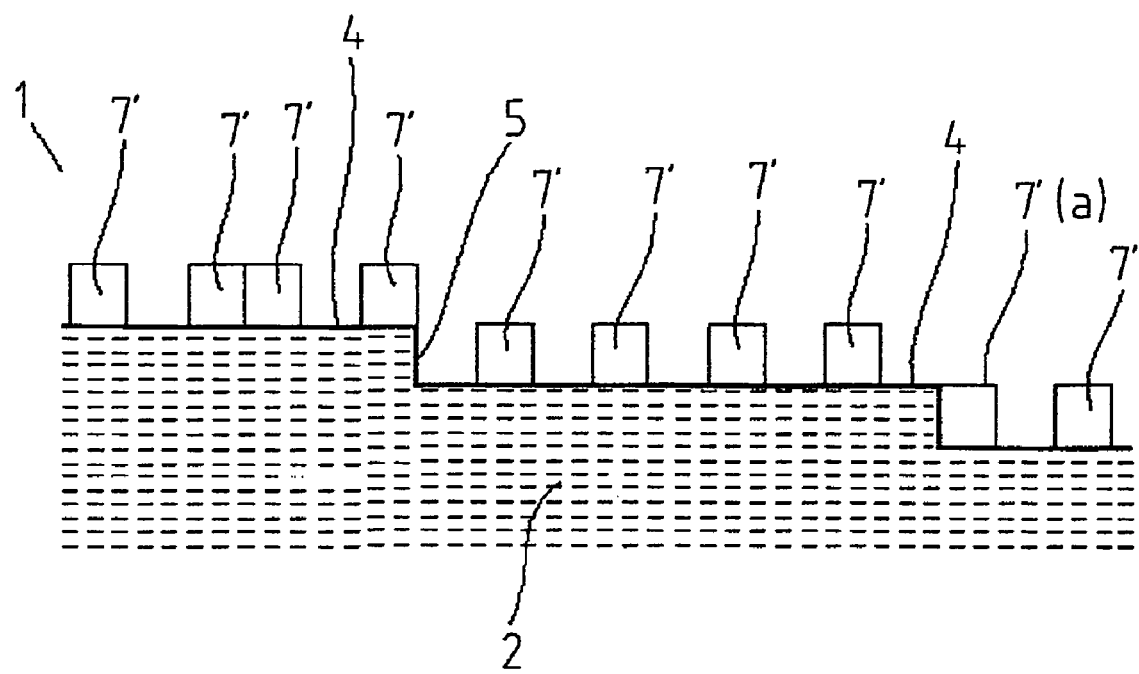
Figure 25:
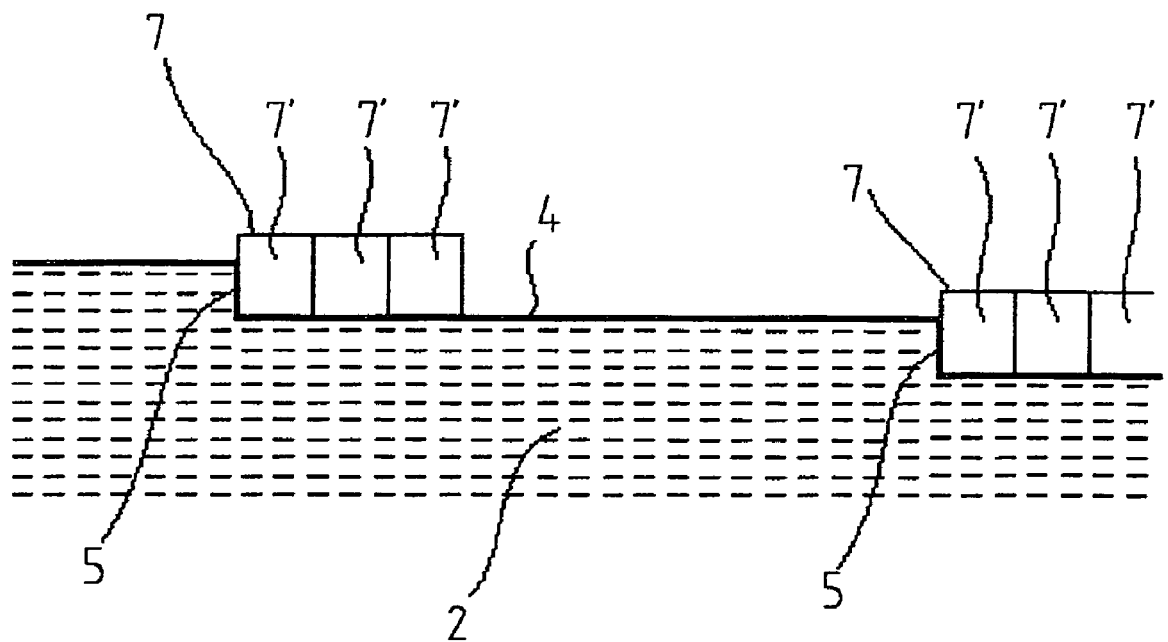
Figure 26:
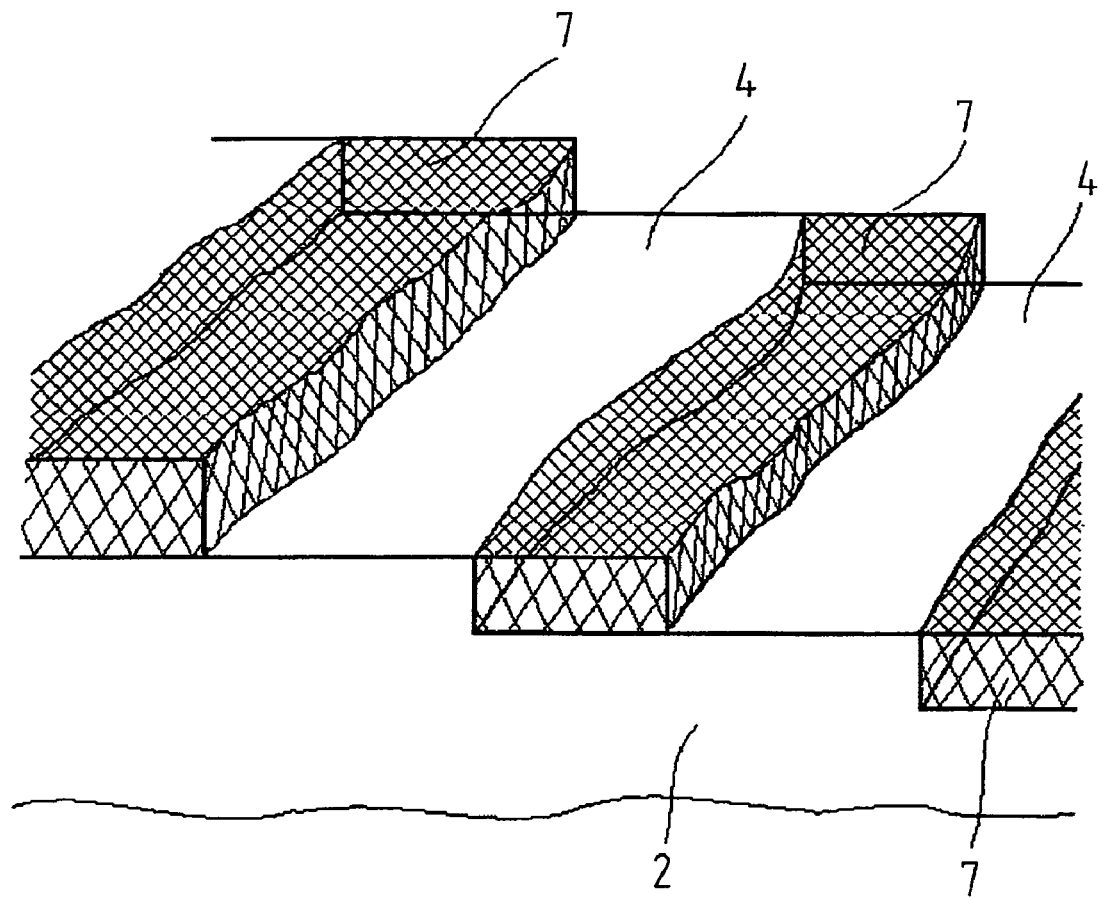
Figure 27:
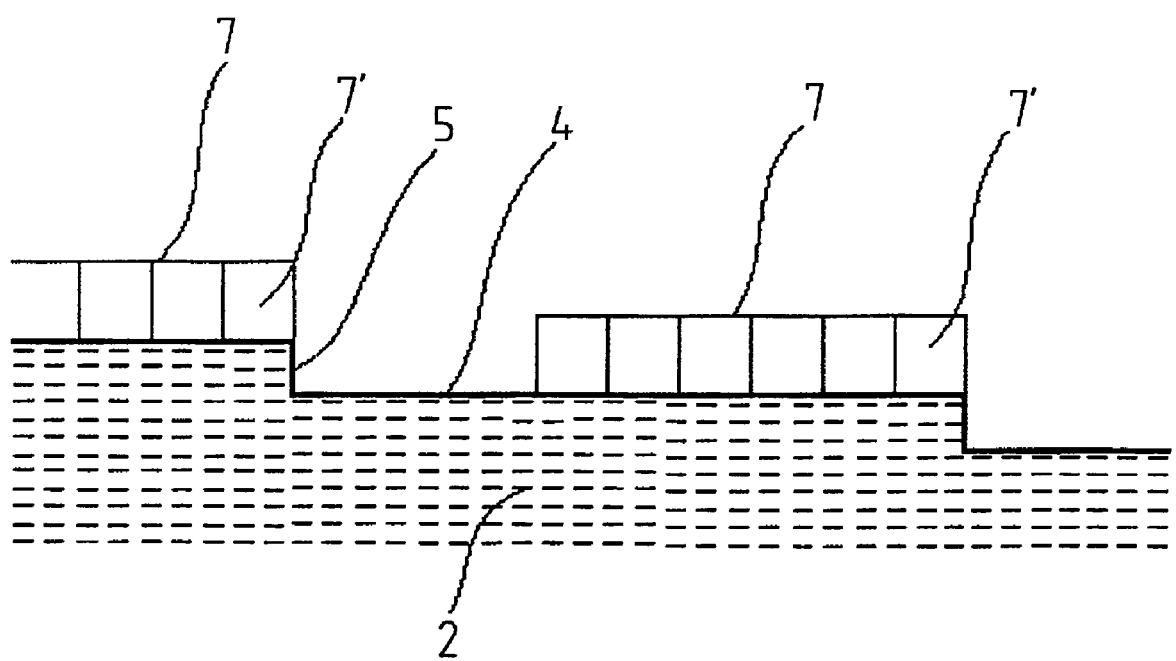
Figure 28:
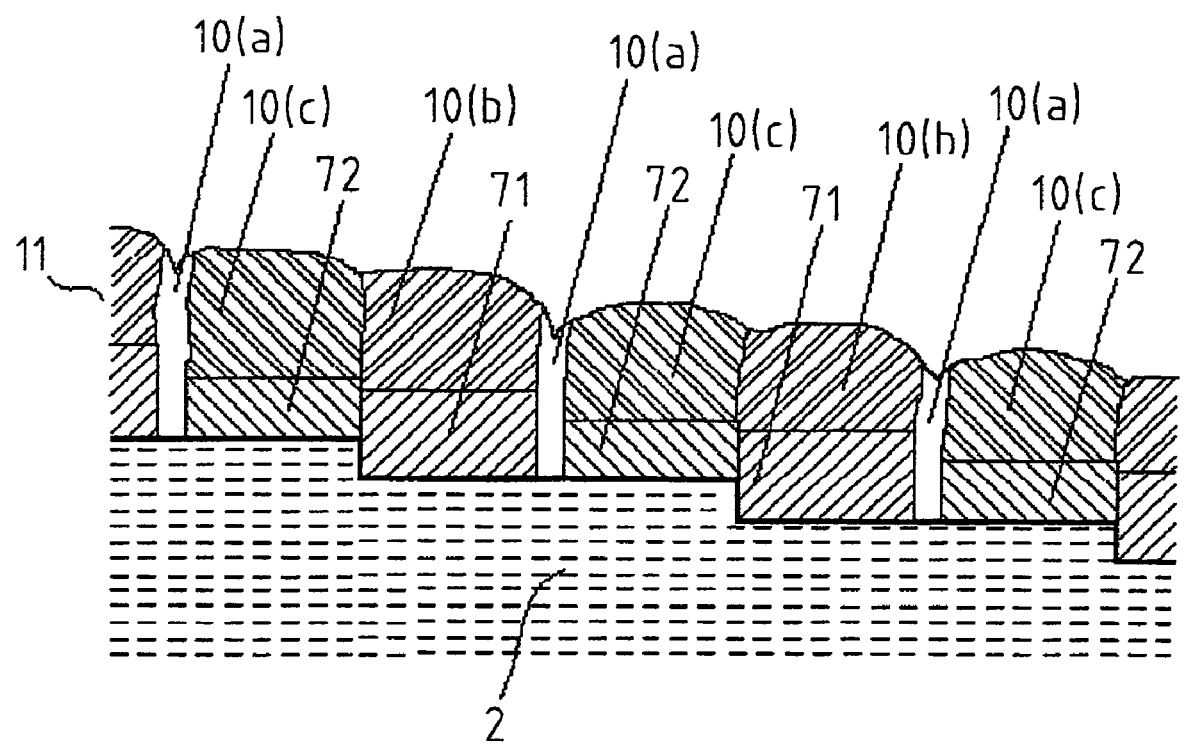
Figure 29:
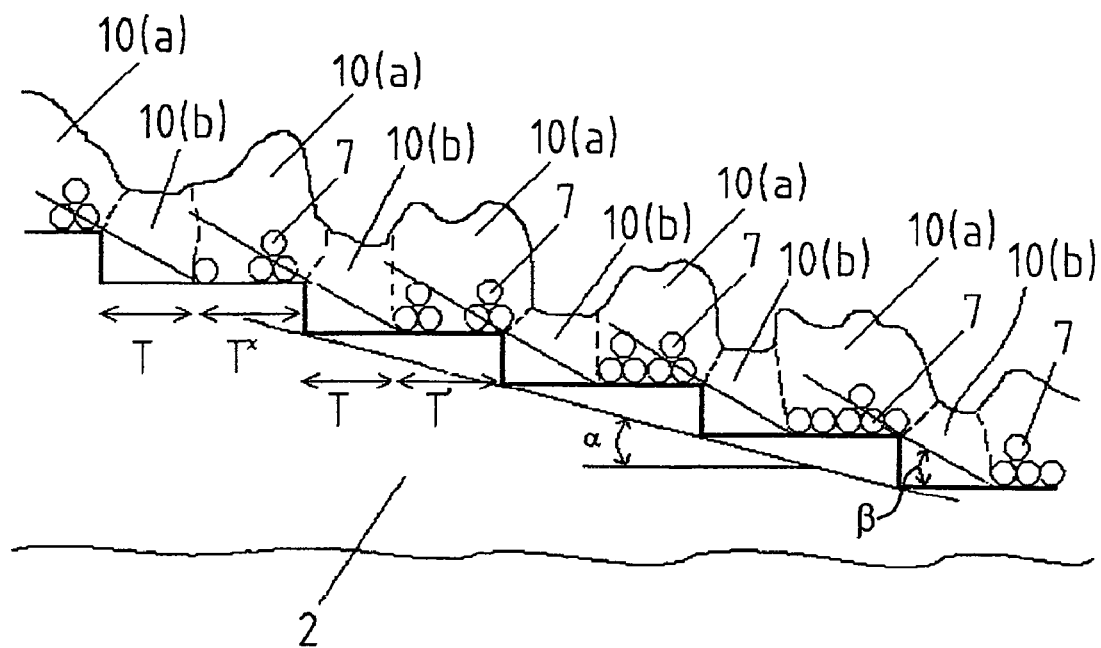
Figure 30:
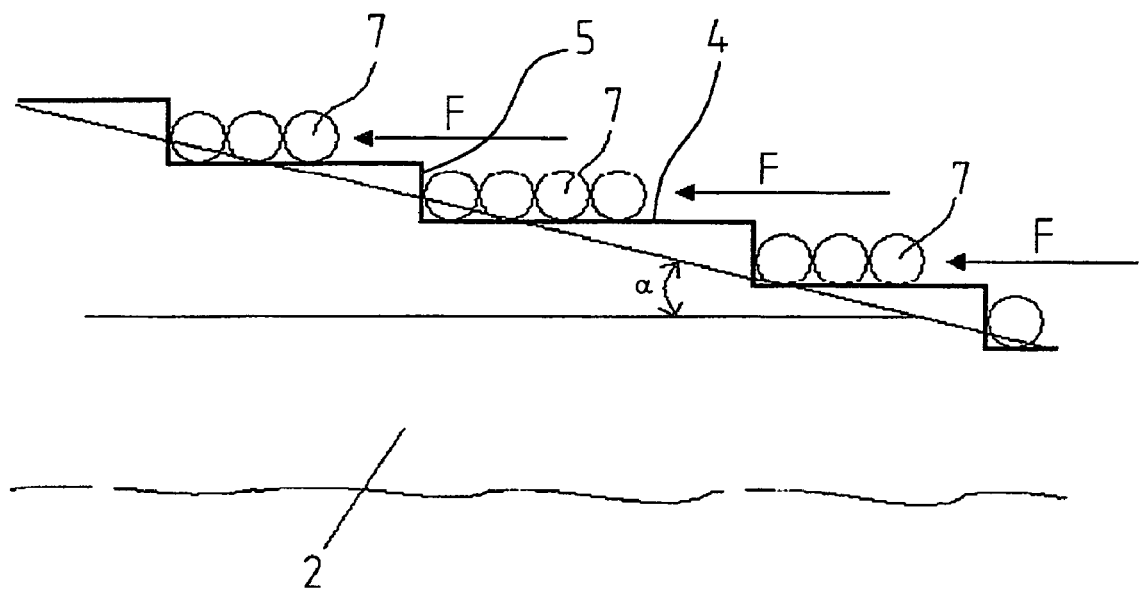
Figure 31:
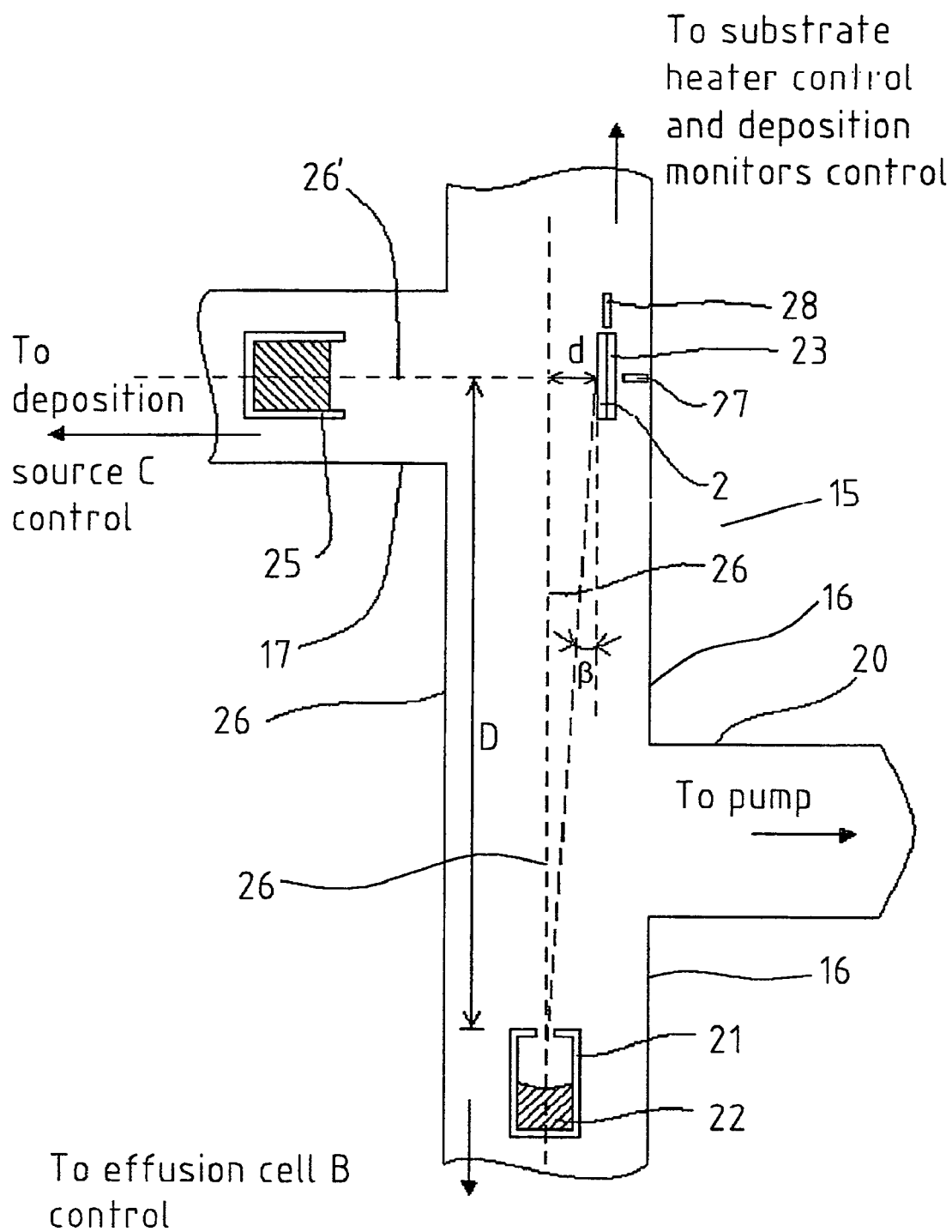
Figure 32:
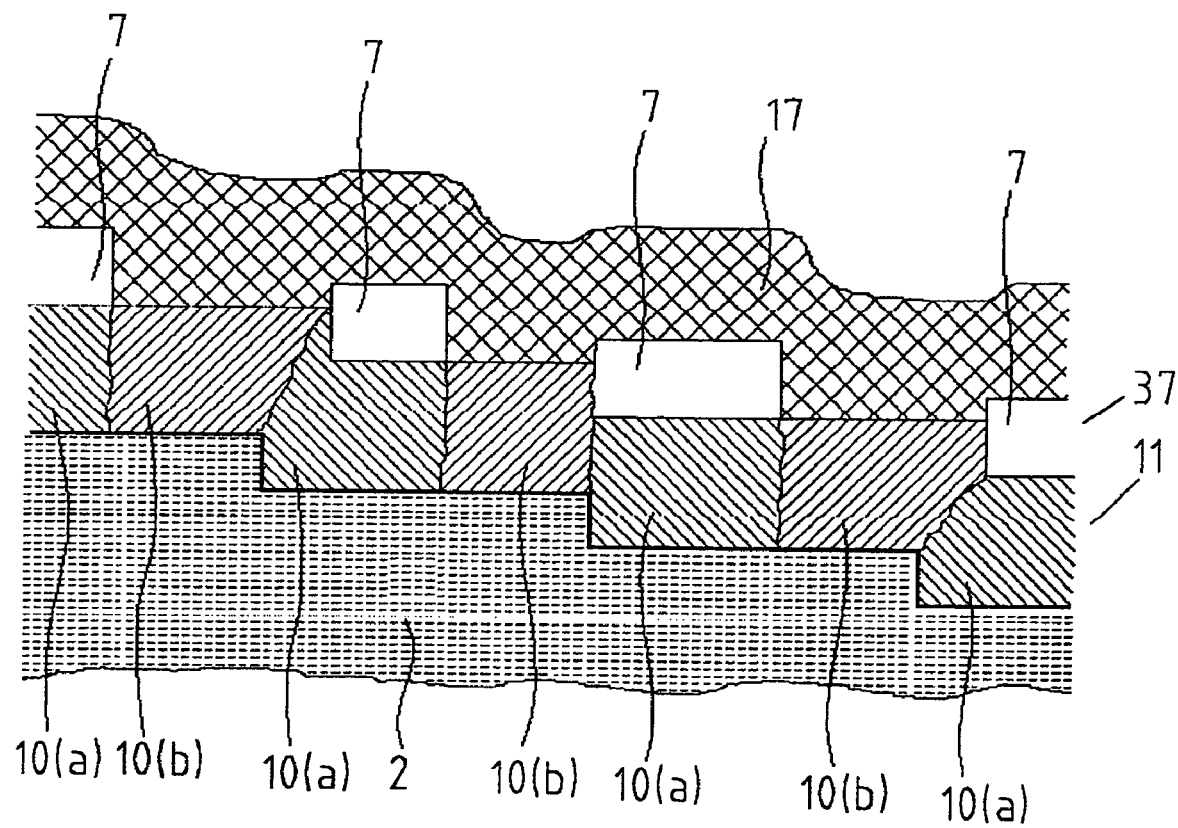
Figure 33:
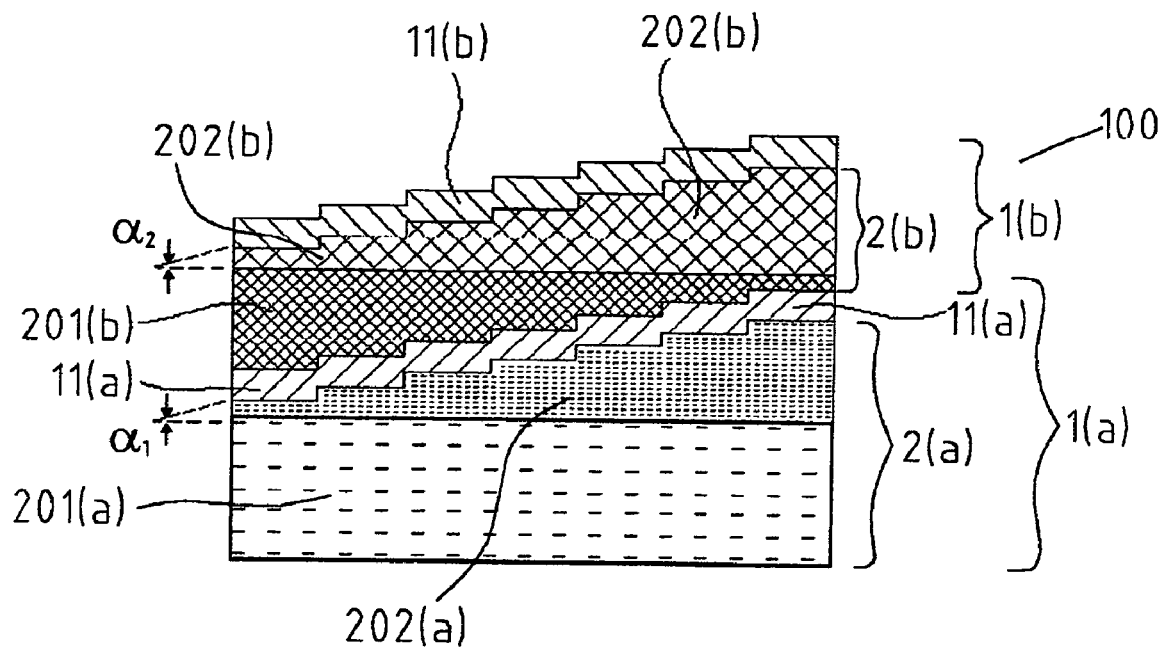
Figure 34:
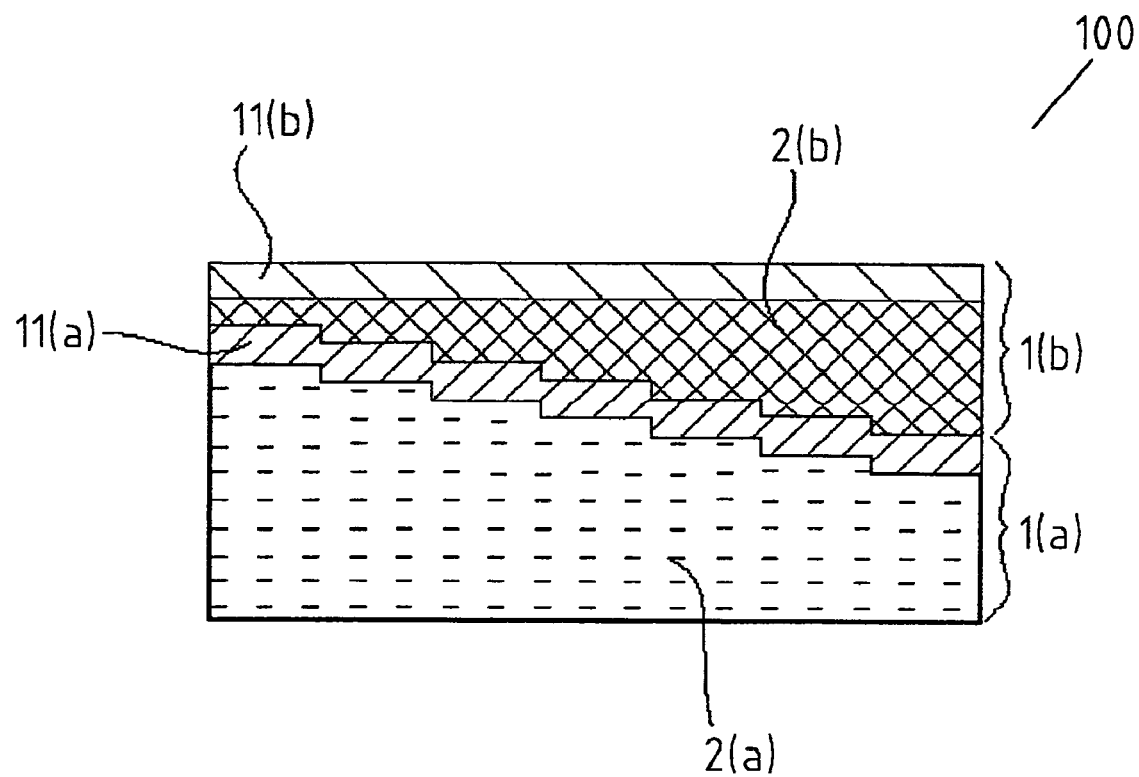

FIGS. 11 a, b, c, d illustrate magnetoresistance of $Fe_3O_4$ film grown on MgO(100) measured for current along the miscut direction for sample temperatures of 293, 130, 101.5 and 100 K respectively. The magnetic field is parallel to the current direction. The miscut angle is 1 degree and the miscut direction is along <110>;

FIGS. 12 a, b, c, d show the magnetoresistance measured for current directed perpendicular to the miscut direction (i.e. parallel to the terrace steps) for the same film of FIG. 11 for sample temperatures of 293, 130, 101.5 and 98 K respectively substantially equivalent to the temperatures in FIGS. 11 a, b, c, d. The magnetic field is parallel to the current direction. The miscut angle is 1 degree and the miscut direction is along <110>;

FIGS. 13 a and b illustrate the magnetoresistance of $Fe_3O_4$ film grown on MgO(100) measured for current along the miscut direction. The miscut angle is 0.4618 degrees and the miscut direction is along <110>. The magnetic field is parallel to the current direction. FIGS. 13a and 13b correspond to the sample temperatures of 114.8 and 102 K respectively;

FIGS. 14 a and b show magnetoresistance measured for current directed perpendicular to the miscut direction for the same film as of FIG. 13 for sample temperatures of 110.6 and 100 K respectively. The magnetic field is parallel to the current direction;

FIGS. 15 a and b illustrate magnetoresistance of $Fe_3O_4$ film grown on MgO(100) (sample Mg14M2) measured for current along the miscut direction for sample temperatures of 109 and 105 K respectively. The magnetic field is parallel to the current direction;

FIGS. 16 a and b illustrate magnetoresistance measured for current directed perpendicular to the miscut direction for the same film as in FIG. 15 for sample temperatures of 109 and 105 K respectively. The magnetic field is parallel to the current direction;

FIGS. 17 a and b illustrate magnetoresistance of $Fe_3O_4$ film grown on MgO(100) (sample Mg14M3) measured for current along the miscut direction for sample temperatures of 109 and 105 K respectively. The magnetic field is parallel to the current direction;

FIGS. 18 a and b illustrate magnetoresistance measured for current directed perpendicular to the miscut direction for the same film as of FIG. 17 for sample temperatures of 109 and 105 K respectively. The magnetic field is parallel to the current direction;

FIGS. 19 a and b illustrate magnetoresistance of $Fe_3O_4$ film grown on MgO(100) (sample Mg14M3) measured for current along the miscut direction for sample temperatures of 109 and 105 K respectively. The current polarity is reversed with respect to the one in FIG. 17;

FIGS. 20a and b illustrate magnetoresistance measured for current directed perpendicular to the miscut direction for the same film as of FIG. 19 for sample temperatures of 109 and 105 K respectively. The current polarity is reversed with respect to the one in FIG. 18;

FIG. 21 is a cross-section through portion of a magnetoresistive medium according to the invention;

FIG. 22 is a view similar to FIG. 21 with an external magnetic field applied;

FIG. 23 is a view similar to FIG. 21 of an alternative construction of magnetoresistive medium;

FIG. 24 is a schematic representation similar to that shown in FIG. 21 of adatoms of a layer deposited on the substrate before they arrive at equilibrium positions. Adatoms located at the outer and inner edges of a terrace step are shown;

FIG. 25 shows formation of the closed fractional layer at the inner edges of terrace steps;

FIG. 26 is a perspective view of a closed fractional layer formed at the inner edges of the terrace steps of FIG. 25;

FIG. 27 is a diagrammatic representation of portion of another magnetoresistive medium during its formation with a closed fractional layer at the outer edges of the terrace steps;

FIG. 28 is a cross sectional view of another magnetoresistive medium according to the invention;

FIG. 29 is a cross sectional view of portion of another magnetoresistive medium according to the invention;

FIG. 30 is a cross sectional view illustrating a method of forming a magnetoresistive medium according to the invention;

FIG. 31 is a diagrammatic representation of a device for forming a magnetoresistive medium according to the invention;

FIG. 32 is a cross sectional view of portion of an alternative magnetoresistive medium according to the invention;

FIG. 33 is a typical sectional view of a composite magnetoresistive medium comprising a stack of two of the media of the invention, and FIG. 34 is a cross sectional view through another composite magnetoresistive medium according to the invention.

In this specification, the term "vicinal" is used not simply in its common meaning of "neighbouring" or "adjacent" but also as a reference to the characteristics of the terraces formed by subsequent treatment of a miscut substrate. Thus, the phrase "the extent to which the substrate is vicinal" implies, as will be appreciated by those skilled in the art, how formed; what size; how mutually arranged; and so on. There is no one term which can describe how the vicinal surface is treated to achieve the desired terraces, so much depends on the substrate material. This is explained in detail in the specification. Again, as explained throughout the specification, the treatment is not uniform and indeed it is not always a treatment as such, but a selection process.

It appears that much attention has been paid to electron transport in films grown on vicinal substrates. There are several studies that address the issue of electron transport and even magneto-transport in low-dimensional vicinal systems. Usually they deal with the fundamental questions of physics and quantum mechanics as opposed to tackling the practical issues of increasing magnetoresistance in films. These studies often relate to semiconductor systems performed under the presence of very high magnetic fields of up to 30 Tesla and very low temperature. A study by RTF van Schaijk et al. published in Physics B 256-258 (1998) 243-247 is a good example of such an investigation. It deals with Shubnikov-de Haas oscillations. However, their use for the purpose of the present invention is not described in the literature.

Accordingly, "the extent to which the surface is vicinal" means the materials are chosen, various miscut angles are used, various treatments of the cut surface are performed and an optimum cut angle and treatment is determined to provide the necessary interaction between the film and the substrate to achieve the objects of the invention. Because the materials will change and the treatments will vary, all one can state is that the optimum cut angle and treatment is used to provide this vicinal surface, as again described in the specification. A convenient term for this could be "vicinal treatment" or "vicinally treated" to cover choosing for the combination of film and substrate, the correct miscut angle and miscut direction and the subsequent treatment of the substrate to provide the necessary main nanowires in accordance with the invention.

In this specification, the term "film" and "layer" are used interchangeably. A film or layer which does not cover totally the surface to which it adheres, is referred to as a fractional film. There is a difficulty in nomenclature when one refers to "vicinal surfaces", "atomic terraces" and "terrace steps". "The vicinal surface consists of " atomic terraces. Therefore, each atomic terrace is a relatively flat area of the vicinal surface. As it will be explained below, in practice atomic terraces are not perfectly flat and contain atomic corrugations, defects, adsorbates and atomic-scale surface reconstructions, however, at this point this is not essential. The separation between the neighbouring atomic terraces in the vertical direction, i.e. in the direction perpendicular to the atomic terraces is called terrace step. The dimension of the terrace step is typically comparable to the separation between the layers of atoms forming crystal lattice (typically 2 Å the same as 0.2 nm the same as $2 \times 10^{-10}$ m), i.e. it is comparable to the interatomic distance although it can also be a small integer multiple of this in the case of bunched steps or multiple steps.

For example, it could be double or triple or quadruple of the separation between the layers of atoms in the crystal structure. On the other hand, the width of the atomic terraces is typically considerably greater than the interatomic distance, e.g. it would be at least 1 nm or more typically 10 to 50 nm or even greater than 100 nm. This is shown schematically in FIGS. 1 and 2, discussed in more detail below. However, in order to make the figures more readable, the widths of all the atomic terraces are typically shown reduced. The term "width" is used in the technology to describe the dimension which, in common usage for terraces such as those in buildings, would be used to describe the depth of the terrace, the term "width" being used more commonly to define the lateral extent of the terrace. For example, in FIGS. 1 and 2 the width of the atomic terraces are shown only some three times greater than the terrace steps which would make them only 0.6 nm wide, that is to say they are exceptionally narrow terraces in practical terms. They are of atomic and nanometer scale, the step height being of atomic and the width of nanometer scale. In a vicinal surface, the direction of the rising steps typically persists unchanged over a relatively large area. For example, the step to the left between atomic terraces is always a rising or always a falling step throughout many atomic terraces. It should be appreciated that the order of subsequently rising or subsequently falling steps is not perfectly preserved between all the atomic terraces. For example, in a typical vicinal surface rising steps may be followed by one or two falling steps and then by another rising steps and then perhaps by another falling step, etc. It should also be appreciated that macroscopically a vicinal surface is typically not parallel to the individual atomic terraces.

It should be noted that, strictly speaking, while in the present specification the reference is to a magnetoresistive medium, all that is illustrated is portion of the magnetoresistive medium.

In this specification, the term "ferromagnetic", as is often the case is used, to encompass both ferromagnetic and ferrimagnetic materials. As those skilled in the art will know, the difference in the materials is that the ferrimagnetic material has more than one magnetic sub-lattice. Both materials have net spontaneous magnetic moments below their Curie temperatures. Sometimes the Curie temperature of a ferrimagnetic material is called Neel temperature and the ferrimagnetic materials are sometimes called ferrites. A well-known example of a ferrimagnetic material is $Fe_3O_4$.

The term "crystalline" is used somewhat loosely in relation to the magnetoresistive medium according to the invention. In general, in relation to the substrate, the word "crystalline"

means: a single crystal, that is to say, a crystal with axes that have the same direction at different parts of the crystal. In relation to some of the films used, the word "crystalline", as well as a single crystalline, i.e. an epitaxial film, can also mean "polycrystal", that is to say, crystal with axes which may change direction at different parts of the film. Such polycrystal is composed of grains of tiny single crystals.

Figure 1:
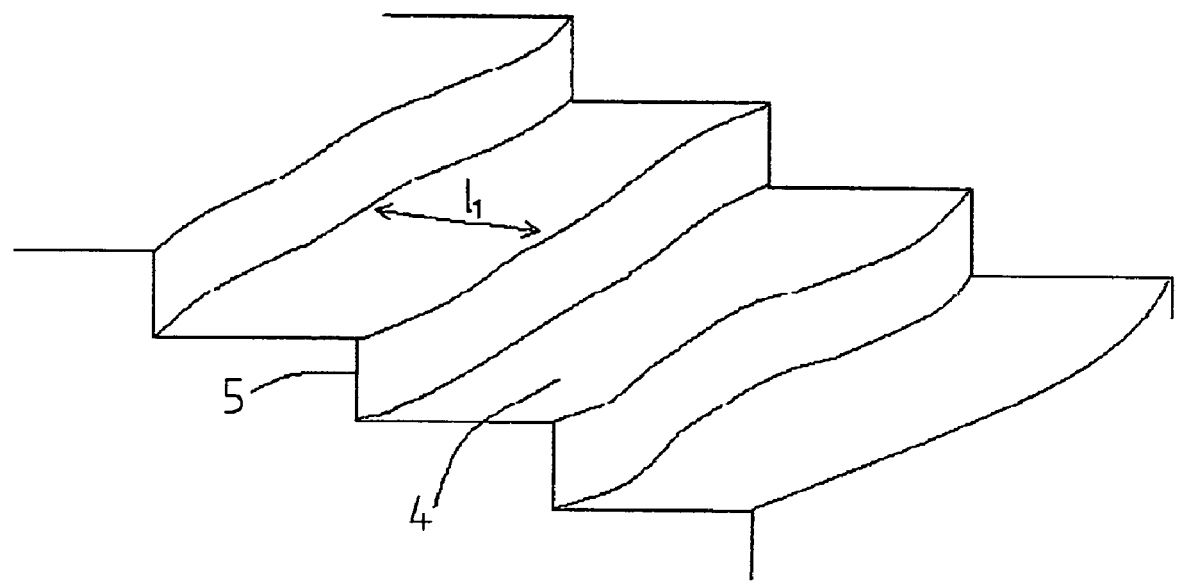
FIG. 1 is a perspective view of a typical vicinal surface of a substrate.
Figure 2:
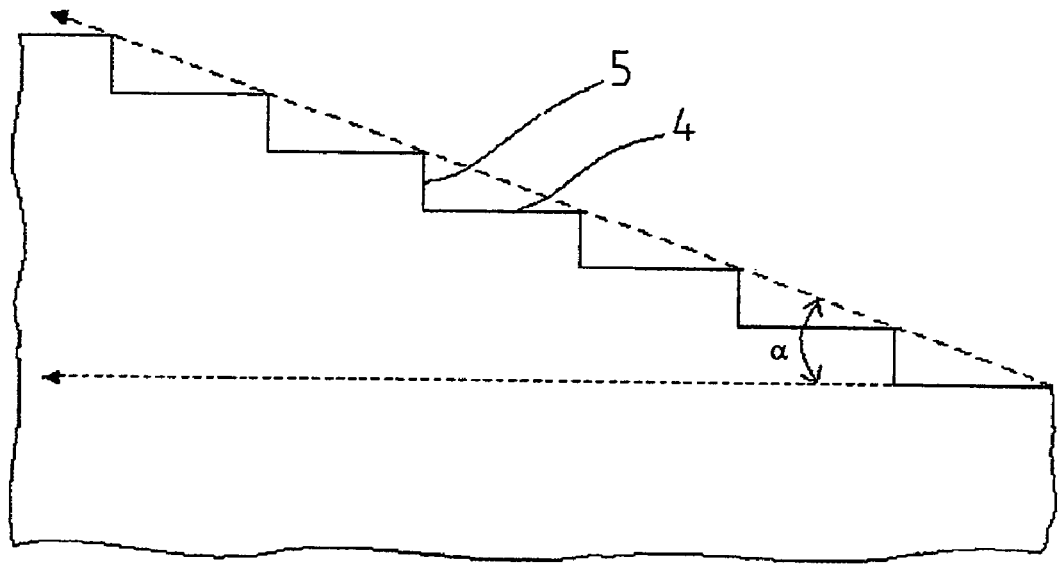
FIG. 2 is a cross section perpendicular to the terrace steps of the vicinal substrate.

FIGS. 1 and 2 show schematically an example of a vicinal surface, indicated generally by the reference numeral 3. The vicinal surface 3 consists of terraces with low Miller indexes called in this specification, atomic terraces 4. The atomic terraces 4 are separated by terrace steps 5 in the vertical direction, i.e. in the direction perpendicular to each atomic terrace. Vicinal surfaces can be formed for numerous crystalline materials. Atomic terraces can be formed to have various Miller indexes, e.g. (100), (110), (111) are common indexes for atomic terraces. Terraces with certain indexes can be formed readily, terraces with other indexes cannot. This depends on the surface energy of different atomic terraces, which in turn depends on the crystal structure of the material. Atomic terraces can readily be visualized by a Scanning Tunnelling Microscope (STM) on electrically conducting materials and by an Atomic Force Microscope (AFM) on conducting and insulating ones. Many researchers including some of the inventors have studied atomic terraces extensively, e.g. [S. Murphy, D. M. McMathuna, G. Mariotto, I. V. Shvets, Physical Review B, 66 (19) 195417 (2002), Morphology and strain induced defect structure of ultrathin epitaxial Fe films on Mo(110)]. The vicinal surface is characterized by the miscut direction, i.e. crystallographic direction of the terrace steps. For example, (001) surface in principle may have steps aligned along the <100> or <110> direction or along numerous other directions. Again, certain directions of terrace steps can be readily attained and others cannot. The result depends mainly on the crystallographic indexes of the atomic terraces and the type of material. It should be appreciated that for most surfaces the terrace steps are not perfectly straight. Nonetheless, for many surfaces the average representative direction of the terrace steps can be readily identified. Each terrace is characterized by the terrace width. In FIG. 1, the terrace width of one of the terraces is shown as $l_1$. It is clear that the same terrace at different locations may have different widths, as the terrace steps in practice often do not form perfectly straight lines parallel to each other. Nonetheless, the average representative terrace width can often still be identified for the surface. This is related to the so-called average miscut angle. The miscut angle is identified in FIG. 2 by the letter $\alpha$. FIG. 2 represents a cross-section of the surface perpendicular to the terrace steps. Generally, the greater the miscut angle, the smaller the average width of atomic terraces. The relative width $l_1$ of the terrace 4 is many times greater than the depth of the step 5 and not as shown in FIGS. 1 and 2, as explained above.

Figure 3:
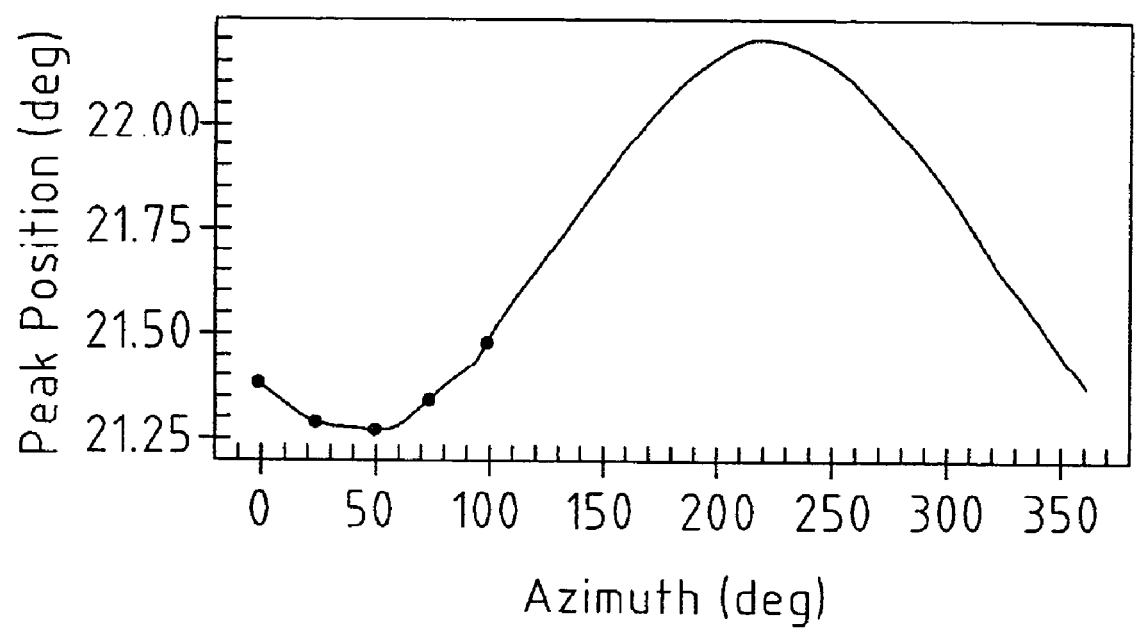
FIG. 3 illustrates HRXRD characterization of the miscut for (100) surface of MgO single crystal.

Methods of forming vicinal surfaces have been extensively described in the literature. Generally, the methods are based on cutting the surface at a desired angle with respect to the low index direction by diamond saw, spark erosion or another suitable technique and polishing the surface, e.g. by using diamond paste, or by means of electrochemical polishing. Then the surface is characterized by means of a High Resolution X-Ray Diffractometer (HRXRD). For the present invention, a HRXRD instrument from Bede Scientific Instruments Ltd (UK) was used. The miscut angle and the direction of the miscut, i.e. the direction on the surface perpendicular to the average terrace step is identified using the HRXRD. FIG. 3 shows an example of the HRXRD characterization of the MgO surface miscut. Because of the miscut, the angular position at which diffraction is found to vary as the specimen is rotated about its surface normal. The angular positions for different azimuthal positions are optimised. A sine curve can be fitted on the plot of peak positions against the azimuth. The miscut is the angle amplitude of the sine wave and the position of the maximum gives the direction of the miscut. The HRXRD peak split software incorporates a utility for analysing such data. FIG. 3 shows a typical curve fitting for the miscut measurement. In this case the MgO(100) substrate has the miscut angle of 0.4563 degrees. The minimum tilt is at azimuth of 42.117 degrees and the maximum tilt is azimuth of 222.618 degrees. The miscut direction is then measured from the positions of the intensity minimum or maximum once crystallographic directions on the surface are identified from the asymmetric peaks. These procedures for identifying the miscut are standard and are known to specialists in the field.

To establish terraces on a miscut substrate, treatment leading to the atomic scale rearrangement is often required. There are numerous approaches resulting in such a rearrangement. According to one method, the surface may be annealed in vacuum or in ultra high vacuum. In between the annealing sessions it can be characterized by using in-situ scanning tunnelling microscopy, STM, i.e. the STM located inside the vacuum system. Another method includes ion etching of the surface kept at an elevated temperature by means of e.g. Ar ions in vacuum [J. Naumann, J. Osing, A. Quinn, I. V. Shvets, Morphology of sputtering damage on Cu(111) studied by scanning tunnelling microscopy, Surface Science 388 (1997) 212-219] which is included in this specification by way of reference. Alternatively, a chemical reaction can be set up on the surface such that the reaction speed is dependent on the Miller indexes of the atomic terraces. As a result, well-defined terraces can be formed. Other possible methods also include subjecting the surface to chemical or electrochemical reaction. There is no general hard rule of finding the conditions for the preparation of a vicinal surface with well-defined terraces. The conditions are generally optimised for any given material and desired Miller indexes of the atomic terraces.

Miscut and polished $SrTiO_3(100)$ substrate is first washed in distilled water in another method. Then it is subjected for about 30 seconds exposure in a buffered hydro-fluoric acid at room temperature. The substrate is then rinsed in distilled water. This procedure results in well-defined atomic terraces. To make the edges of the terraces straight, the substrate may be further subjected to between 1 and 4 hours of anneal in oxygen atmosphere at 1 Bar pressure at a temperature of 1000° C.

A vicinal substrate of Si (111) can also be formed by means of anneal. Typical preparation includes annealing of a polished miscut substrate in an ultrahigh vacuum chamber at a temperature of 1050° C. for some 1 hour. Then the substrate is quickly annealed (flashed) at 1250° C. for 20 seconds also in an ultra high vacuum.

Vicinal substrates of another commonly used material: $\alpha$-$Al_2O_3$ with a (0001) orientation can also be prepared by means of anneal. For this material the anneal needs to be carried out in air and the anneal temperature is 1000° C.

It is known that hysteresis loops of a miscut surface depend on the direction of the magnetic field with respect to the miscut direction. Measurements were performed by means of longitudinal magneto-optical Kerr effect. The sample was epitaxial film of Fe grown on the single crystal Mo(110) vicinal substrate. The miscut direction is <1-1-1> and the miscut angle is 4.6 degrees. We established that atomic terrace steps induce noticeable contribution to the magnetic anisotropy of Fe film for the film thickness of up to 10-12 Å.

In one representative experiment described below, the magnetoresistance of thin films of $Fe_3O_4$ (magnetite) deposited on MgO (100) vicinal substrates was measured. In this case the vicinal MgO (100) substrates had a miscut direction along <110> and varying miscut angles. The accuracy of the surface orientation was within +0.5 degrees. The film thickness was 70 nm.

Figure 4:
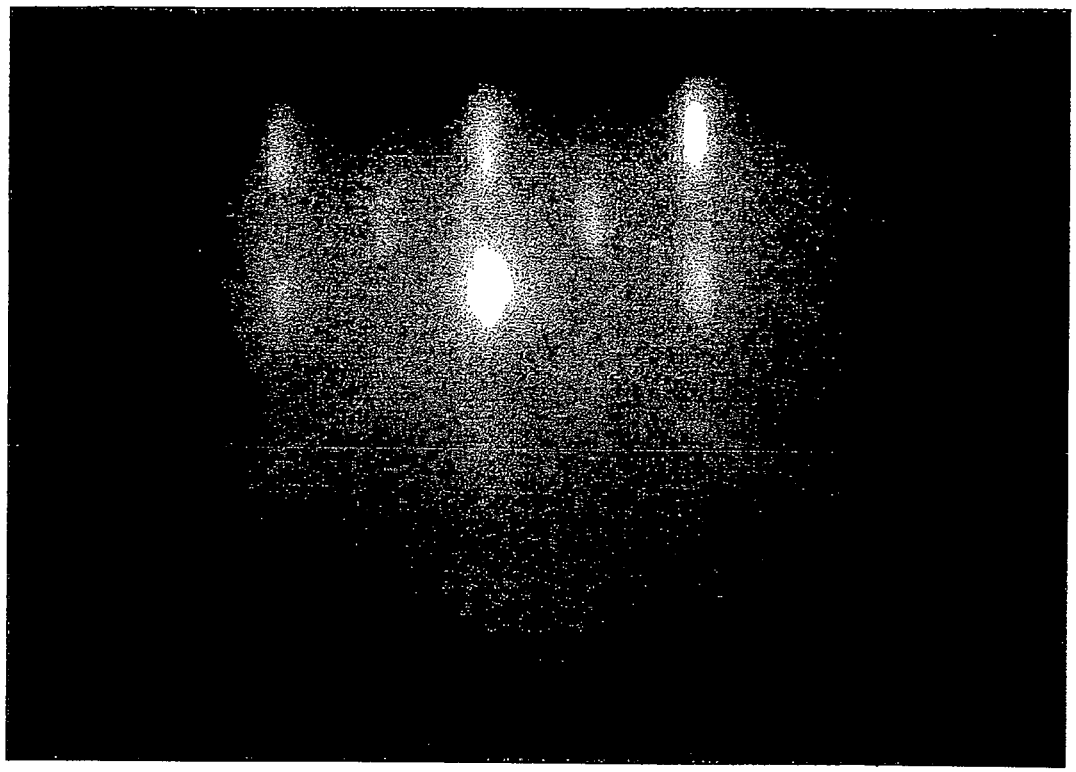
FIG. 4 shows RHEED pattern for the MgO(100) substrate measured in <110> azimuth.
Figure 5:
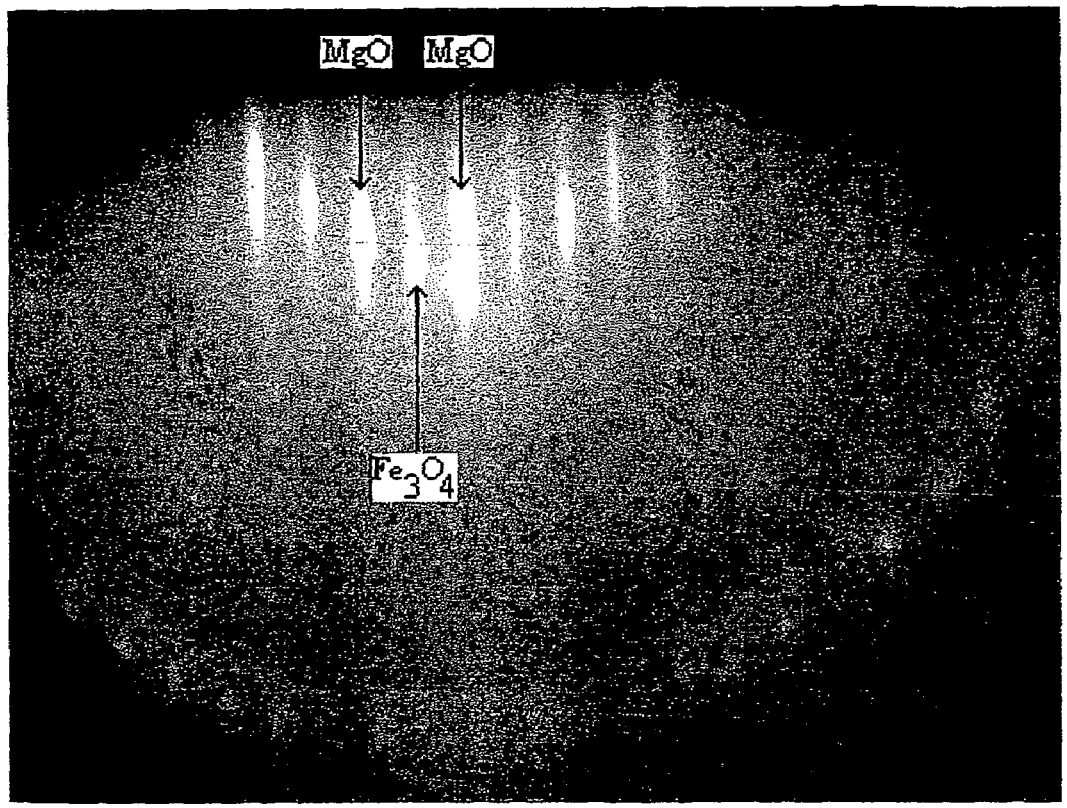
FIG. 5 shows RHEED pattern for the epitaxial $Fe_3O_4$ (100) film grown on MgO(100) substrate in <110> azimuth.

Prior to insertion into the MBE chamber, substrates were chemically cleaned and mounted on a molybdenum sample holder. The film was deposited using Oxygen-Plasma-Assisted Molecular Beam Epitaxy (MBE) using the MBE system manufactured by DCA (Finland). The MBE system was equipped with facilities for sample heating, Reflection High Energy Electron Diffraction (RHEED), residual gas analyser (RGA), molecular beam sources for deposition of materials, deposition rate monitors as well as an Electron Cyclotron Resonance (ECR) oxygen plasma source. The base pressure in the system was lower than $5 \times 10^{-10}$ Torr. The oxygen source used for the growth was the Radio Frequency (RF) OS Pray Plasma source from Oxford Scientific (UK). The RF power supplied to the source was 80 W during the deposition. The MgO substrate was annealed at 600° C. for up to 4 hours in a plasma oxygen environment at the pressure of $1 \times 10^{-5}$ Torr prior to the deposition. In most cases the same level of RF power was applied to the plasma source during the substrate annealing. For some samples no RF power was supplied to the plasma source during the substrate annealing. Out of the samples referred to in this specification, sample Mg14M2 and Mg14M3 were annealed without any RF power and all the other samples were annealed at 80 W of RF power. FIG. 4 shows the RHEED pattern of the MgO single crystalline substrate along the <110> azimuth after the above-mentioned cleaning procedure. It shows vertical lattice rods and radial Kikuchi lines indicative of a well ordered and reasonably flat surface. The magnetite film was deposited by means of e-gun evaporation from an Fe pellet with a purity of 99.995% in a plasma oxygen environment with the pressure of $1 \times 10^{-5}$ Torr and the substrate temperature of 250° C. The growth rate was 0.3 Å/sec. The growth mode and the crystalline quality of the films were monitored in-situ by reflection high-energy electron diffraction (RHEED). The film thickness was controlled by quartz-crystal thickness monitors, which were calibrated with the growth rate measured using RHEED intensity oscillations. After the deposition the film was kept at the same temperature for about 10 minutes in the MBE chamber. The magnetite film grown under these conditions is epitaxial. After the growth of 10 monolayers of iron oxide thin films, the RHEED pattern shows half order lattice rods, located in the middle of the lattice rods corresponding to MgO, indicating the formation of $Fe_3O_4$ (see FIG. 5). The lattice constant of magnetite as determined from RHEED is 8.4±0.1 Å. The appearance of half order streaks is accompanied by the oscillations in the intensity of the specular reflected beam, which confirms that the film grows in layer-by-layer mode.

The structural characterization was done using the high-resolution X-ray diffraction (HRXRD) measurements. With the HRXRD, when operated in a triple axis configuration one can detect lattice constant variations as low as $2 \times 10^{-5}$. This enables one to determine the status of the strain relaxation very precisely. The crystalline alignment of the film with respect to the substrate can also be established. The in-plane ($a_{//}$) and out-of-plane ($a_\perp$) lattice parameters of the $Fe_3O_4$ thin films grown epitaxially on (100) MgO substrates were measured by performing symmetric (400), (800) and asymmetric (622) and (420) Bragg reflections.

Figure 6:
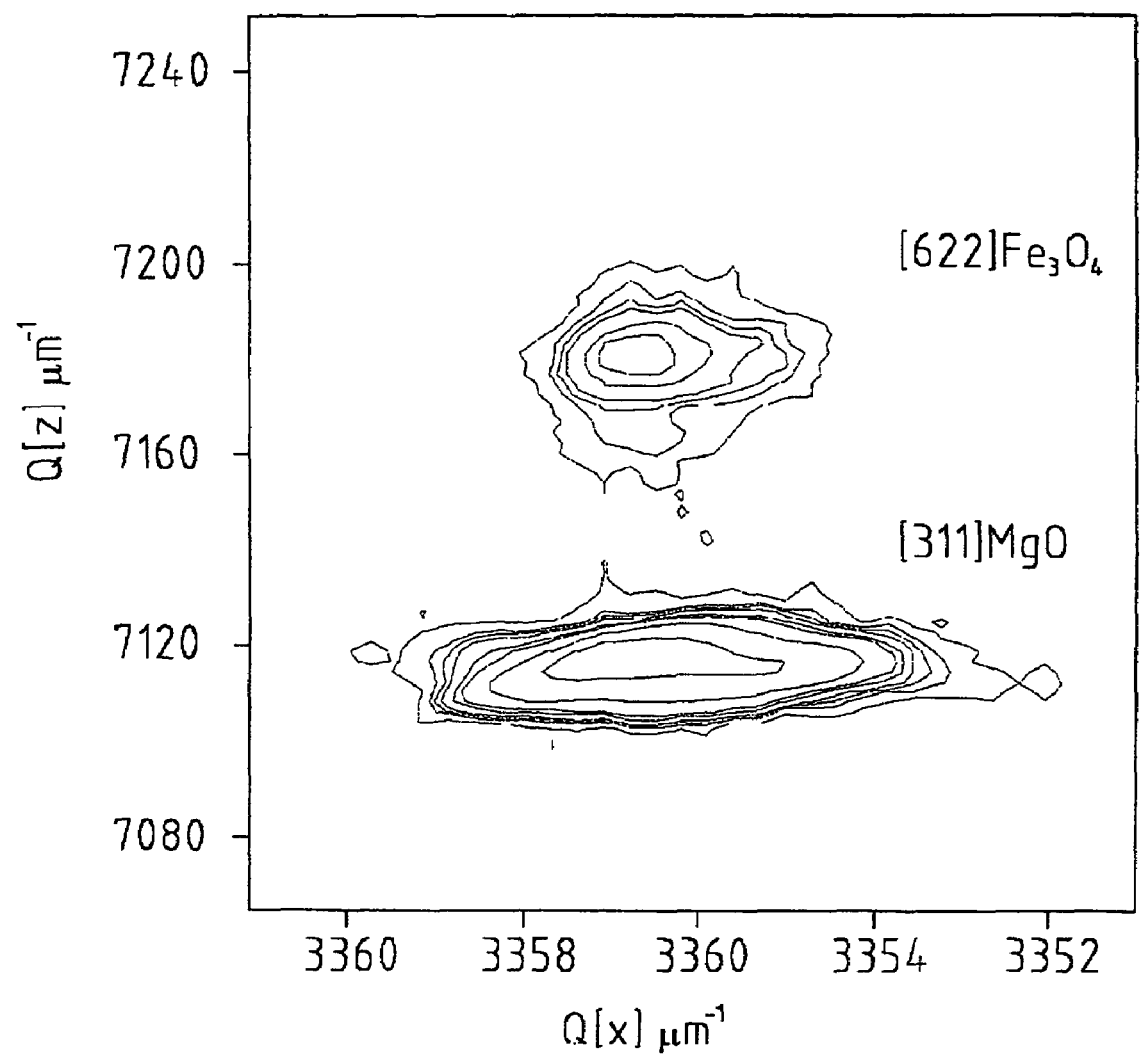
FIG. 6 is a reciprocal space map of 70 nm thick $Fe_3O_4$ film on MgO (100) substrate measured in grazing exit geometry for the asymmetric (311)/(622) diffraction planes.
Figure 7:
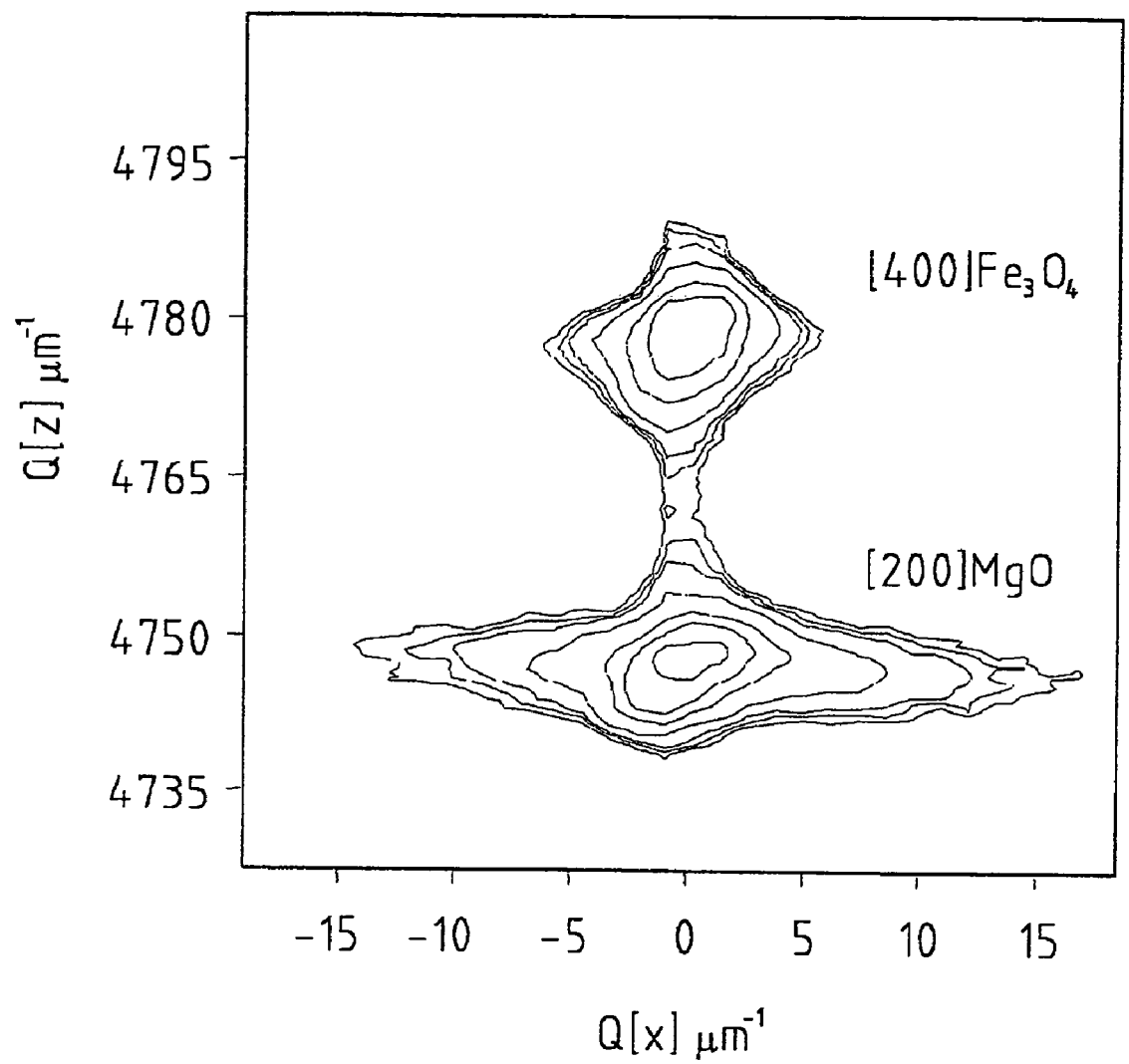
FIG. 7 is a reciprocal space map of 70 nm thick $Fe_3O_4$ film on MgO (100) substrate measured for the symmetric (200)/(400) diffraction planes.

We have established that for $Fe_3O_4$ films grown on MgO (100) substrates under the growth conditions described are fully strained to achieve one-to-one registry with the substrate for film thickness up to 100 nm and even greater. The representative results of the HRXRD measurements of a 70 nm thick film at room temperature are shown in FIGS. 6 and 7. In order to determine the in-plane lattice parameters, $a_{//}$, of the film, we have performed a reciprocal space map, RSM, around the (311) diffraction peak of the substrate located in the vicinity of (622) peak of the over layer. The RSM was obtained by measuring a number of $_\omega$-$2_\theta$ scan for different $_\omega$ offset values. FIG. 7 shows the RSM of 70 nm thick $Fe_3O_4$ film grown on MgO (100) for the asymmetric (311)/(622) Bragg reflection performed for grazing exit geometry ($_\omega$=62.5685°, $2_\theta$=74.6582°). The reciprocal lattice vectors Q(x) and Q(z) represents the in-plane (110) and out-of-plane (100) directions respectively. From the position of the thin film peak in the RSM along Q(x) and Q(z) directions and independent $_\omega$-$2_\theta$ scan measured for grazing exit (GE) and grazing incidence (GI) geometries, we determined the in-plane lattice parameter of the film. The $a_{//}$(0.8426 nm) estimated from the RSM, within the experimental accuracy, is exactly twice the substrate lattice constant. This indicates that the film has the same in-plane lattice constant that of substrate and is fully coherent (pseudomorphic) with the substrate.

FIG. 7 shows the RSM for the 70 nm thick $Fe_3O_4$ film on MgO performed along the (200)/(400) Bragg reflection to determine the out-of plane lattice parameter, $a_\perp$, of the film. The strong sharp peak corresponds to (200) peak of MgO and other weaker one at higher Q(z) position corresponds to the (400) peak of $Fe_3O_4$ thin film. The full width at half maximum (FWHM) of the MgO (200) and $Fe_3O_4$ (400) determined from independent $_{107}$-$2_\theta$ scan are 0.0052° and 0.01360 respectively. The small FWHM for the thin film indicates that the films grown are of high crystalline quality. The value of $a_\perp$ for the $Fe_3O_4$ thin film determined from the film peak position along Q(z) direction in the RSM and film-substrate peak separation (0.14605°) from independent $_\omega$-$2_\theta$ scan is 0.83717 nm. This value is consistent with the $a_\perp$ value determined from the asymmetric (311)/(622) GE and GI scans.

The results of the HRXRD characterization can be summarized as follows: the film is single crystalline with the tetragonally distorted unit cell. The strain is tensile in the film plane and the film is fully strained. The volume of unit cell is a good indication of the film stoichiometry and is consistent with the bulk magnetite suggesting that the film is stoichiometric.

Figure 8:
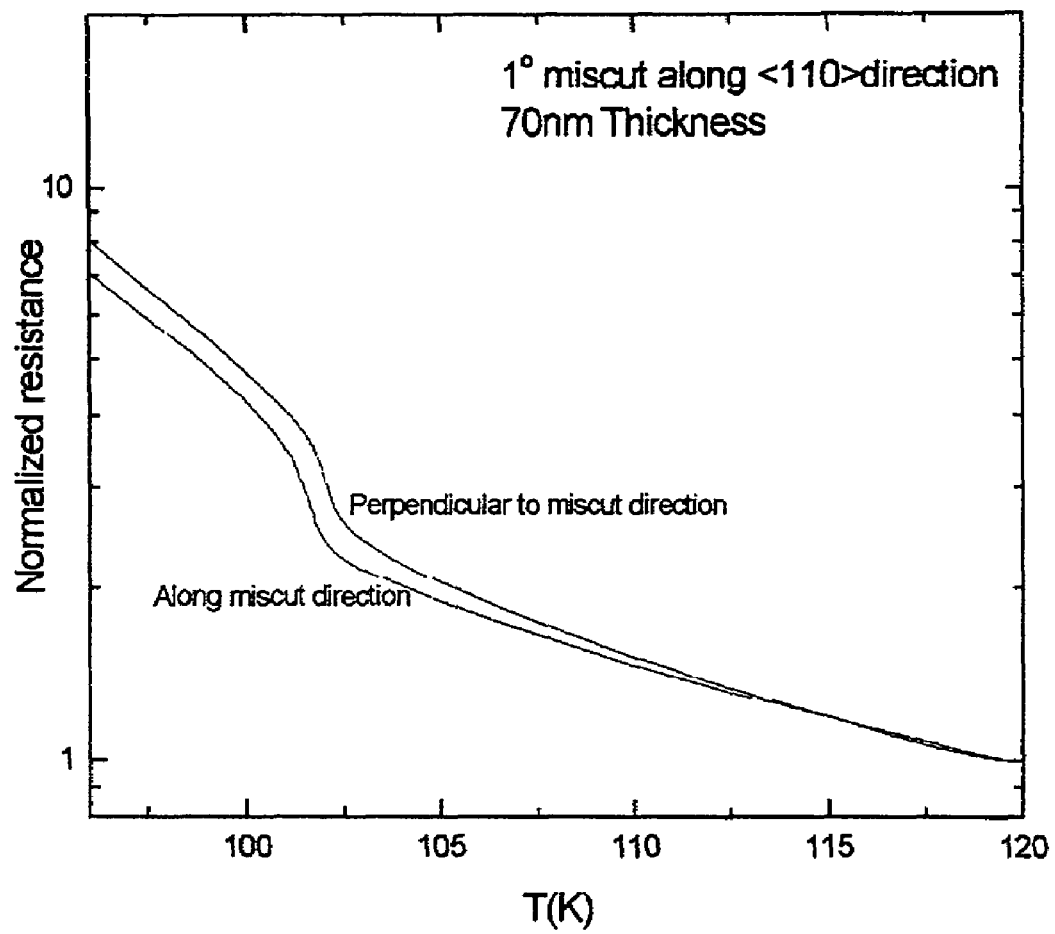
FIG. 8 shows the dependency of normalized resistance R(T)/R(120K) as a function of temperature for the magnetite film.

FIG. 8 shows representative normalized resistance as a function of temperature for $Fe_3O_4$/MgO(100) film. This was measured for the 70 nm thick film. The result is included in the specification to demonstrate that the film grown under conditions as described above, is indeed magnetite. The change in the slope of the R(T) curve is Verwey transition, is an indication of a high quality $Fe_3O_4$ film. The Verwey temperature is 101.8 K. The Verwey temperature in thin films of magnetite is known to be lower than in bulk. The very fact that a clear Verwey transition is visible in the R(T) curve is an indication of a very good stoichiometry ratio in the film. It is interesting to note that the temperature dependences of the resistance along and perpendicular to the miscut direction differ.

Figure 9:
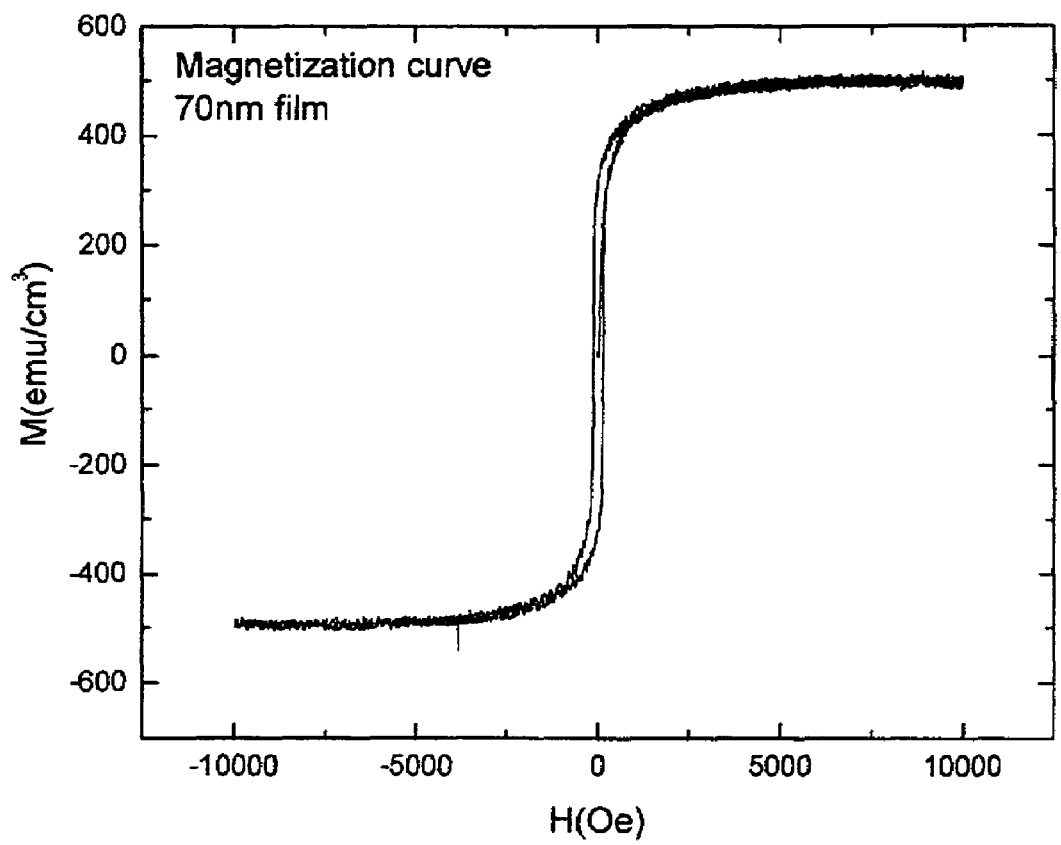
FIG. 9 shows the dependency of the magnetization on the in-plane magnetic field measured at room temperature.

FIG. 9 shows the magnetization as a function of the in-plane magnetic field for the same representative film as the one referred to in FIGS. 6-8. The measurements suggest that the value of the saturation magnetization $M_s$ is also consistent with that of magnetite. The value measured is ~470 emu/cm³ (within 2% error) at room temperature.

Figure 10:
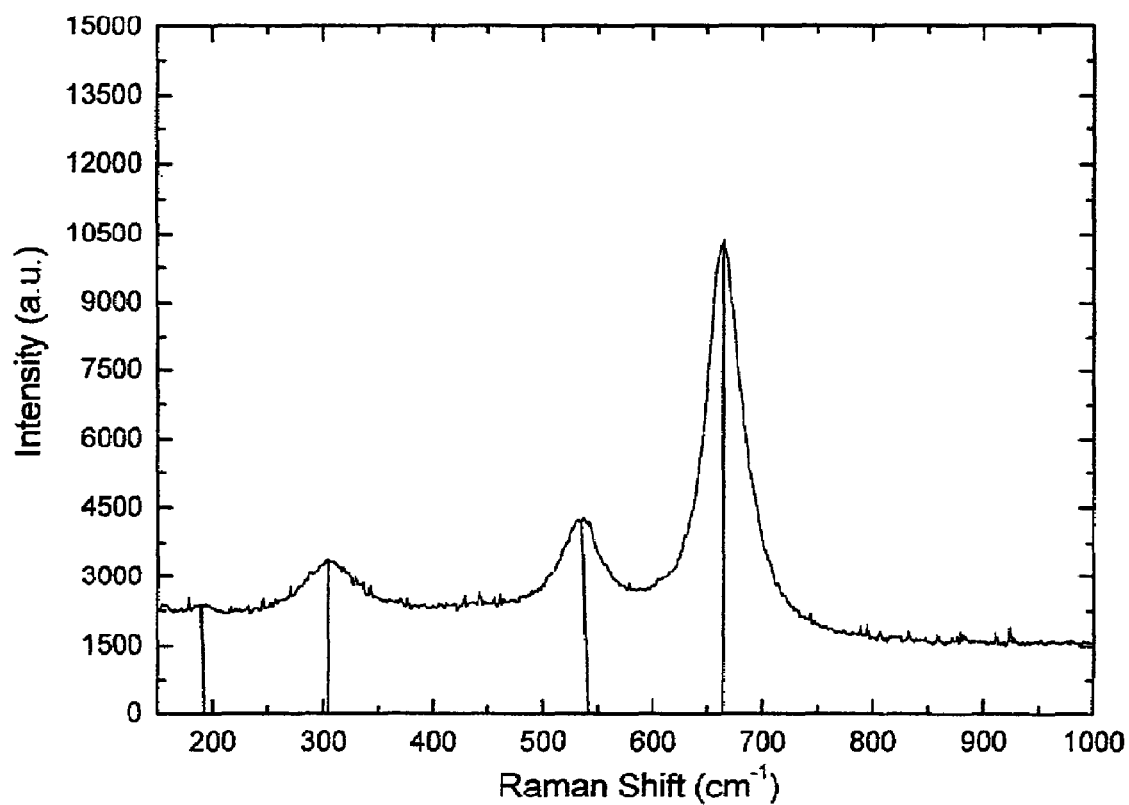
FIG. 10 is a representative Raman spectrum of magnetite film $Fe_3O_4$/MgO(100)

The Raman optical spectrum for the film is shown in FIG. 10. Raman spectroscopy was used as an additional tool to ascertain the magnetite phase. The representative Raman spectra of thin films grown under conditions as described above, showed bands corresponding to $Fe_3O_4$ phase observed at 668, 537, 308 and 192 $cm^{-1}$, consistent with the spectrum of magnetite. Predictably, the observed values of Raman bands correspond to somewhat lower wave numbers than the ones observed for bulk single crystals of $Fe_3O_4$ and are representative of in-plane tensile strain. There was no signature of any other iron oxide phase present in the spectra.

This invention is not limited to magnetic oxides or to stoichiometric magnetite in particular. This specification describes a general phenomenon and how it can be exploited to form a magnetoresistive medium. Magnetite is just one example of magnetic material that utilizes the phenomenon.

Figure 11A:
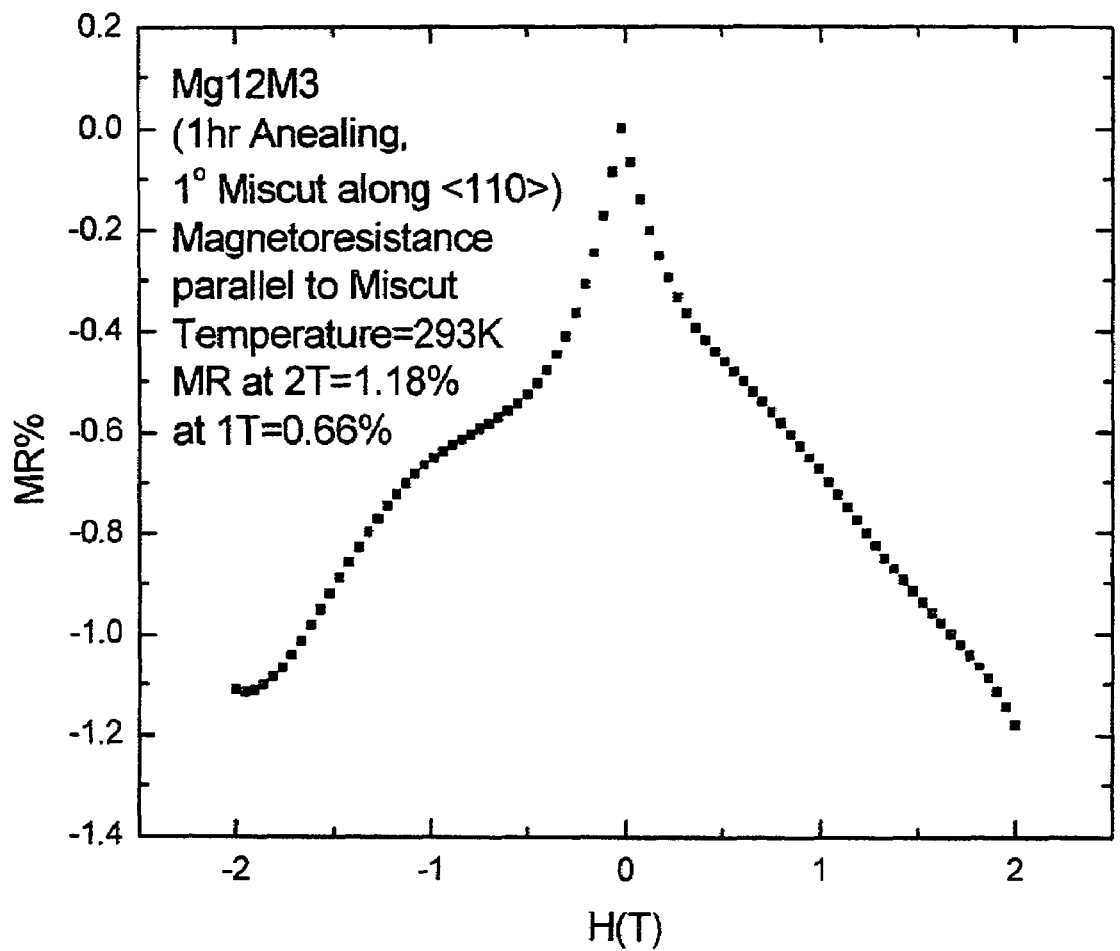
Figure 11B:
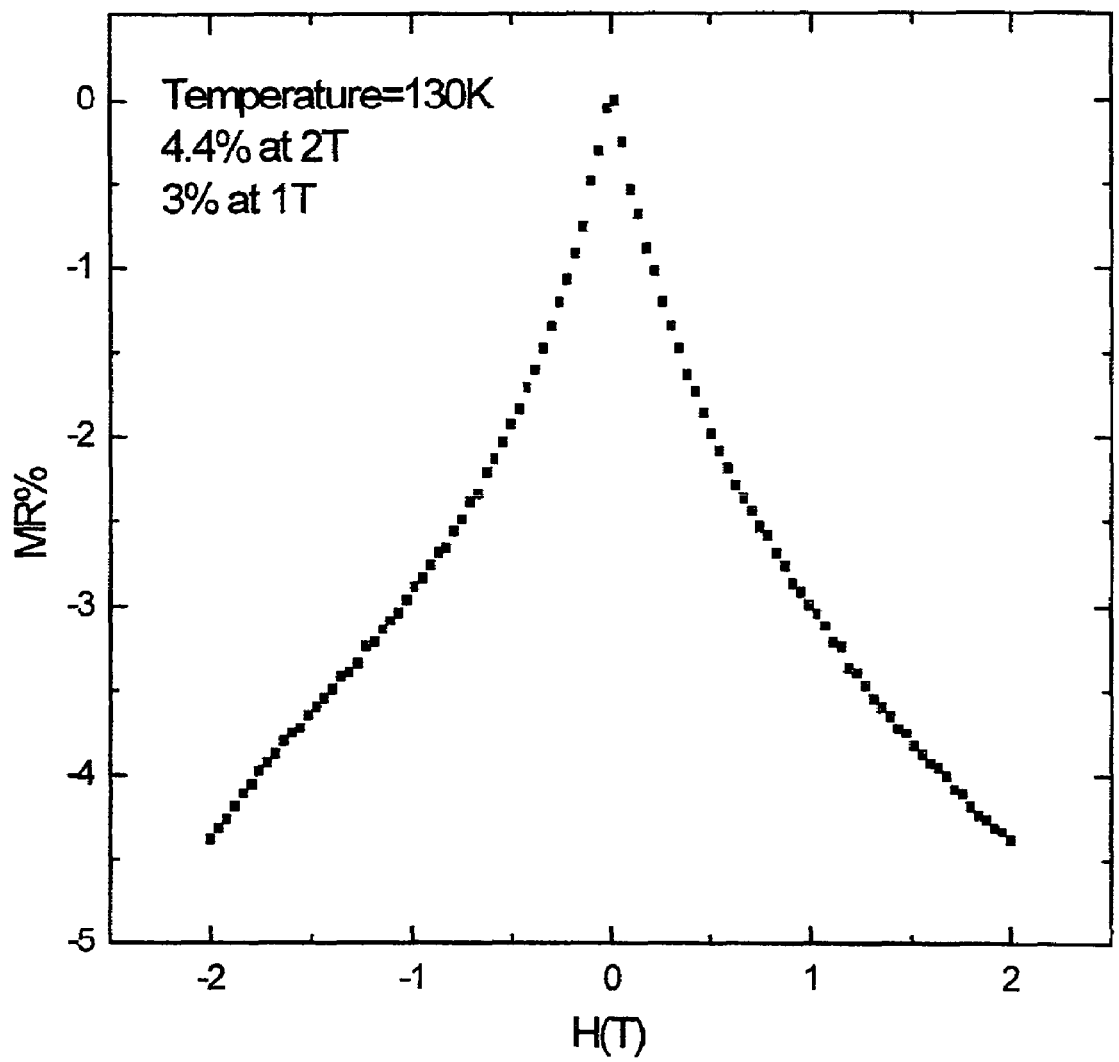
Figure 12A:
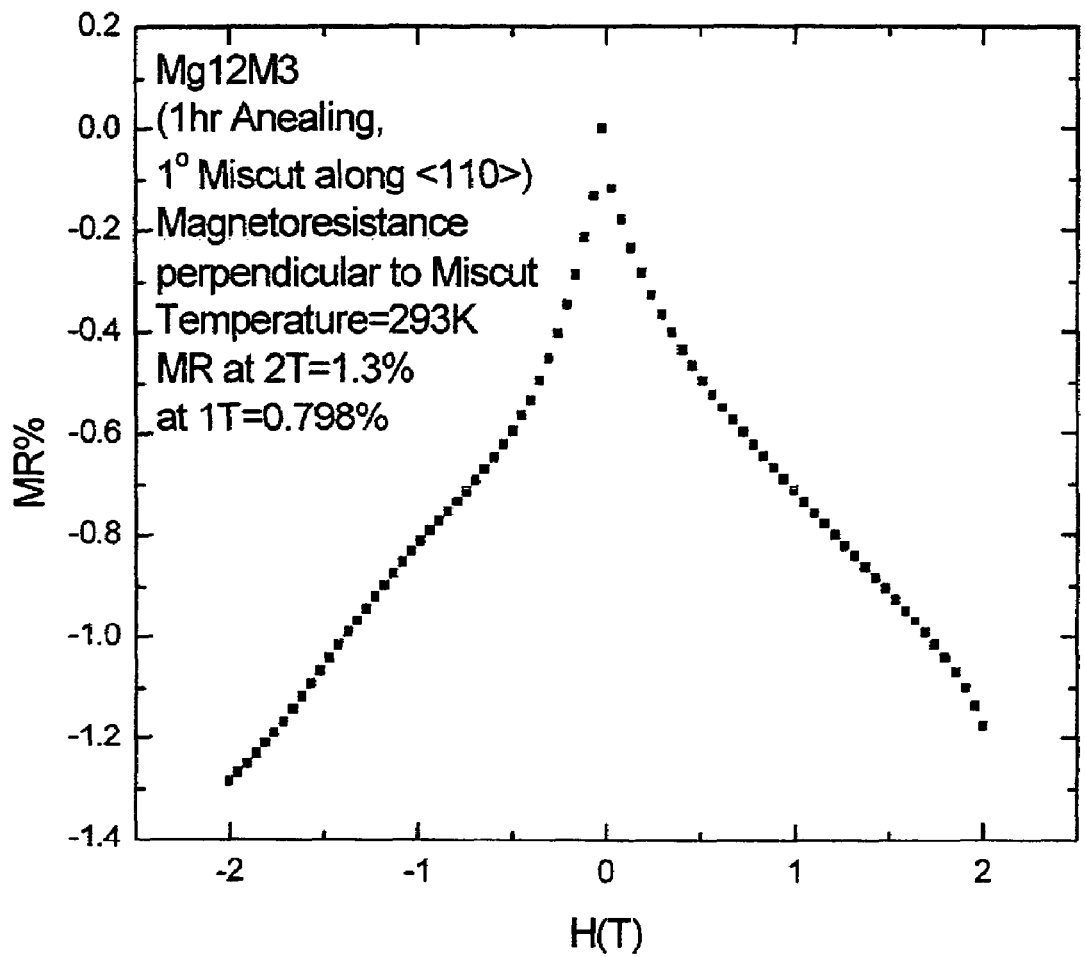
Figure 12B:
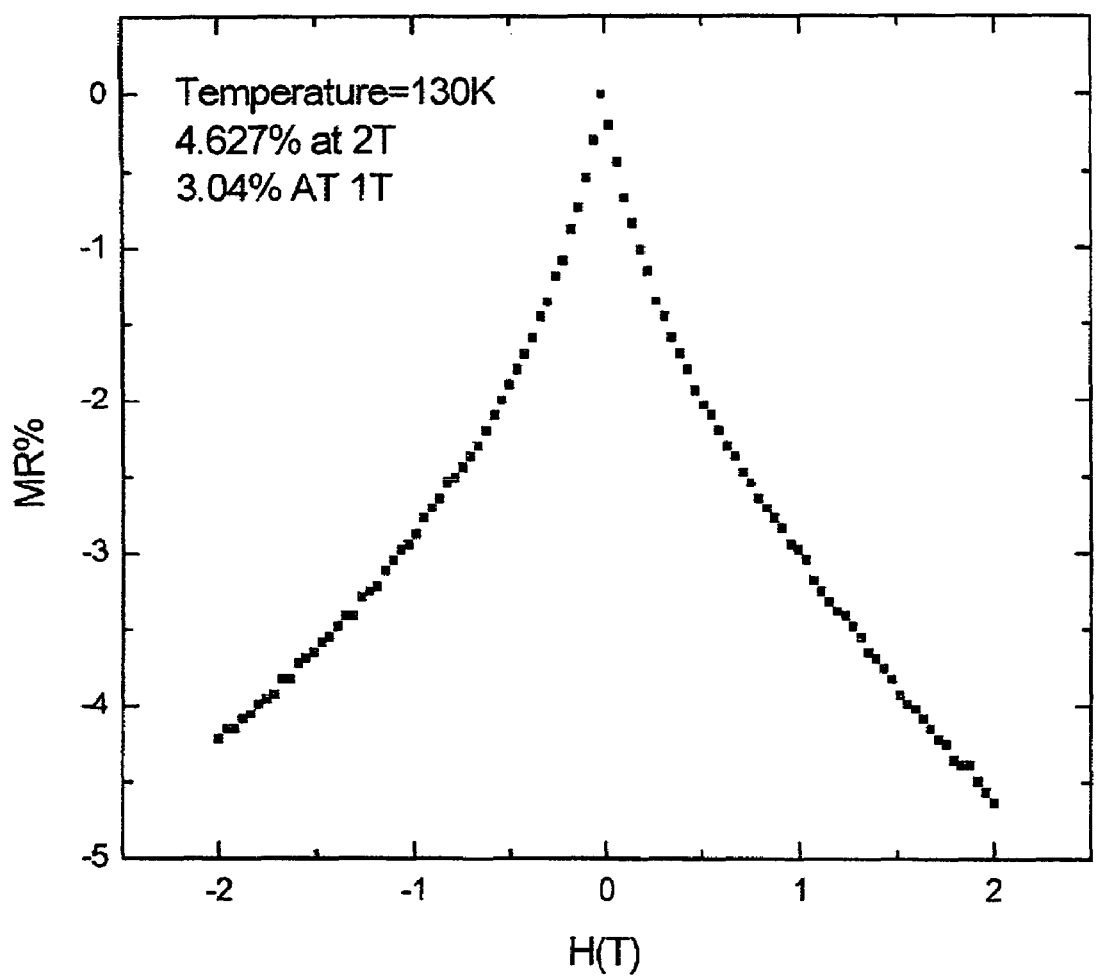
Figure 12C:
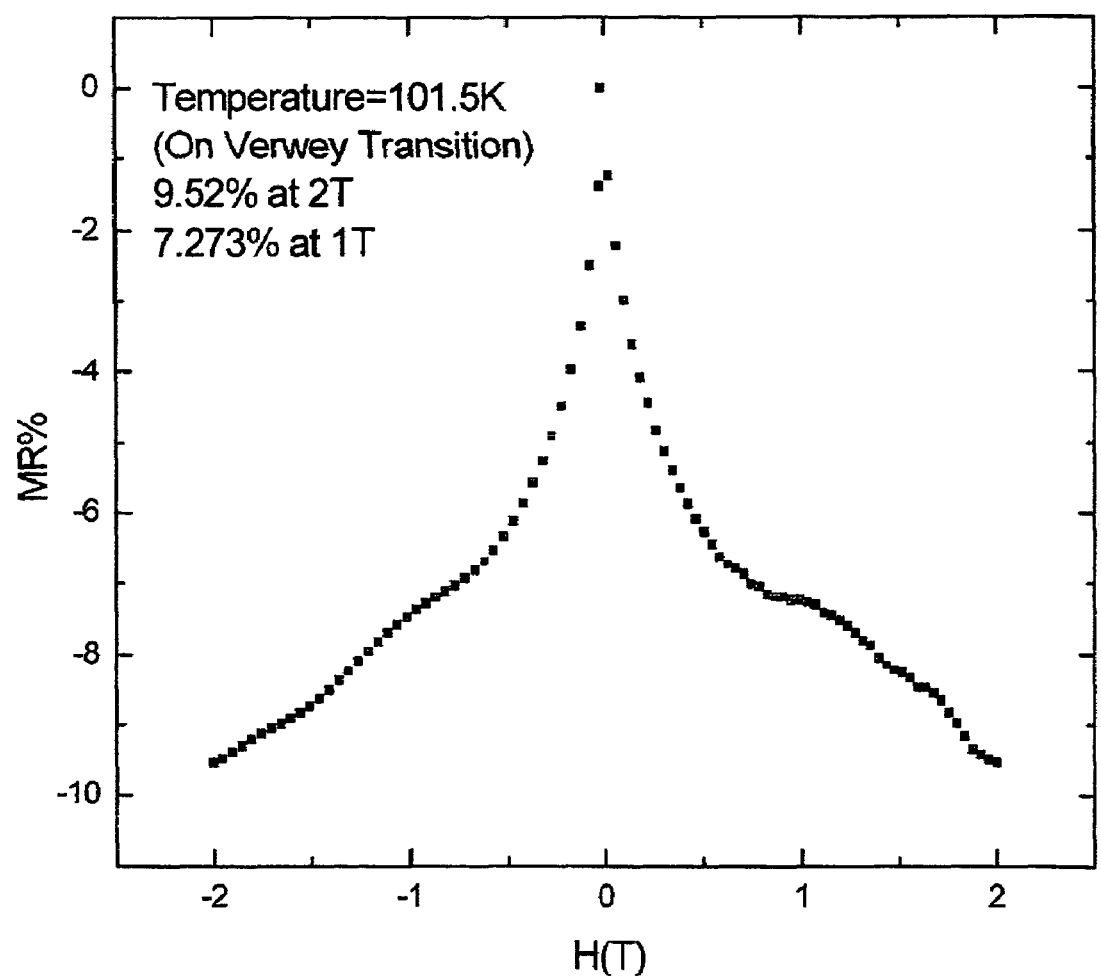
Figure 12D:
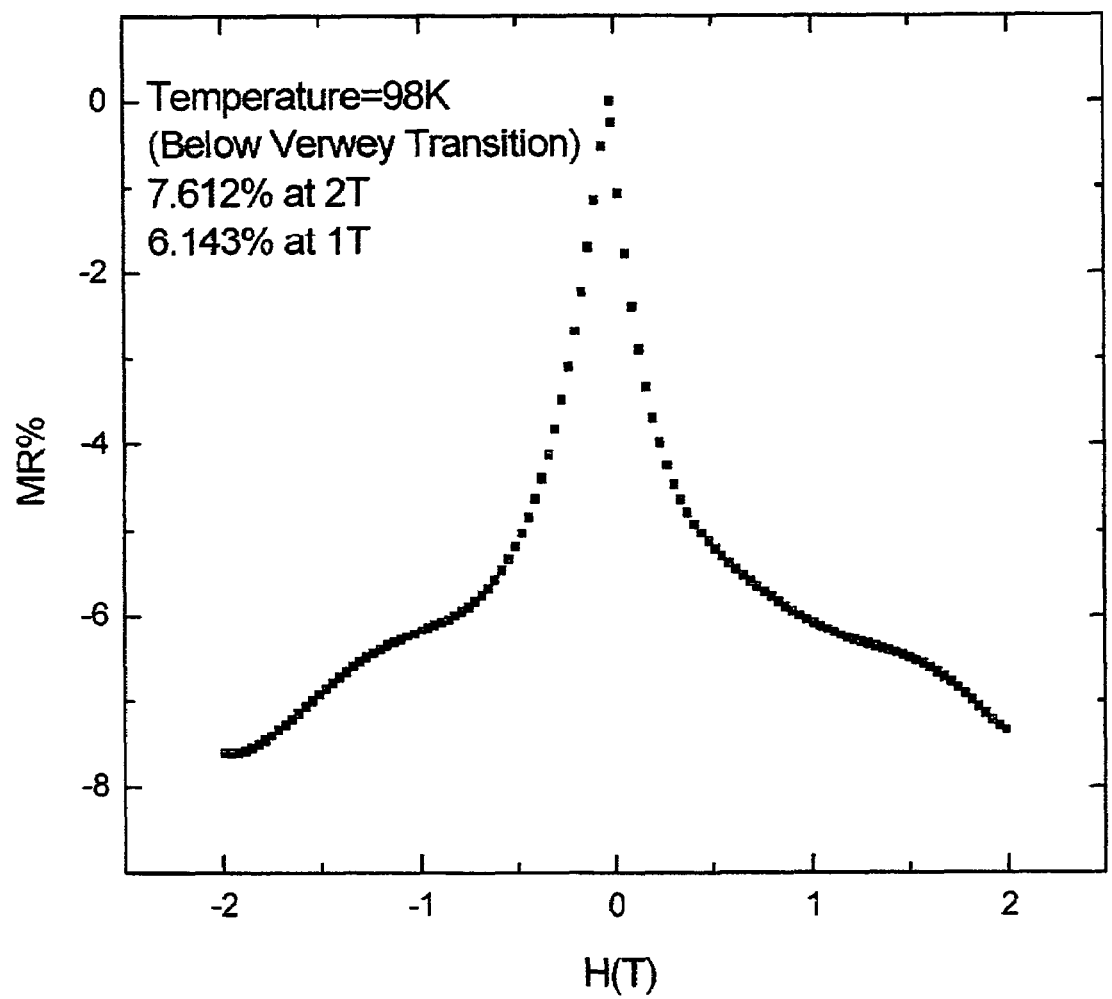

The present invention can be summarised as follows. The magnetoresistance of a film can be controlled and enhanced by the miscut of the substrate on which the film is grown. Generally, other operations are also required and are encompassed within the term "vicinal treatment". Results of one representative experiment are shown in FIGS. 11a,b,c,d and 12a,b,c,d. The $Fe_3O_4$ film coded as Mg12M3 was grown, as described above. The film thickness was 70 nm. The substrate was annealed prior to film deposition for 0.5 hour in an ultra high vacuum at 600 C and then for 1 hour at the same temperature in an oxygen plasma environment at a pressure of $1*10^{-5}$ Torr. Magnetoresistance of magnetite film was measured in this experiment using a standard four-point technique using DC current of 10 μA. In line with common practice we define magnetoresistance as MR %=100*(R(T,H)−R(T,0))/R (T,0), here R(T,H) and R(T,0) are the resistances with and without magnetic field H at a given temperature T respectively. Magnetoresistance, MR, is measured in percent. The magnetoresistance of the magnetite films was measured as a function of the miscut angle of the substrate. FIGS. 11a,b,c,d show the magnetoresistance measured with current along the miscut direction. The miscut angle is 1° and the miscut direction is along <110>. The magnetic field is parallel to the current direction. FIGS. 12a,b,c,d show the magnetoresistance of the same film measured with current directed perpendicular to the miscut direction and field parallel to the current. Above Verwey temperature there is no noticeable difference in the magnetoresistance between the two cases of current along the miscut direction and perpendicular to the miscut direction. The difference in magnetoresistance close to Verwey transition temperature (120 K) is significant: 4.31% at 2 Tesla field and 3.727% at 1 Tesla field. Below Verwey transition the difference is 3.52% and 4.2% respectively. The maximum magneto resistance observed for the current parallel to the miscut direction is remarkably high: 13.83% for 2Tesla field and 11% for 1Tesla field. These values are summarized in Table 1 below.

Sample: Mg12M3 (1° miscut along <110> direction)

| Direction of the current | Field value (Tesla) | T = 299 K | T = 130 K | T = 101 K | T = 100 K |
|---|---|---|---|---|---|
| Along miscut direction | 2 | 1.18% | 4.4% | 13.83% | 11.13% |
| | 1 | 0.66% | 3% | 11% | 10.34% |
| Perpendicular to miscut | 2 | 1.3% | 4.627% | 9.52% | 7.612% |
| | 1 | 0.798% | 3.04% | 7.273% | 6.143% |

Difference in MR % along and perpendicular to miscut

TABLE 1

| Field Value (Tesla) | T = 299 K | T = 130 K | T = 101 K | T = 100 K |
|---|---|---|---|---|
| 2 | 0.12 | 0.227 | 4.31 | 3.518 |
| 1 | 0.138 | 0.04 | 3.727 | 4.197 |

Different values of the magnetoresistance can be found along different crystallographic directions in an epitaxial film. For example, on the (110) or (111) surface one may expect to find some difference between the magnetoresistance values measured along two orthogonal directions as they are crystallographically not equivalent. However, the results presented in FIGS. 11 and 12 do clearly suggest that the miscut is responsible for the difference. The reason is based on the fundamental symmetry consideration: on (100) surface of a cubic crystal two orthogonal directions are always equivalent. Clearly, one should also expect that for other surface terminations, e.g. (110), (111) etc. the magnetoresistance along and perpendicular to the miscut direction should differ. However, as two crystallographic orthogonal directions are equivalent on the (100) surface, the clarity of the result is more transparent on the (100) surface and that is why we refer to this surface.

It can be further demonstrated that the miscut angle is an important factor in defining the value of the magnetoresistance. FIGS. 13a, b and 14 a, b show the results for magnetoresistance measurements for $Fe_3O_4$ film grown under conditions substantially identical to the ones corresponding to the results presented in FIGS. 11 and 12 with the only difference that the miscut angle was lower. The results presented here are for only two representative temperatures namely at and below Verwey temperature. At these temperatures only a significant affect of miscut angle on MR properties was observed. Like in FIGS. 11 & 12 the magnetic field is directed along the current direction. In this film coded by us as sample Mg6M1 the substrate miscut angle was 0.4618° and the miscut direction was the same, as in the sample M12M3: along <110>. One can see that the difference in magnetoresistance for the cases of current directed along and perpendicular to the miscut direction was much lower than in the case of the film grown on a substrate with 1° miscut. The magnetoresistance results for the sample Mg6M1 at various temperatures are summarized in Table. 2 below.

Mg6M1 (0.4618° miscut along <110> direction)

| Direction of the current | Field Value (Tesla) | T = 299 K | T = 135 K | T = 114.8 K | T = 102 K |
|---|---|---|---|---|---|
| Along miscut direction | 2 | 1.63% | 4.8495% | 8.26% | 7.569% |
| | 1 | 1.0123 | 3.177% | 5.7669% | 4.84% |
| Perpendicular to miscut | 2 | 1.52% | 5.4767% | 8.1076% | 8.99% |
| | 1 | 0.91% | 3.3567% | 5.4923% | 5.455% |

Difference in MR % along and perpendicular to miscut

TABLE 2

| Field Value (Tesla) | T = 299 K | T = 135 K | T = 114.8 | T = 102 K |
|---|---|---|---|---|
| 2 | 0.11 | 0.6272 | 0.1524 | 1.421 |
| 1 | 0.9213 | 0.1797 | 0.2746 | 0.615 |

Figure 11C:
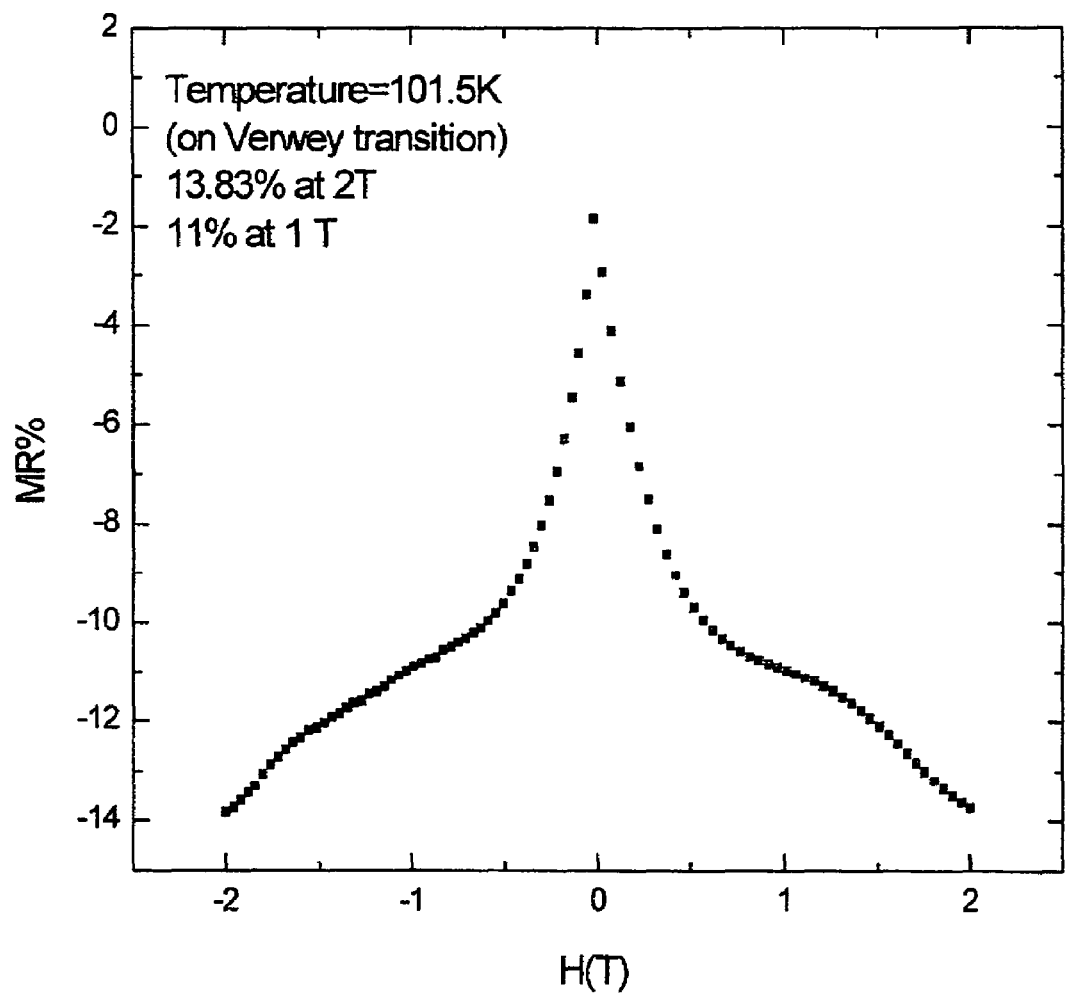
Figure 11D:
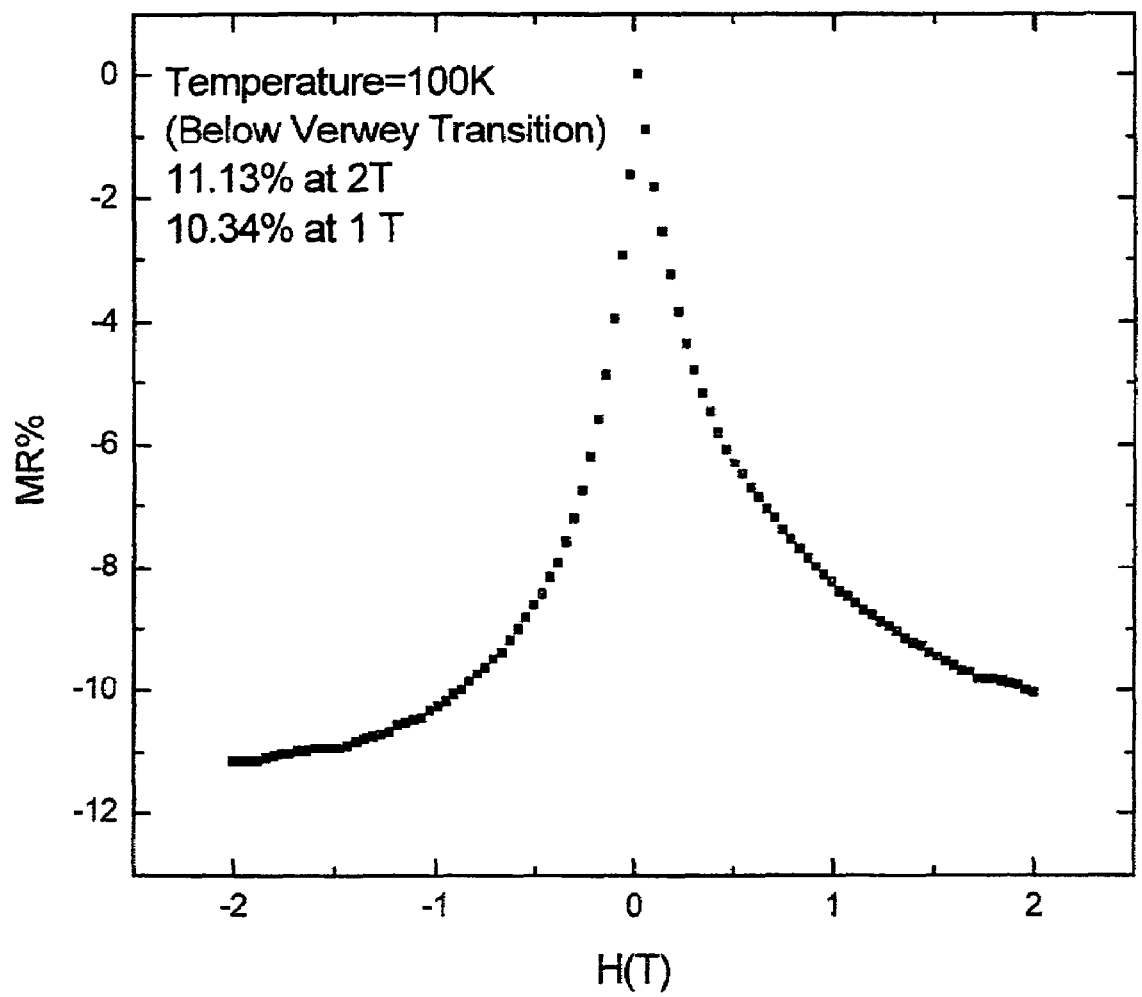

The specification emphasizes the importance of the difference between the magnetoresistance of films grown on vicinal and non-vicinal substrates. The difference is highly beneficial as magnetoresistance has increased considerably. It appears that the magnetoresistance values shown in FIG. 11c are higher than any value published for the magnetoresistance of this material heretofore.

FIGS. 15, 16, 17, 18 present results of magnetoresistance measurement for the samples Mg14M2 (FIGS. 15, 16) and Mg14M3 (FIGS. 17,18). Both the samples are 45 nm thick films of epitaxial $Fe_3O_4$ grown under conditions substantially similar to the ones described above. The samples Mg14M2 and Mg14M3 were grown on MgO(100) substrates with the identical miscut angle of 2° and miscut direction of <110>. The most substantial difference between the two samples is that the substrate of Mg14M3 was annealed for a longer time prior to the film deposition. The substrate of Mg14M2 was annealed for 0.5 hour in UHV and then for 2 hour at an oxygen pressure of $1\times10^{-5}$ Torr prior to the film deposition. The substrate of Mg14M3 was annealed for 4 hours at an oxygen pressure of $1\times10^{-5}$ Torr. FIGS. 15 a, b correspond to the sample Mg14M2 for the temperatures 109, 105 K respectively for the current along the miscut direction. FIGS. 16a, b correspond to the sample Mg14M2 for essentially the identical temperatures of 109 and 105 K respectively for the current perpendicular to the miscut direction. In both, FIGS. 15 and 16 the magnetic field is parallel to the current direction. Magnetoresistance results for the sample Mg14M2 measured at different temperatures are summarized in Table 3 below.

Mg14M2 (2° Miscut along <110> direction)

| Direction of the current | Field Value (Tesla) | T = 299 K | T = 130 K | T = 109 K | T = 105 K |
|---|---|---|---|---|---|
| Along miscut direction | 2 | 1.29% | 5.63% | 9.25% | 6.56% |
|  | 1 | 0.82% | 3.61% | 7.29% | 5.11% |
| Perpendicular to miscut | 2 | 1.33% | 5.35% | 6.56% | 6.49% |
|  | 1 | 0.66% | 3.56% | 4.65% | 5% |

Difference in MR % along and perpendicular to miscut

TABLE 3

| Field Value (Tesla) | T = 299 K | T = 130 K | T = 109 K | T = 105 K |
|---|---|---|---|---|
| 2 | 0.04 | 0.28 | 2.69 | 0.07 |
| 1 | 0.16 | 0.05 | 2.64 | 0.11 |

FIGS. 17a, b show the results of magnetoresistance measurements for the sample Mg14M3 for the current along the miscut direction at the temperatures of 109 and 105 K respectively. FIGS. 18a, b show the results of magnetoresistance measurements for the same sample Mg14M3 for the current direction perpendicular to the miscut direction at temperatures of 109, 105 K respectively that are substantially equivalent to the temperatures of FIGS. 17a, b. In both FIGS. 17 and 18 the magnetic field is directed along the direction of the current. One can see that the magnetoresistance difference along and perpendicular to the miscut direction is much greater for the sample that was annealed for 4 hours than for the one annealed for 2 hours. The longer anneal time leads to better-defined atomic terraces on the nanometer scale. These results demonstrate the fact that not only the miscut angle and miscut direction are important but also the morphology of terraces on the nanometer scale. The magnetoresistance results for sample Mg14M3 are summarized in Table 4 below.

Mg14M3 (2° Miscut along <110> direction)-MR % dependence on direction of current

| Direction of the current | Field Value (Tesla) | T = 299 K | | T = 130 K | | T = 109 K | | T = 105 K | |
|---|---|---|---|---|---|---|---|---|---|
|  |  | +I | −I | +I | −I | +I | −I | +I | −I |
| Along miscut direction | 2 | 1.33% |  | 5.92% | 5.84% | 12.34% | 11.90% | 9.78% | 8.36% |
|  | 1 | 0.85% |  | 4% | 3.9% | 9.51% | 8.55% | 8% | 6.88% |
| Perpendicular to Miscut | 2 | 1.48% | 1.52% | 5.59% | 5.56% | 6.92% | 6.81% | 6.68% | 6.84% |
|  | 1 | 0.7% | 0.87% | 3.68% | 3.66% | 4.86% | 4.73% | 5.19% | 5.18% |

Difference in MR % along and perpendicular to Miscut

TABLE 4

| Field Value | T = 299 K | T = 130 K | T = 109 K | T = 105 K |
|---|---|---|---|---|
| 2T | 0.15 | 0.33 | 5.42 | 3.1 |
| 1T | 0.15 | 0.32 | 4.65 | 2.81 |

In Table 5 below, the difference in MR on the Mg14M2 and Mg14M3 are summarized which shows the significant effect of surface preparation conditions on magnetoresistive properties.

Difference in MR % between Mg14M2 and MG14M3

TABLE 5

| Field Value(Tesla) & Direction | T = 299 K | T = 130 K | T = 109 K | T = 105 K |
|---|---|---|---|---|
| 2 (MC) | 0.04 | 0.29 | 3.09 | 3.22 |
| 1 (MC) | 0.03 | 0.39 | 2.22 | 2.89 |
| 2 (PMC) | 0.15 | 0.24 | 0.36 | 0.19 |
| 1 (PMC) | 0.04 | 0.12 | 0.21 | 0.19 |

Figure 20B:
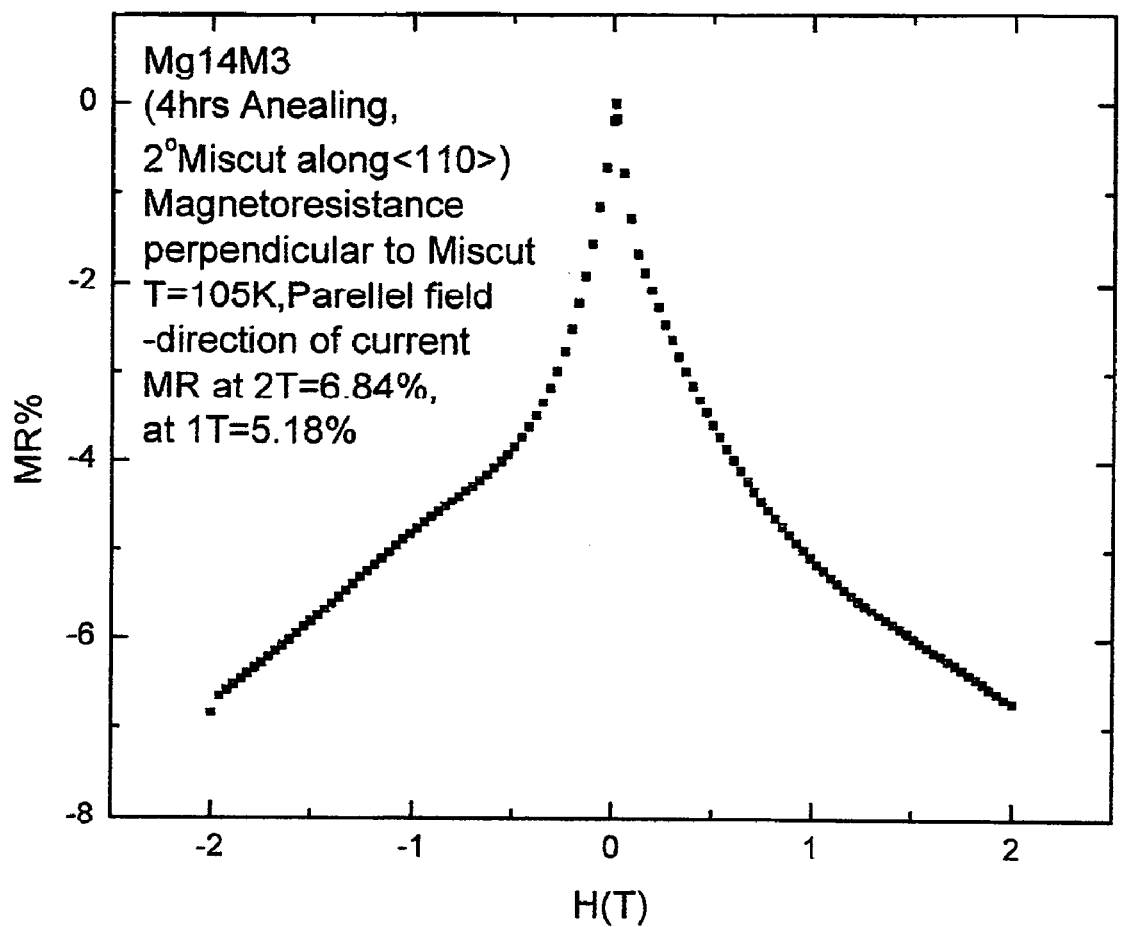

FIGS. 19 and 20 show the results of another interesting observation: the magnetoresistance of a film grown on a miscut substrate is sensitive to the polarity of the current when the current is directed along the miscut direction. This phenomenon has been observed primarily on films grown on miscut substrates with well-defined atomic terraces, i.e. after a long anneal in oxygen plasma. FIGS. 19a, b show the magnetoresistance results on the Mg14M3 sample at temperatures of 109 and 105 K respectively whereby the current is along the miscut direction and reversed compared to the direction of FIGS. 17. Similarly, FIGS. 20a, b show the magnetoresistance results at the temperature of 109 and 105 K respectively for the same sample Mg14M3 whereby the current is perpendicular to the miscut direction and is reversed with respect to the current direction of FIG. 18. Like in FIGS. 11-18, the magnetic field direction in FIGS. 19 and 20 is also directed along the current direction. The results of these magnetoresistance measurements are summarized in Table 6 below and they demonstrate the conclusion: in films grown on miscut substrate the magnetoresistance can be asymmetric, i.e. by reversing the current polarity the value of magnetoresistance changes. This difference between the two opposite current polarities is sensitive to the current direction with respect to the miscut direction.

Difference in MR % for positive and negative direction of current

TABLE 6

| Field Value & direction | T = 299 K | T = 130 K | T = 109 K | T = 105 K |
|---|---|---|---|---|
| 2 Tesla (MC) | | 0.8 | 0.44 | 1.42 |
| 1 Tesla (MC) | | 0.1 | 0.96 | 1.12 |
| 2 Tesla (PMC) | 0.04 | 0.03 | 0.11 | 0.16 |
| 1 Tesla (PMC) | 0.17 | 0.02 | 0.13 | 0.01 |

The results suggest that the dependency of the magnetoresistance of a film on the miscut of the substrate on which the film is grown is the general property that is not limited to just one substrate-film combination. We have confirmed that similar results are observed for other materials, e.g. thin epitaxial Fe films grown on MgO(100). The effect observed on this material was smaller than in $Fe_3O_4$/MgO(100) films but the conclusion is the same: the magnetoresistance of the film can be enhanced by growing it on a miscut substrate forming atomic terraces. The effect observed depends on the angle and direction of the miscut and also on the film thickness.

In order to explain why miscut substrates affects the magnetoresistance of the film grown on it and how the magnetoresistance can be maximized through the choice of the vicinal substrate, it is important to consider under what conditions one may achieve substantial magnetoresistance. Only magnetoresistance caused by a moderate magnetic field is considered in this document. For example, some materials may have a massive magnetoresistance in a large field of say 20 Tesla. In some materials such as MnSe, this magnetoresistance could be so large, that effectively the material undergoes through the metal-insulator transition caused by the magnetic field. This magnetoresistance was termed as colossal magnetoresistance. The present invention relates to magnetoresistance that can be caused by a relatively small field of say a few 10s of Oe and up to some 10 kOe (10 kOe=1 Tesla). These values are given here as a rough indication. When spin polarized electrons traverse between areas with nonparallel direction of spins, the spin scattering is different from the situation when electrons traverse between the areas with the parallel direction of spins. Therefore, if the external magnetic field allows switching between the two situations, substantial values of magnetoresistance will result. In terms of a thin film medium this teaching can be interpreted as follows. If one is capable of creating the situation in which the medium comprises numerous areas of substantially unparallel direction of magnetization and then with the imposition of the magnetic field all the areas become substantially magnetized along the same direction, this results in resistance change, i.e. magnetoresistance, provided the current flows in the medium between these areas or alternatively electrons come in contact with boundaries between different areas and suffer additional spin scattering.

The above explains, in a relatively theoretical way, how the vicinal treatment can be carried out to prepare a substrate to allow the correct miscut angle and subsequently to provide the necessary change in magnetoresistance.

Referring to FIG. 21 thereof, there is illustrated a magnetoresistive medium, indicated generally by the reference numeral 1. This magnetoresistive medium 1 comprises a crystalline substrate 2 which has been vicinally treated to provide a miscut vicinal surface, indicated generally by the reference numeral 3, in the form of stepped terraces, namely terraces 4 and steps 5, each of atomic and nanometer scale. There are discrete separated spacer nanowires 7 mounted on each terrace 4 against each step 5. The nanowires 7 are formed by an intermediate fractional layer of film. There are further main nanowires, namely, nanowires 10(a) and 10(b) formed by a further thin main film indicated generally by the reference numeral 11. The main nanowires 10(a) are on top of the discrete separated spacer nanowires 7 and the main nanowires 10(b) are directly on top of the terraces 4. Therefore, the spacer nanowires (7) form, an intermediate fractional layer of spacer film interposed between the substrate (2) and some of the main nanowires. A thin protective layer 15 covers the main nanowires 10(a) and 10(b). The main nanowires 10(a) and 10(b) are composed of an identical layer or thin main film of material which, is deposited on the spacer nanowires 7 and the terraces 4 to form the two separate sets of main nanowires 10(a) and 10(b).

Before describing the operation of the magnetoresistive medium 1, it should be noted that the substrate 2 can be manufactured of an antiferromagnetic material and preferably one with a large resistance to electric current e.g. NiO, FeO, CoO etc. The spacer nanowires 7 can be conducting or insulating. The main nanowires 10(a) and 10(b) may be composed of substantially identical material with the difference between them being that some, as mentioned already, are deposited directly on top of the substrate and others are deposited on the spacer nanowires 7. In this way, they form the main nanowires 10(a) and 10(b). The main nanowires 10(a) and 10(b) are magnetic. The magnetic nanowires can be either ferromagnetic or ferrimagnetic. They could consist, for example, of Fe, Ni, Co or permalloy. They could also be formed by a layer of magnetic oxide, e.g. $Fe_3O_4$ or a layer of another magnetic material such as Heusler alloy, $Fe_3Si$, rare earth doped manganites or many other materials.

The terrace steps 5 may be just one atomic layer high, but could also be more than one atomic layer high if the substrate has so-called bunched terrace steps. Bunched steps (or step bunching) are known to exist on some substrates when height separation between the terraces 4 is greater than one atomic layer. Bunched steps are formed when the energy associated with the terrace steps is too high and it is energetically favourable for the surface to reduce the number of the terraces while maintaining the overall miscut angle. Step pairing is a common type of step bunching forming terrace steps with an effective height equal to two regular separations between atomic planes. Mechanisms of step bunching are well understood. Reference is made to the state-of-the-art description of the topic published e.g. in K. Yagi, H. Minoda, M. Degawa, Step bunching, step wandering and faceting: self organization at Si surfaces, Surface Science Reports, 43 (2001) 45-126; or O. Pierre-Louis, Step bunching with general kinetics: stability analysis and macroscopic models, Surfaces Science 529 (2003) 114-134; B. S. Swartzentruber, Y-W. Mo, R. Kariotis, M. G. Lagally, M. B. Webb, Direct determination of Step and kink energies on vicinal Si(001) surface, Physical Review Letters, 65 (1990) 1913-1916. All are included herein by way of reference.

The protective layer 15 could be e.g. a layer of $Al_2O_3$, MgO, $SrTiO_3$, $ZrO_2$, ZnO, $SiO_2$, $TiO_2$, $HfO_2$ or a thin gold or platinum layer. It could also be a layer of a magnetic oxide with large resistance, e.g. NiO. The protective layer, as well as protecting the film 11 forming the main nanowires 10(a) and 10(b) from the ambient conditions, may also act as a stabiliser, i.e. effectively dampening the surface diffusion so that the pattern of the areas forming the spacer nanowires 7 and the main nanowires 10(a) and 10(b) of ferromagnetic material does not change over time.

To summarise, in accordance with the invention, the vicinal surface, after it has been vicinally treated, ensures that the main nanowires form two subsets of main nanowires which are positioned substantially differently with respect to the atomic steps of the substrate.

It should again be noted that the dimensions in FIG. 21 are distorted for clarity of the drawing. The height of the terrace step 5 is typically much smaller than the width of the atomic terraces 4. For example, as stated already, the height of the terrace step could be some 0.2 nm and width of the atomic terraces is some 3 to 500 nm although smaller or greater values are also possible. As explained above, the latter depends on the miscut angle. The same comment applies to FIGS. 22-35. However, it is easier to analyse the drawings in which the width of the atomic terrace is shown disproportionably small.

It should also be kept in mind that the main nanowires 10(a) and 10(b) do not have to be positioned in strict alteration, i.e. each main nanowires 10(a) does not have to be flanked by two main nanowires 10(b) and vice versa. However, preferably a significant extent of intermixing between the two groups of main nanowires is desirable so as to provide the situation when a sizeable fraction of the nanowires 10(a) has nanowires 10(b) as their neighbours and vice versa.

The spacer nanowires 7 are chosen in such a way that they alter the exchange interaction between the ferromagnetic main nanowires 10(a) and the substrate 2. The exchange interaction between a ferromagnetic and an antiferromagnetic material critically depends on the separation between them. Generally, the interaction becomes negligibly small when the separation reaches just a few nanometers. For the separation below a few nanometers, the exchange interaction can be an oscillatory or exponential function of the separation depending on the nature of the material used to form the spacer nanowires 7. Therefore, spacer nanowires 7 of small thickness could significantly alter the exchange interaction between the ferromagnetic main nanowires 10(a) and the substrate 2. The spacer nanowires 7 could have a thickness in the range from one atomic layer to some 50 atomic layers. FIG. 21 shows the situation when the thickness of the spacer nanowires 7 is only one or two atomic layers. The spacer nanowires 7 could be of a nonmagnetic or a magnetic material as both nonmagnetic and magnetic materials can alter the exchange interaction when inserted between the main nanowires 10(a) and the substrate 2. It should be appreciated that the antiferromagnetic substrate 2 may need to be annealed in an external magnetic field, as described below. This anneal could take place either prior to, during or after the deposition of the nanowires 7, 10(a) and 10(b). The purpose of anneal is to align antiferromagnetic vectors in the substrate as will be appreciated by those skilled in the art of exchange bias. The ferromagnetic nanowires 10(a) and 10(b) are formed in the main film 11.

The operation of the magnetoresistive medium 1 can be understood from FIGS. 21 and 22. When no external magnetic field is applied, the main film 11 is characterized by a particular arrangement of magnetizations different for the magnetic main nanowires 10(a) and 10(b). For simplicity these are all shown magnetized parallel to each other in FIG. 21. In reality, a more complex pattern of magnetizations may be established that could be considered as a domain pattern in the main film 11. The magnetization in the magnetic main nanowires 10(b) may not be parallel to the one in the main nanowires 10(a). Moreover, the directions of magnetization in the main nanowires 10(a) or 10(b) at different locations on the surface may differ. The details of the alignment of magnetizations in the main nanowires 10(a) and 10(b) depend on the specific materials forming the layer or main film 11, thickness of the main film 11 and also on the strain maintained by the film 11, that in turn depends on the choice of the substrate material and film growth conditions.

When the external magnetic field is applied, the magnetic response from the main nanowires 10(a) and 10(b) can be different as the extent of exchange coupling of the nanowires 10(a) and 10(b) to the substrate 2 is different. For example, if the main nanowires 10(b) are strongly coupled to the antiferromagnetic substrate e.g. by exchange interaction, magnetization in them could remain unchanged and the magnetisation of the nanowires 10(a) could rotate to align with the direction of the external magnetic field. This is schematically shown in FIG. 22.

Therefore, as an electric current passes through the magnetoresistive medium in the direction along the substrate miscut, in a zero external magnetic field (FIG. 21) electrons travel between the areas with parallel directions of magnetization and in FIG. 22 they travel between areas with antiparallel directions of magnetization. Therefore, the amount of spin scattering changes and this results in magnetoresistance. Generally for materials with greater spin polarization at the Fermi level, the spin dependent electron scattering will be greater between the areas with non co-linear spin direction.

If an electric current passes perpendicular to the miscut direction, additional spin scattering may still be created. When current passes perpendicular to the miscut direction, i.e. along the main nanowires 10(a) and 10(b) there is scattering of the charge carriers along the boundaries between each two neighbouring nanowires. The scattering depends on the relative orientation of magnetisations in the neighbouring main nanowires. With the application of a magnetic field the relative directions of magnetisation in the main nanowires change with respect to each other thus changing the scattering of electrons and leading to magnetoresistance.

As stated, FIG. 21 shows the case when in the absence of an external magnetic field the magnetization directions in the areas forming the main nanowires 10(a) and 10(b) are parallel and once the field is applied they switch to an antiparallel configuration. One can also consider the opposite case: antiparallel magnetizations in the absence of the field turn parallel or almost parallel once the field is applied. Needless to say, that any intermediate case can also be considered, e.g. the magnetizations of the areas in the film 11, i.e. the nanowires 10(a) and 10(b) could be aligned at an angle with respect to each other of say 90° or another angle. The result depends entirely on the specific choice of the materials for the nanowires 10(a), 10(b) and 7, thickness of the layers or films forming these nanowires 10(a), and 10(b), as well as the width of the nanowires 10(a) and 10(b), i.e. on the miscut angle.

It should also be pointed that the directions of magnetization in the areas forming the main nanowires 10(a) and 10(b) do not have to rotate by the full 180 degrees once the external magnetic field is applied. They could rotate by a smaller angle still resulting in change of spin scattering and therefore in resistance change. Moreover, for certain applications it is desirable to have a gradual rotation of magnetization in response to change in external magnetic field as opposed to a sudden flip over of the magnetization. This is particularly important in sensors of magnetic field. To achieve more gradual deviation of magnetization in response to the magnetic field, an additional ferromagnetic biasing layer could be deposited e.g. on top of the film 11. This layer could be composed of a hard ferromagnetic material and could function by creating a stray field sensed by main nanowires 10(a) and 10(b) and acting as an offset field.

Another mechanism that may result in a different response to the magnetic field between the areas forming the main nanowires 10(a) and 10(b) is step-induced anisotropy. Step-induced anisotropy results from breaking the rotational symmetry at the terraces 4. Step-induced anisotropy is usually uniaxial for a surface with well-aligned steps 5. The anisotropy energy depends on the electronic structure of the film that in turn depends on the type of substrate, strain, crystallographic orientation of the film surface and crystallographic orientation of the step edges. Therefore, the step induced-anisotropy will differ for the areas forming the main nanowires 10(a) and 10(b). The influence of step-induced anisotropy will diminish as the film thickness increases. Therefore, depending on the type of materials for the substrate 2, spacer nanowires 7 and main nanowires 10(a) and 10(b) and depending primarily on the thickness of the main nanowires 10(a) and 10(b), the step-induced anisotropy may or may not play a significant role in determining the difference between the magnetic responses of the nanowires 10(a) and 10(b). However, this does not fundamentally change the substance of the operation of the embodiment in FIG. 21 as the prime goal: achieving the difference in magnetic response between the main nanowires 10(a) and 10(b), is reached.

FIG. 23 illustrates an alternative embodiment in which the substrate 2 does not entirely consist of antiferromagnetic material but is rather a nonmagnetic substrate 2(a) with a layer of antiferromagnetic material 2(b) deposited on it to form the vicinal surface 3. Thus, the substrate (2) comprises a vicinally treated upper substrate 2(b) on top of a vicinally treated lower substrate 2(a). This can broadly be termed another form of vicinal treatment. For ease of reference, the various parts of the magnetoresistive medium are, where possible, identified by the same reference numerals, even where they are of clearly different construction such as the substrate 2 of this FIG. 23. This could be for example a substrate of MgO, MgAl$_2$O$_4$, SrTiO$_3$, Al$_2$O$_3$, Si, GaAs, Ge ZnO, GaN, ZrO$_2$, TiO$_2$ and HfO$_2$ or another suitable material with a film of e.g. insulating antiferromagnetic material NiO deposited on it. As the two materials have similar crystal structures and comparable lattice constants, such structures can be grown by molecular beam epitaxy. The antiferromagnetic film could also be made of a conducting material, e.g. MnNi. MnPt, MnAu, MnIr, as opposed to an insulating one. This will partially shunt the current flowing through the film 11 forming the main nanowires 10(a) and 10(b) but this could still be acceptable provided the resistance of the antiferromagnetic layer is not much smaller than the resistance of the layer or film 11. Again to strengthen the exchange bias, the antiferromagnetic layer 2(b) may need to be annealed in an external magnetic field. The anneal leads to alignment of antiferromagnetic vectors in the layer 2(b) as will be appreciated by those skilled in the art of exchange bias.

It should be pointed that in some cases further layers may need to be added in the magnetoresistive medium 1. For example a buffer layer may need to be added between the substrate 2(a) and layer 2(b). The purpose of buffer layer is to prevent diffusion of atoms of material of substrate 2(a) into that of layer 2(b) and vice versa. This will be readily appreciated by those skilled in the art of heteroepitaxy. For example, very thin buffer layers of S, Ge, Cr, Ag, Au are often used with the substrates of GaAs and Ge. Buffer layers of Cu and Cr are commonly used with Si substrates. Similarly a thin seed layer may need to be added e.g. to improve the growth or adhesion of the key functional layers. These additional layers are not included in the drawings as they are secondary and will complicate understanding of the invention.

The material forming the layer 2(b) could also be a ferromagnetic material preferably having high coercivity. The principle of operation of such a magnetoresistive medium is the same as the one of the medium shown in FIGS. 21, 22, 23. The exchange coupling of the ferromagnetic layer 2(b) with the main nanowires 10(a) and 10(b) is different as one of them is separated from the ferromagnetic layer 2(b) by the spacer nanowires 7. If the material of the layer 2(b) has large coercivity, its direction of magnetization will not be affected by the field that is strong enough to change the directions of magnetization in the nanowires 10(a) and/or 10(b) as described above. One difference between the embodiments utilizing antiferromagnetic material of layer 2(b) and the one with ferromagnetic material is that the stray magnetic field from the ferromagnetic layer 2(b) will be superimposed on the external field sensed by the film 11 forming the main nanowires 10(a) and 10(b) which will affect the values of the external magnetic field required to achieve magnetoresistive effect.

Referring again to FIG. 21, different materials may be used than those previously described. This leads to a different embodiment of the invention. In this embodiment the spacer nanowires 7 are now nonmagnetic. The spacer nanowires 7 are such that response of the magnetic main nanowires 10(b) grown on the substrate 2 to external magnetic field differs from one of the nanowires 10(a). For example, the main nanowires 10(a) and 10(b) are strained to a different extent. This can be achieved if the adhesion of the magnetic nanowires 10(b) to the substrate 2 is different from the one of the magnetic nanowires 10(a) to the spacer nanowires 7, and at the same time the lattice constant of the substrate 2 is different from one of the main nanowires 10(a) and 10(b). For example, if the material of the magnetic nanowires 10(a) and 10(b) has a lattice constant greater than that of the substrate 2, the main nanowires 10(b) may maintain the one-to-one registry with the substrate and therefore remain strained. At the same time the nanowires 10(a) may develop misfit dislocations and relax their strain as their adhesion to the spacer nanowires 7 is reduced. Needless to say, the opposite case can also be considered when the main nanowires 10(a) are strained and the main nanowires 10(a) are relaxed. Magnetic anisotropy and coercivity of a material generally depends on the strain status. As a result of the different strain status, magnetic response of the main nanowires 10(a) and 10(b) will differ.

Again referring to FIG. 21, an entirely different embodiment of the invention may be provided. In this embodiment the substrate 2 does not have to be magnetic. It could be MgO, MgAl$_2$O$_4$, SrTiO$_3$, Al$_2$O$_3$, Si, GaAs, Ge or another suitable material. The spacer nanowires 7 do not have to be composed of magnetic material either. As in the previous embodiments, the main nanowires 10(a) and 10(b) are composed of the same material, e.g. both are nanowires of iron or both are nanowires of the same iron oxide. The choice of the substrate 2 and of the spacer nanowires 7 is such that the main nanowires 10(a) and 10(b) grow with different amounts of strain in them. For example, let us consider the material for the nanowires 10(a) and 10(b) that has in-plane lattice constants $c_1$, $c_2$ comparable to the ones of the substrate 2 $a_1$, $a_2$; ($c_1=a_1$; $c_2=a_2$). Because of the close lattice match between the nanowires 10(b) and the substrate, the nanowires 10(b) grow epitaxially on the substrate and contain little strain. The material of the spacer nanowire 7 is chosen such that its lattice constant is significantly smaller than that of the substrate, e.g. some 5-20%. The spacer nanowires 7 may be grown on the substrate 2 such that the massive strain in them caused by the large lattice mismatch is released through the destruction of the one-to-one registry between the atoms of spacer nanowires 7 and the substrate 2. In other words, the arrangement whereby one atom of the spacer nanowire 7 matches one atom of the substrate 2 is no longer valid. The fundamentals of the mechanism that lead to the destruction of such registry are based on the fact that reduction of strain energy is greater than the increase in energy of the interface. These phenomena are described e.g. in [S. Murphy, D. Mac Mathuna, G. Mariotto, I. V. Shvets, Morphology and strain-induced defect structure of ultrathin epitaxial Fe films on Mo(110), Physical Review B 66 195417 (2002)] although that publication does not deal with the subject matter of the present specification. It is included here as an explanation of the phenomena. In this case the nanowires 10(a) and 10(b) are forced to grow on templates having different lattice periodicities. Therefore, this choice of the materials for the substrate 2, the spacer nanowires 7 and main nanowires 10(a) and 10(b) leads to the result that nanowires 10(b) are epitaxial and the main nanowires 10(a) are not. Therefore, response to the external magnetic field of the main nanowires 10(a) and 10(b) will differ (coercivity and anisotropy). As a result, when a magnetic field is applied to the medium, directions of magnetization in the main nanowires 10(a) and 10(b) with respect to each other change leading to magnetoresistance when current passes through the film 11 of the nanowires 10(a) and 10(b) as described above.

In the embodiment described above it was suggested that the lattice constants of the spacer nanowires 7 are smaller than the ones of the substrate 2. One can also provide a magnetoresistive medium where the lattice constant of the material of the spacer nanowire 7 are greater than the ones of the substrate 2 having a similar effect: the nanowires 10(b) are epitaxial, but the nanowires 10(a) are not.

One can also construct a magnetoresistive medium where due to the lattice mismatch between the materials forming the substrate 2, the spacer nanowires 7 and the main nanowires 10(a) and 10(b), the main nanowires 10(a) and 10(b) are both epitaxial but are characterized by different amounts of strain as they grow on different templates. This will lead to the same result: their response to the external magnetic field will be different. Consequently, the relative orientations of magnetisations in the main nanowires 10(a) and 10(b) with respect to each other can be altered by the external magnetic field thus leading to magnetoresistance when current passes through the film of the nanowires 10(a) and 10(b) as described above.

Alternatively, one can also provide a magnetoresistive medium in which the main nanowires 10(a) are epitaxial and the main nanowires 10(b) are not.

Alternatively there can be provided a magnetoresistive medium where the main nanowires 10(a) and 10(b) are both epitaxial but have different crystallographic orientations: e.g. the surface of main nanowires 10(b) has (100) orientation and one of the main nanowires 10(a) has (110) orientation. In this case the main nanowires 10(a) and 10(b) will also respond differently to external magnetic field as they have different surface anisotropy due to different surface terminations as well as different effective fields of the magnetocrystalline anisotropy.

Again referring to FIG. 21, there may be provided a magnetoresistive medium 1 in which the spacer nanowires 7 are of magnetic material (antiferromagnetic, ferromagnetic or ferrimagnetic). In this embodiment the difference in magnetic response is based on the fact that main nanowires 10(a), unlike main nanowires 10(b), are coupled magnetically to the magnetic material of the spacer nanowires 7 by exchange and/or dipole-dipole interaction. This effectively alters their magnetic properties. For example, if the spacer nanowires 7 consist of antiferromagnetic material or ferromagnetic material with high coercivity, then magnetization of the main nanowires 10(a) is pinned unlike the main nanowires 10(b). In this case it is not strictly appropriate to identify the spacer nanowires 7 as spacer nanowires as their function in this embodiment is different even though the same representation applies. It is more appropriate to call them pinning nanowires. However, to avoid unnecessary confusion, the distinction is not used in this specification and we refer to the spacer nanowires 7 having a pinning function.

Again referring to FIG. 21, there is provided a magnetoresistive medium 1 in which the spacer nanowires 7 consist of ferromagnetic or ferrimagnetic material with low coercivity. Then the main nanowires 10(a) are coupled magnetically to a material whose magnetization is readily affected by the external magnetic field and as a result the external magnetic field affects magnetisation of the main nanowires 10(a) greater than that of the main nanowires 10(b). In either case, the result is that the relative orientation of magnetizations in the main nanowires 10(a) and 10(b) is altered by the external magnetic field leading to increased magnetoresistance as explained above. In this case one may consider changing the name of the spacer nanowires as calling them "spacer" or "pinning" nanowires does not properly reflect their function. Possibly the term, "magnetisation enhancement" nanowires could be more appropriate to describe the function of the spacer nanowires in this embodiment. However, we will still refer to them as spacer nanowires to avoid unnecessary multiplication of terms. If the spacer nanowires 7 are antiferromagnetic, they may need to be annealed in external magnetic field to align antiferromagnetic vectors in all the areas of the spacer nanowires 7 along the same direction and thus strengthen the exchange bias imposed on the main nanowires.

Referring now specifically to FIGS. 21 to 26, it is explained briefly how the magnetoresistive medium may be provided. The description is addressed to those skilled in the art and considerable detail in the interests of brevity is omitted. Thus the reader is presumed to know, in general terms, how full and fractional layers are formed. Further, the reader is presumed to be familiar with the term "flux" and the use of evaporators. Having a vicinal substrate is instrumental to the formation of such a structure. FIG. 24 shows the atoms of the spacer nanowires 7 deposited on a vicinal substrate 2. Such almost randomly distributed atoms, generally called "adatoms", can move on the substrate to reach the positions of equilibrium or quasi equilibrium. The adatoms are identified by the reference numeral 7'. If the temperature of the substrate 2 is not high enough the adatoms 7' will form clusters and single atoms almost randomly distributed around each atomic terrace 4 of the substrate 2. When the substrate temperature increases, the mobility of the adatoms 7' also increases. At high enough temperature the adatoms 7' migrate throughout the substrate 2 arriving to the positions of the lowest energy. Usually, these are the positions with the highest coordination number, i.e. the highest number of atoms in the immediate vicinity of an adatom 7'. On a terraced substrate these are often the positions at the inner edge of each terrace 4, namely the step 5. One such adatom located at the inner edge of a terrace is indicated with the numeral 7'(*a*). Besides, on a terraced substrate 2, the movement of adatoms 7' is usually limited within the boundaries of each atomic terrace 4. The reason is that the movement of an adatom 7' between the atomic terraces 4 requires overcoming a significant energy barrier imposed by terrace height and width. As a result the adatoms 7' rearrange themselves on each terrace 4 migrating leftwards on average (if the direction of the miscut is reversed, then the direction of adatoms migration is also reversed) and form a closed fractional monolayer as shown in FIG. 25, the boundary of which is moving rightwards. The spacer nanowires is again identified by the numeral 7 and the adatoms forming it by 7'. If half of the nominal monolayer of spacer film is deposited on the substrate 2 then approximately half of each atomic terrace 4 will be covered by the closed fractional monolayer forming the spacer nanowires 7. This does not depend on the size of the terrace 4: in this case wide and narrow terraces 4 will equally contain approximately half a monolayer of the material for the spacer nanowire 7. The reason is: the larger the terrace 4, the greater is the number of adatoms 7' deposited on it. In other words, the number of adatoms 7' caught by the atomic terrace 4 from the flux in the evaporator used to provide them is proportional to the area of the terrace 4. A perspective view of the fractional closed layer is schematically shown in FIG. 26 with the spacer nanowires 7 shown by cross-hatching.

For certain combinations of the materials forming the substrate 2 and nanowires 7, the migration of adatoms 7' takes place not towards the inner edge of the terrace 4 but rather towards the outer edge as shown in FIG. 27. Whether the formation of the fractional layer takes place at the inner or outer edge depends on the boding characteristics of the atoms 7' when placed on the substrate 2, i.e. on the kind of materials forming the substrate 2 and the spacer nanowires 7. Then in terms of the FIG. 24 adatoms 7' move rightwards on average. Magnetoresistive medium similar to the one shown in FIG. 21 can also be constructed using spacer nanowires 7 formed at the outer edges of the terrace steps. We will mainly, for brevity, discuss and refer to the situation of spacer nanowires 7 attached at the inner edges of the terraces 4, i.e., against the steps 5. FIGS. 24, 25, 27 show the adatoms 7' of the material forming the spacer nanowires 7 as rectangles with the size greater than the height of the terrace step 5 of the substrate 2. This is to reflect the fact the materials forming the substrate 2 and the spacer nanowires 7 consist of different atoms having different atomic radii. This forms either a positive or a negative fractional atomic step. Example of positive fraction step is shown in FIG. 25. Observation of these steps has indeed been reported in the literature [S. Murphy, D. Mac Mathuna, G. Mariotto, I. V. Shvets, Morphology and strain-induced defect structure of ultrathin epitaxial Fe films on Mo(110), Physical Review B 66 195417 (2002)].

It should be pointed out that in this embodiment it is not necessary to anneal the film after the growth to form a densely packed fractional layer to provide the spacer nanowires 7 out of a disordered assembly of adatoms 7' and clusters. It may also be equally acceptable to deposit the material on a substrate at an elevated temperature. If the temperature is high enough, the adatoms 7' rapidly migrate towards one of the edges of the terrace 4 as they land on the substrate 2 from the flux. Thus the positions of the step edges continuously change as the growth progresses. This kind of growth is known as step flow growth.

It should also be noted that for many materials the growth in equilibrium does not form the step flow mode. Indeed, much depends on the surface energies of the film, substrate and the interface. Generally if the surface energy of the film is significantly lower than that of the substrate, the step flow growth may de difficult to achieve if the equilibrium growth occurs. This invention teaches the method of overcoming some of these problems as described below in reference to FIGS. 31-33.

In a typical embodiment, the vicinal substrate 2 preferably with well-defined atomic terraces is first obtained as described heretofore. Then a fraction of the nominal monolayer of the material, namely the fractional layer of spacer film, is deposited on the substrate to form the spacer nanowires 7 at the inner edges of the terrace steps. In a typical embodiment this could be e.g. 0.1 to 0.9 of monolayer although fractions outside these numbers are also possible. In some embodiments, the formation of the fractional layer to provide the spacer nanowires 7 may include reacting the fractional layer of atoms deposited on the surface by utilizing e.g. gas-surface or plasma-surface reactions. For example, the fractional layer could be of $Al_2O_3$. To form such a material, a thin fractional layer of Al is first deposited on the surface and then it is reacted using any suitable procedure.

Although there are numerous models describing conditions favouring various growth modes, their quantitative accuracy of predictions is often questionable. Therefore, the most reliable way of finding the correct growth conditions is empirical: the temperature of the substrate and the film deposition rate must be optimised experimentally to achieve the growth correlated with the terrace steps. The required temperature depends on the materials of the substrate and the film, crystallographic direction of the substrate and also to a certain extent on the width of the atomic terraces and also on the deposition rate of the material. Generally, the greater the deposition rate, the greater is the required substrate temperature. It should be pointed out that having too high a temperature of the substrate may be of a disadvantage as at some temperatures interalloying of the substrate material and material of the film may take place. A convenient way of optimising the growth conditions comprises of checking the structure of the films using a Scanning Tunnelling Microscope (STM) or an Atomic Force Microscope (AFM). The optimisation procedure consists of fixing the deposition rate constant, e.g. at the value of 0.03 nm to 1 nm per minute. This deposition rate should only be used as an example. This deposition rate is suitable for the deposition of iron and certain other transition metals. Deposition rates well outside this range may be appropriate for certain film substrate combinations and these should be selected empirically. To select the correct deposition conditions, it is convenient to fix the deposition rate and perform the depositions at a range of substrate temperatures starting from room temperature or even lower to a temperature that is below the substrate melting point. Film grown at each temperature is characterized by the STM or AFM.

It should be pointed out that the closed fractional layer forming the spacer nanowires 7 does not have to be closed in the full sense of the word, i.e. there can be gaps, holes and missing atoms in it. What is important is that the difference is formed between the substantially bare parts of the atomic terraces and those parts that are substantially covered by the fractional layer.

It should be pointed out that the closed fractional monolayer can also be deposited on to the substrate 2 by segregation of dopants or impurities from the bulk of the substrate 2. To achieve the segregation, the substrate may need to be kept at an elevated temperature in a vacuum chamber or in a controlled atmosphere for an extended period of time. As a result of anneal, the dopant or impurity atoms migrate to the surface of the substrate as this reduces the free energy of the system. Usually, the diffusion is caused by the strain created by dopant/impurity atoms in the substrate material but other mechanisms driving the impurity atoms from the bulk onto the surface are also possible. Once the dopant/impurity atoms arrive at the surface, one may force their reallocation on the surface e.g. by varying the anneal conditions. For example, the segregation of K and Ca impurities from the bulk of a single crystal of magnetite $Fe_3O_4$ has been described in the literature [G. Mariotto, S. Murphy, I. V. Shvets, Charge ordering on the surface of $Fe_3O_4$ (001) Physical Review B, 66 245426 (2002)]. We have found that a significant fraction of the nominal monolayer can segregate at the surface after 20-100 hours of anneal time in an ultrahigh vacuum.

Once the spacer nanowires 7 are formed at the edges of terrace steps, the layer of main film 11 is deposited on top. Electrodes are then deposited on top of the layer to apply the current/voltage to the medium and to measure resistivity of the magnetoresistive medium or voltage across it. The application of electrodes is not described in detail in this document, as this aspect of magnetoresistive medium is standard and well described in literature, neither are the electrodes or the rest of the magnetoresistive medium illustrated. The optional protective layer 15 can also be deposited and this, also, is not described in detail in the specification, as such layers are common for thin film devices used in many applications.

Referring again to FIG. 21, in another embodiment, the vicinal substrate 2 is formed of a nonmagnetic material. This could be e.g. single crystals of MgO, $MgAl_2O_4$ or $SrTiO_3$ with (100) or (110) surface terminations. Whether the spacer nanowires 7 are formed at the inner or outer edges of the terrace steps is not crucial in this embodiment. The material forming the spacer nanowires 7 is e.g. $Al_2O_3$, it is the material with the crystal structure of corundum. In this embodiment it is essential that the crystal structure of layer forming the spacer nanowires 7 is different from that of substrate 2. In this embodiment, the layer of film 11 forming the main nanowires 10(a) and 10(b) consists of $Fe_3O_4$. The lattice of $Fe_3O_4$ is matched very well to the lattice of MgO (the lattice constant of the latter is almost perfectly half of the magnetite lattice). Both lattices: the one of $Fe_3O_4$ and the one of MgO are cubic lattices. It also matches reasonably well to the lattices of $MgAl_2O_4$ and $SrTiO_3$. As a result, on the (100) surfaces of MgO, $MgAl_2O_4$ and $SrTiO_3$, magnetite film readily grows epitaxially and forms the same surface orientation: (100). On the other hand, $Al_2O_3$ and $Fe_3O_4$ have completely different crystal structures and even different symmetries. As a result, $Fe_3O_4$ does not generally grow epitaxially on the surface of $Al_2O_3$. Therefore, epitaxial nanowires of magnetite are formed over the substrate 2 and nonepitaxial ones over the spacer nanowires 7.

In yet another embodiment related to FIG. 21, the nanowires 10(a) and 10(b) have the same crystal structure. However, the crystallographic orientation of the nanowires 10(b) positioned above the substrate 2 differs from that of nanowires 10(a) positioned above the spacer nanowires 7. The difference in magnetic response between the nanowires 10(a) and 10(b) comes from the magnetocrystalline anisotropy and anisotropy of the coercivity field as external magnetic field is applied differently with respect to the crystallographic axes of the nanowires 10(a) and 10(b).

Again referring to FIG. 21, there is provided an alternative embodiment which utilizes the fact that the response of magnetite film to the magnetic field depends on the density of antiphase boundaries and other structural defects in the film e.g. antiphase boundaries, misfit dislocations, etc. The reason is that such structural defects lead to a pattern of exchange interactions of varying strength in the film. For example at the antiphase boundaries, the ferromagnetic exchange interaction decreases and the antiferromagnetic one increases. In this embodiment the spacer nanowires 7 could have essentially the same lattice constant and lattice symmetry as the substrate 2. In a typical embodiment, the spacer nanowires 7 could consist of MgO or $MgAl_2O_4$ and the substrate 2 could be $SrTiO_3$ or MgO with (100) or (110) orientation. The difference between the main nanowires 10(a) and 10(b) comes from the fact that the main nanowires 10(b) adjacent the substrate 2 have a different density of structural defects than main nanowires 10(a). This is because the density of defects in a thin film depends on the density of defects in the substrate, the crystal symmetry difference and the amount of mismatch. Therefore, if the density of defects, in the spacer nanowires 7 is different from the one in the substrate 2, this translates into a different density of defects in the main nanowires 10(a) and 10(b) grown adjacent to spacer nanowires 7 and the substrate 2 respectively. As a result, the response to the magnetic field of the main nanowires 10(a) and 10(b) will differ. It should be pointed that in this embodiment the material forming the spacer nanowires 7 could be even the same as the material of substrate 2. For example, spacer nanowires could be of MgO and be grown on the MgO(100) substrate. Still, one can find, growth conditions resulting in different density of defects in the spacer nanowires 7 and the single crystalline substrate, normally the defect density in the former is greater. One can therefore form main nanowires 10(a) having greater density of defects than the main nanowires 10(b). Usually this means that magnetization of main nanowires 10(a) will be affected by the external magnetic field to a lesser extent than one of the main nanowires 10(b). It is known that the magnetic properties of magnetite are affected by the density of antiphase boundaries.

Referring again to FIG. 21, in an alternative embodiment, instead of providing the protective layer, there can be substituted a layer of surfactant. Surfactant is a layer that facilitates the diffusion of adatoms on the surface. Therefore, the regular spacer nanowires 7 can be formed at a lower temperature on the substrate 2. To utilize the benefit of the surfactant, in a typical embodiment, the surfactant is deposited on a vicinal substrate first. Then the layer or film of material forming the spacer nanowires 7 is deposited to form the spacer nanowires. Typically the surfactant layer is highly mobile and it "floats" on top of materials, i.e. as the material forming the spacer nanowires 7 is deposited on the substrate 2, its atoms move underneath the surfactant layer to come in direct contact with the substrate. Similarly, as the film 11 is deposited on the substrate, its atoms move underneath the surfactant layer and form a layer adjacent to the spacer nanowires 7. That is why with reference to FIG. 21, the topmost layer, described as the protective layer 15, now represents the layer of surfactant although it has been deposited on the substrate 2 first. In many of the embodiments described in this specification, the use of the surfactant will assist in the formation of the spacer nanowires 7. Again, obviously if a surfactant is used, a protective layer could be added. Again, for brevity and simplicity, another figure is not provided. Any attempt to provide a multiplicity of figures, all superficially the same as FIG. 21, would cause endless confusion. Surfactants for many transition metal atoms are well known from the published literature. For example, CO molecule and atomic N and O as well as Au are surfactants for Fe. Pb is a known surfactant for Co.

Referring again to FIG. 21, it can be used to illustrate another embodiment. In this embodiment the difference between the main nanowires 10(a) and 10(b) is based on interdiffusion between the main nanowires 10(b) and the substrate 2 leading to difference between the atomic compositions of the nanowires 10(a) and 10(b). Such an interdiffusion between the main nanowires 10(a) and the substrate 2 is then suppressed by the spacer nanowires 7 which serve as a diffusion barrier.

In yet another alternative embodiment also with reference to FIG. 21, the difference between the main nanowires 10(a) and 10(b) is based on the atomic interdiffusion between the main nanowires 10(a) and the spacer nanowires 7 leading again to difference between the atomic compositions of the nanowires 10(a) and 10(b).

Referring to FIG. 28, there is illustrated another construction of magnetoresistive medium according to the invention, again identified by the reference numeral 1, in which the spacer film forms two types of spacer nanowires 71 and 72. The nanowires 71 grow at the inner edges of the terrace steps 4 of the substrate 2 and the nanowires 72 grow at the outer edges. Such a situation can be achieved by growing the two fractional layers of spacer film forming the spacer wires 71 and 72 of two different materials. In FIG. 28 the spacer nanowires 71 and 72 represent two different materials, as shown schematically by their different heights. In the embodiment shown in FIG. 28, each of the two kinds of spacer nanowires has the nominal coverage of some 0.4 to 0.45 of the monolayer and therefore roughly 10 to 20% of substrate 2 is not covered by the nanowires 71 or 72. Such a magnetoresistive medium can be formed using the approach described above with the difference being that the materials of the two fractional layers forming the nanowires 71 and 72 are deposited on the substrate 2 simultaneously. In this case the atoms of the layer forming the nanowires 71 migrate towards the inner edge, i.e. against the steps 5 and the atoms of the layer forming the nanowires 72 migrate towards the outer edge of the atomic terraces of the substrate 2, i.e. leftwards and rightwards respectively. In this embodiment the film 11 forms three main nanowires 10(a), 10(b) and 10(c) positioned above the substrate 2 and spacer nanowires 71 and 72 respectively. The main nanowires 10(a), 10(b) and 10(c) preferably consist of a ferro- or ferrimagnetic conducting material. If the substrate 2 is antiferromagnetic or ferromagnetic, the strengths of magnetic coupling between the main nanowires 10(a), 10(b), and 10(c) on the one hand and the substrate 2 on the other differ. This leads to the difference in magnetic response between the areas forming the nanowires 10(a), 10(b) and 10(c), i.e. their magnetisations are affected by the external magnetic field differently. The rest of the operation of the magnetoresistive medium is similar to the one of the embodiment shown in FIGS. 21-23 with the only difference that three, and not two groups of magnetic nanowires with different response to magnetic field are formed in the film 11. Similarly to the embodiments described above, the nanowires 71 and 72 do not have to be magnetic and the difference in the magnetic response between the nanowires 10(a), 10(b) and 10(c) can result from the difference in strain originating from different substrate-film mismatch, i.e. between the substrate 2 and the nanowires 10(a) on one hand, the nanowires 71 and 10(b) on the other, and finally the nanowires 72 and 10(c). Any other mechanism described with reference to the above embodiments can also be utilized in this case. FIG. 28 does not contain any overlayers, protective layers etc. but these can also be added like in FIGS. 21-23.

Referring to FIG. 29, a method of forming the magnetoresistive medium 1 is described with the same reference numerals used as before, where appropriate. The substrate 2 has a miscut angle $\alpha$. The fractional layer forming the spacer nanowires 7 is deposited by directing the flux on the substrate 2 at a shallow angle $\beta$ that is of the comparable magnitude to the angle $\alpha$. In FIG. 29 angle $\beta$ is somewhat greater then the angle $\alpha$, for example $\beta=2\alpha$. Other ratios between the angles $\alpha$ and $\beta$ are also possible. The substrate is kept at a temperature low enough to suppress the diffusion of adatoms of the fractional layer forming the spacer nanowires 7. In this case the adatoms 7' of layer forming the spacer nanowires 7 will preferentially nucleate in the vicinity of the outer edge (right edge) of each atomic terrace as the areas of the terraces in the vicinity of inner edges are shadowed from the flux by the atomic steps 5. If the temperature of the substrate is low, this layer is likely to grow as a non-epitaxial layer as shown schematically in FIG. 29 by irregular positions of the spheres representing the atoms of fractional layer of spacer film forming the spacer nanowires 7. However, epitaxial growth of the spacer nanowires 7 is not essential for the method. In this way each atomic terrace is subdivided into two regions: one on the left in the vicinity of the inner terrace edge called T and the other one on the right in the vicinity of the outer terrace edge called T', that are respectively not covered and covered by the fractional layer forming the spacer nanowires 7. The regions T and T' form, in effect, nanostripes that are aligned along the terrace edges. Then the film 11 can be deposited on top of the bare substrate nanostripes T and on top of the fractional layer forming the spacer nanowires 7 e.g. by deposition in the direction normal to the surface or at a non-shallow angle. Operation of this embodiment is based on the same principles as the ones related to FIG. 21.

It should be pointed out that in embodiment of FIG. 29 the layers forming the spacer nanowires 7 and main nanowires 10(a) and 10(b) could be composed of the same material as well as of different materials. If the materials forming the main nanowires 10(a) and 10(b) and spacer nanowires 7 are the same, the principle of the operation of the magnetoresistive medium could be then based on the fact that the nanowires 10(a) grow on top of a non-single crystalline template (if the layer forming the spacer nanowires 7 is not epitaxial) and the nanowires 10(b) grow on top of the single crystalline nanowire terraces 4 in the region T.

It should also be pointed out that an optional anneal of the magnetoresistive medium can be performed on the medium shown in FIG. 29. Anneal can be implemented after the deposition of the layer to form the spacer nanowires 7 and before the deposition of the film to form the main nanowires 10(a) and 10(b). In this case the purpose of the anneal could be to induce diffusion of the atoms of the layer to form the spacer nanowires 7 leading to its smoothening. Preferably the anneal time could be relatively short so that the adatoms of the layer to form the spacer nanowires 7 do not spread over the entire width of the atomic terraces but remain concentrated in the vicinity of the outer edges of atomic terraces forming nanowires. Furthermore, the annealing could also be implemented after the deposition of the main layer to form the main nanowires 10(a) and 10(b). In this case the purpose of anneal could still be smoothening of the fractional layer to form the spacer nanowires 7 but alternatively it could also be aimed at alloying and intermixing of the atoms of the main nanowires 10(a) and 10(b) with atoms of the spacer nanowires 7. In this latter case the difference between the main nanowires 10(a) and 10(b) could be based on the fact that they have different atomic compositions: the nanowires 10(b), unlike nanowires 10(a) contain atoms of the spacer nanowires 7. Alternatively, the fractional layer of spacer film to form the spacer nanowires 7 could be such that it is immiscible with the material of the main layer used to form the main nanowires 10(a) and 10(b). In this case the anneal of the magnetoresistive medium could still lead to the difference between nanowires 10(a) and 10(b) due to difference in their atomic compositions but in the composition difference could now be due to alloying of the nanowires 10(a) with the atoms of the substrate 2. The anneal temperature and the anneal time could be optimised experimentally. The difference between the main nanowires 10(a) and 10(b) due to difference in their chemical compositions as described in this paragraph could also be achieved with the embodiments related to FIGS. 21-23, 28.

It should be pointed out that the depth of the terrace step between the neighbouring atomic terraces can be greater than one atomic step. This is known as a double step or multiple step. Such multiple steps are favoured on some substrates due to the interaction between the steps. This phenomenon is sometimes called step bunching. As a result, it should be pointed that in the embodiments above, and in particular the embodiments of FIG. 29, the thickness for the layer forming the spacer nanowires 7 could be greater than one atomic layer.

FIG. 30 shows another embodiment in which a fractional layer to form spacer nanowires is deposited at the inner edge of terrace steps 4. In this case the flux of atoms of this fractional layer is directed at the substrate in the direction nearly parallel to the atomic terraces, at a shallow angle. It is essential in this embodiment that flux is directed towards the direction of ascending terraces. The direction of the flux is shown in FIG. 30 schematically by the arrow F and in the context of the miscut direction presented in FIG. 30, the beam is directed leftwards. The meaning of the words flux directed nearly parallel to atomic terraces implies that the flux is well collimated and the angle of the flux with respect to the atomic terraces is at least not significantly greater than the miscut angle $\alpha$. It could be smaller than $\alpha$ but it could also be a relatively small multiple (a factor of 3 to 10) of $\alpha$ in particular when the miscut angle $\alpha$ is small (e.g. $\alpha$ is up to 10 degrees).

Thus, to grow the fractional layer according to the embodiments referred to in FIGS. 29 and 30, the flux of the material to form the fractional layer should arrive at the substrate 2 at a shallow angle, nearly parallel to the surface of the substrate. For example, if the substrate miscut angle is 2 degrees, then the angle $\beta$ could be in the range of some 2 to 10 degrees but these values of the angle $\beta$ are given here merely as examples. In practice the value of the angle $\beta$ should be optimised experimentally. To direct the flux at such a shallow angle on the substrate, it may be convenient to use a source located at a significant distance away from the substrate, e.g. at the distance of some 0.5 to 5 meters. These distance values are given here again as examples and values outside this range are possible.

Referring to FIG. 31, there is shown schematically a device, indicated generally by the reference numeral 15, for forming a magnetoresistive medium according to the invention. The device 15 is connected to a vacuum pump (not shown) through an outlet 20 and forms two growth chambers 16 and 17. The growth chamber 16 mounts an effusion cell 21 containing evaporant material 22, the evaporant material 22 being used to provide the spacer nanowires 7. A substrate mounting device 23 is provided in the growth chamber 16. The substrate mounting device 23 is oriented so that the substrate 2 is positioned in such a way that the low index plane atomic terraces are parallel or almost parallel to the axis of the growth chamber 16, identified by the reference numeral 26 and shown by interrupted lines. The substrate 2 is displaced from the axis 26 of the effusion cell 21 by a distance d and by a linear separation D.

A deposition source 25 is located in the second growth chamber 17 having an axis, identified by the reference numeral 26' and shown by interrupted lines. The deposition source 25 could be any source suitable for the deposition of the main film 11, e.g. magnetron, Knusden cell, electron beam evaporator, etc. The flux of the material to form the film 11 can arrive to the substrate 2 which is mounted on the mounting device 23 along a direction nearly normal to the surface of the substrate 2.

In one embodiment, the rear of the substrate 2 is provided without any miscut and the rear of the substrate is aligned parallel to the axis 26 of the growth chamber 15. In this case, the two surfaces of the substrate, namely, the front and rear are not parallel to each other. The front of the substrate is miscut with respect to a low index plane and the rear is cut along the low index plane. The distance d, as can be seen in FIG. 31, is much smaller than the separation D between the effusion cell 21 containing the evaporant 22 and the substrate 2 mounted in the mounting device 23. The effusion cell 21 can be a Knudsen cell, thermal cell, electron gun heated cell, magnetron or other cell suitable for vacuum deposition of the material to form the spacer nanowires 7.

If the distance d is much smaller than the distance D, then the angle $\beta$ in units of radian is equal to d/D. Thus, by controlling the off-axis displacement d of the substrate, one can set the desired value of the angle $\beta$. If the two surfaces of the substrate, the front and the rear, are parallel to each other, i.e. both surface are miscut from a low-index plane in the same way, and if the rear surface of the substrate is still aligned parallel to the axis of the growth chamber 26, then a simple correction is required to the above formula $\beta$=d/D. We will not deal with the details of this correction as it's a matter of basic geometry.

Further, there are provided deposition monitors 27 and 28, measuring and controlling the flux from the effusion cell 21 and deposition source 25. The deposition monitor 27 is aligned to detect the flux of the evaporant material 22 along the axis of the growth chamber 26. The deposition monitor 28 is aligned to detect the flux of the material used to form the main film 11 along the axis 26'(a) of the growth chamber 26(a). It should be noted that as the deposition monitor 27 is not parallel to the surface of the substrate 2 but nearly perpendicular to the substrate surface, the nominal coverage of the material to form the spacer nanowires 7 is not equal to the nominal coverage detected by the deposition monitor 27. Thus, it needs to be multiplied by sin $\beta$. Again, this does not require any further description to those skilled in the art. The chamber 26 is also equipped with pumps, controllers and various other monitors that are not shown in detail. The magnetoresistive medium 1 is grown by first depositing the required amount of the material to provide the spacer nanowires by using the effusion cell 21 and the deposition monitor 27. Then the film 11 is deposited by using the deposition source 25 and the deposition monitor 28.

Alternatively, to form a magnetoresistive medium according to the invention one could utilise an instrument substantially similar to the one shown in FIG. 31 that is different in one significant aspect: instead of the effusion cell 21 it comprises a well-collimated ion gun which is the source of energetic ions, e.g. source of Ar, Ga or O ions. The ions from the ion gun are directed to the surface of the substrate 2 at a shallow angle forming ion beam. To control the angle of the ion beam the sample position could be selected as described above in relation to FIG. 31. In addition to that one could use a further method of control utilising the fact that ions are charged particles and their movement direction can be altered by means of an external electrostatic field. Thus, to control the direction of the ion beam, an electrostatic field substantially perpendicular to the axis of the chamber 26 is formed. This can be done by using techniques well known to those skilled in the art of ion sources. Using this instrument one could form magnetoresistive medium as follows. First, the surface is ion etched at a shallow angle. As a result atomic terraces 4 are divided into subterraces T and T' similar to the subterraces T and T' in FIG. 29. One of the two types of subterraces has been subjected to the ion beam and the other one has not as it has been shadowed from the ion flux by the atomic steps 5. Therefore, the subterraces T and T' form nanostripes substantially aligned along the step edges of the atomic terraces 4. Then the material of the main film 11 is deposited using the deposition source 25. The rest of the fabrication of the magnetoresistive medium 1 using the shallow angle ion etching is similar to the one described above in relation to FIGS. 29 and 30: The main nanowires 10(a) and 10(b) formed above the parts of the atomic terraces that have and have not been subjected to the ion etching will then have different response to the external magnetic field. For example, they can have different densities of defects, different amounts of impurities, different degree of strain, etc. It should also be appreciated that further layers could be added to the magnetoresistive media formed according to the methods described in relation to FIG. 31. For example, prior to the ion etching at a shallow angle one could deposit on the substrate 2 a thin film of material 107. Then the substrate 2 is subjected to ion etching at a shallow angle as described above. In this way the material 107 is removed from some fractions of the atomic terraces and still remains in other fractions of the atomic terraces thus forming spacer layer 7. Additional anneal can be added in between the deposition, e.g. to reduce the damage caused by the ion etching, i.e. to smoothen the etched areas on the nanometer and atomic scale.

It should be noted that the method of deposition of films by directing the flux of atoms at shallow angles to substrates for depositing thin films is known to those skilled in the art. (J. Jorritsma, M. A. M. Gijs, J. M. Kerkhof, G. H. Stiened, General Techniques for fabricating large array of nanowires, Nanotechnology 7, 263 (1996); Akira Sugawara, T. Coyle, G. G. Hembree, M. R. Scheinfein, Appl. Phys. Lett. 70, 1043 (1997)) The previous work attempted to create the nanowire array on V-grove patterned substrates with 200 nm periodicity and are thus unrelated to the constructions described here. However, the present invention describing utilizing a large distance between the substrate and source of atoms and performing the deposition at very small flux (0.03-1 nm/minute) on a vicinal substrate provides a unique method to form the fractional nanowires/spacer nanowires.

It should be noted that this method of forming nanowires on vicinal substrates can also be utilized for fabricating materials that are completely unrelated to the issue of magnetoresistance. Materials with beneficial optical, optoelectronic and electronic properties can be fabricated using this method. For example, a material can be fabricated with the optical or optoelectronic response that is sensitive to the polarization direction: by changing the direction of polarization from parallel to the nanowires to one perpendicular to the nanowires, the response is altered.

It is envisaged that one can also construct embodiments of the magnetoresistive medium with the partially closed layer positioned on top of the layer forming the main nanowires. This is schematically shown in FIG. 32. In one such typical embodiment the vicinal substrate 2 is nonmagnetic. The ferromagnetic or ferrimagnetic layer or film 11 is deposited on top of the vicinally treated substrate 2. This layer is formed in such a way that the top surface of the layer 11 also forms steps and terraces and thus in effect a vicinal substrate. A partially closed or fractional layer of spacer film 37 is then deposited on top of the layer 11 forming spacer nanowires 7. In the embodiment of FIG. 32 spacer nanowires 7 of the fractional layer 37 are shown positioned at the inner edges of the terrace steps. The spacer film 37 forming the spacer nanowires 7 is nonmagnetic in this embodiment. Then a further antiferromagnetic layer 17 is deposited on top of the fractional layer 37, i.e. the spacer nanowires 7 and uncovered areas of the film 11. In this way the nanowires 10(b) are exchange coupled to the antiferromagnetic layer 17 unlike the nanowires 10(a) that are separated from the layer 17 by a spacer with the thickness of spacer nanowire 7. Therefore, magnetization of the nanowires 10(b) is pinned unlike magnetization of the nanowires 10(a). The rest of the operation of the embodiment is the same as the one described in relation to FIG. 21 and utilizing exchange pinning. Most other embodiments described in relation to FIGS. 21, 23, 28 can also be constructed with the partially closed layer of spacer film 37 deposited on top of the main film 11 thus forming spacer nanowires 7. For example, one could anneal the medium 1 after the deposition in order to achieve interdiffusion between the main nanowires 10(a) and the spacer nanowires 7 thus forming alloy. As a result, the structural and magnetic properties of the nanowires 10(a) differ from the ones of the nanowires 10(b). In this latter embodiment, the layer 37 does not need to be magnetic as well as the layer 17 which serves as a protection layer. Alternatively, the diffusion could be established in such a way that atoms of the main nanowires 10(a) migrate into the spacer nanowires 7 leading to the difference in the atomic compositions between the main nanowires 10(a) and 10(b). Alternatively, the spacer nanowires 7 could suppress the diffusion between the main nanowires 10(a) and the layer 17. In this particular embodiment it may be inappropriate to call the layer 17 as the protective layer. It will be appreciated that such interdiffusion between the layer 17 and the nanowires 10(b) will lead to the difference between the compositions of the nanowires 10(a) and 10(b). Like in some embodiments described above in relation to FIG. 21, the spacer nanowires 7 could be antiferromagnetic thus pinning magnetization of the main nanowires 10(a). Alternatively they could as well be ferromagnetic of soft magnetic material and couple to the main nanowires 10(a) so that the effective magnetic moment of the nanowires 10(a) is enhanced and their response to magnetic field is enhanced with it. Alternatively, they could be ferromagnetic of hard magnetic material (i.e. having high coercivity), thus pinning the magnetization of nanowires 10(a). Like in embodiments related to FIGS. 21, 23, 28, the secondary layers required for protection of the medium, field biasing, seed layers, surfactant layers and buffer layers are not shown as addition of these is necessitated by the specific choice of materials and is clear to those skilled in the art.

Referring to FIG. 33, there is illustrated in cross section a composite magnetoresistive medium, indicated generally by the reference numeral 100, comprising a medium 1(a) having a miscut angle $\alpha_1$, and having deposited thereon a further medium 1(b), in turn, having a miscut angle $\alpha_2$. The medium 1(a) comprises a substrate 2(a) having a vicinal surface on which a film 11(a) has been deposited. The magnetoresistive medium 1(a) is similar to any of the magnetoresistive media previously described. On top of the magnetoresistive medium 1(a) is deposited a further magnetoresistive medium 1(b). The substrate 2(a) comprises what is effectively a rectangular portion 201(a) on top of which is formed the portion of the substrate 2(a) that provides the vicinally treated surface. This portion is identified by the reference numeral 202(a). The substrate 2(b) of the magnetoresistive medium 1(b) comprises two wedge-shaped portions 201(b) and 202(b), the latter again forming a vicinal surface for a film 11(b).

The substrate 2(a) can be formed as previously described or may be formed by growing the wedge 202(a) on the flat essentially rectangular portion 201(a) by carrying out growth of a film with a shadow mask in a normal incident condition and withdrawing the mask gradually over the substrate. Alternatively, this may be provided by moving the substrate away from the mask to create the wedge shaped film $202(a)$ forming part of the substrate $2(a)$. Then the remainder, for example, with the deposition of the film $11(a)$, can be carried out, as previously described. Then the first part $201(b)$ of the substrate $2(b)$ of the next magnetoresistive medium $1(b)$ may be formed in the same way and then subsequently the remainder of the substrate $2(b)$, namely the portion $202(b)$ may again be formed and finally the next film $11(b)$ may be deposited. Obviously, the two vicinal surfaces so formed, that is to say, on the substrate $2(a)$ and the substrate $2(b)$, may have different miscut angles $\alpha_1$ and $\alpha_2$, as shown.

The speed of mask withdrawal and growth rate provide an efficient method of controlling the variation in thickness of the film or the vicinal angle. The method is standard and well known in the art [V. I. Nikitenko, V. S. Gornakov, A. J. Shapiro, R. D. Shull, K. Liu, S. M. Zhou and C. L. Chien, Asymmetry in Elementry Events of Magnetisation Reversal in Ferromagnetic/Antiferromagnetic Bilayer, Phys. Rev. Lett. 84(4) 765 (2000)].

It will be appreciated that that portion $201(b)$ of the second substrate $2(b)$ provides a protection for the first magnetoresistive medium $1(a)$. As illustrated in FIG. 33, the miscut angles $\alpha_1$ and $\alpha_2$, whether different or the same, are oriented in the same way.

Referring to FIG. 34, there is illustrated an alternative construction of composite magnetoresistive medium, again identified by the same reference numerals as those used in FIG. 33. However, in this case, the media $1(a)$ and $1(b)$ are orthogonal to each other in the sense that the miscut angles are offset with respect to each other, in this embodiment, by approximately 90°.

It will be appreciated that various forms of composite magnetoresistive medium may be used. A large number of magnetoresistive media according to the present invention may be stacked one on top of the other. It will also be appreciated that the other combination of miscut angle ratios and miscut directions may also be possible.

Such composite magnetoresistive media, formed by the stacking of magnetoresistive media, one on top of each other, may be advantageous for using the magnetoresistive media in memory devices where increasingly the density of the memory cells is a prime requirement.

It will be appreciated that for certain applications, it may be advantageous to have the two miscut directions of substrates, which are adjacent to each other, offset through 90°. As the directions of the main nanowires in the magnetoresistive media $1(a)$ and $1(b)$ are not collinear, the cross-talk between them (influence of the sensing current in one media on the other one) is reduced. Also, any desired pattern of sensitivity to the magnetic field can be developed as each of the media $1(a)$ and $1(b)$ is anisotropically sensitive to the magnetic field.

In accordance with the present invention, while it has been described that the substrate can be cut along the required miscut direction, one could equally well deposit a wedge-shaped film, as described with reference to FIG. 33, on a flat non-miscut substrate, as described. In the same way, one can alter the miscut angle of the miscut direction.

It is envisaged, for example, that when a substrate is manufactured in accordance with FIG. 33, namely, when one portion of the substrate 201 is rectangular, as it were or block shaped or parallelpiped, the materials for the two portions forming the substrate may be the same or different. Further, it is not necessarily essential that, for example, the magnetoresistive medium $1(b)$ should cover the whole of the magnetoresistive medium $1(a)$ and vice versa.

Clearly, stacks of more than two magnetoresistive media can be formed in the same way. Another situation which can be considered here is the formation of a multilayered superlattice structure based on magnetoresistive medium. This can be realized by producing in sequence a number of e.g. 10-100 repeat units of the magnetoresistive medium 1, as shown in FIG. 33, for the case of two repeat units.

It will be appreciated that the magnetoresistive medium according to the present invention can be used for many devices which require the use of such magnetoresistive material. The invention is not limited to the use of this material in any particular device.

In the specification the terms "comprise, comprises, comprised and comprising" or any variation thereof and the terms "include, includes, included and including" or any variation thereof are considered to be totally interchangeable and they should all be afforded the widest possible interpretation and vice versa.

The invention is not limited to the embodiment hereinbefore described, but may be varied in both construction and detail within the scope of the appended claims.

The invention claimed is:

1. A magnetoresistive medium comprising:
   a crystalline substrate;
   stepped terrace of atomic and nanometer scale on the substrate formed by vicinally treating the substrate;
   a thin main film above the substrate:
   at least one set of spaced-apart discrete separated spacer nanowires, each set being formed by a fractional layer of spacer film, in contact with the main film; and
   at least two sets of main nanowires, each set having a different response to an external magnetic field, formed in the main film by the interaction of the main film, spacer nanowires and substrate and forming an array of discrete stripes with different magnetic properties, said stripes broadly correlated with the average direction of the edges of the atomic terraces.

2. A magnetoresistive medium as recited in claim 1, in which the substrate is a composite substrate comprising one of a vicinally treated antiferromagnetic and a vicinally treated ferromagnetic upper substrate and a non-magnetic lower substrate.

3. A magnetoresistive medium as recited in claim 1, in which the substrate is a composite substrate comprising a vicinally treated non-magnetic upper substrate and one of an antiferromagnetic lower substrate and a ferromagnetic lower substrate.

4. A magnetoresistive medium as recited in claim 1, in which the atomic composition of the main and the spacer films are different to provide different concentrations of atoms inter-diffusing between the main nanowires and the rest of the medium.

5. A magnetoresistive medium as recited in claim 1, in which the substrate, the main film and the spacer nanowires are one of:
   ferromagnetic,
   antiferromagnetic, and
   non-magnetic
   materials, with all three not being of the same material, or if the same, at least one has a different ferromagnetic or antiferromagnetic property.

6. A magnetoresistive medium as recited in claim 1, in which one of the sets of main nanowires is epitaxially grown and the other is not.

7. A magnetoresistive medium as recited in claim 1, in which the sets of main nanowires are epitaxially grown with different crystallographic orientations.

8. A magnetoresistive medium as recited in claim 1, in which the sets of main nanowires are epitaxially grown with different amounts of lattice strain.

9. A magnetoresistive medium as recited in claim 1, in which the spacer nanowires are one of:
a ferromagnetic material of relatively high coercivity;
a ferromagnetic material of relatively low coercivity; and
an antiferromagnetic material.

10. A magnetoresistive medium comprising a stack of a plurality of the media as recited in claim 1, one medium on top of another medium.

11. A magnetoresistive medium as recited in claim 1, in which the spacer nanowires are interposed between the main film and the substrate.

12. A magnetoresistive medium as recited in claim 11, in which the substrate is a composite substrate comprising one of a vicinally treated antiferromagnetic and a vicinally treated ferromagnetic upper substrate and a non-magnetic lower substrate.

13. A magnetoresistive medium as recited in claim 11, in which the substrate is a composite substrate comprising a vicinally treated non-magnetic upper substrate and one of an antiferromagnetic lower substrate and a ferromagnetic lower substrate.

14. A magnetoresistive medium as recited in claim 11, in which the atomic composition of the main and the spacer films are different to provide different concentrations of atoms inter-diffusing between the main nanowires and the rest of the medium.

15. A magnetoresistive medium as recited in claim 11, in which the substrate, the main film and the spacer nanowires are one of:
ferromagnetic,
antiferromagnetic, and
non-magnetic
materials, with all three not being of the same material, or if the same, at least one has a different ferromagnetic or antiferromagnetic property.

16. A magnetoresistive medium as recited in claim 11, in which one of the sets of main nanowires is epitaxially grown and the other is not.

17. A magnetoresistive medium as recited in claim 11, in which the sets of main nanowires are epitaxially grown with different crystallographic orientations.

18. A magnetoresistive medium as recited in claim 1, in which there are at least two sets of spacer nanowires covering substantially all of the stepped terraces of either one of the following: the substrate or the main film.

19. A magnetoresistive medium as recited in claim 1, in which the spacer nanowires are positioned at either one of the two locations: directly on top of the main film or interposed between the main film and the substrate.

20. A magnetoresistive medium comprising:
a crystalline substrate;
stepped terraces of atomic and nanometer scale on the substrate formed by vicinally treating the substrate;
a set of discrete, separated spacer nanowires on the terraces, provided by an intermediate fractional layer of spacer film on the substrate;
a thin main film covering the spacer nanowires and the exposed surfaces of the terraces;
two sets of main nanowires, each having a different response to an external magnetic field, formed in the main film by the interaction of the main film, spacer nanowires and substrate and forming an array of discrete stripes with different magnetic properties, said stripes broadly correlated with the average direction of the edges of the atomic terraces.

21. A magnetoresistive medium comprising:
a crystalline substrate;
stepped terraces of atomic and nanometer scale on the substrate formed by vicinally treating the substrate;
at least two sets of discrete and separated spacer nanowires on the terraces, each set being provided by an intermediate fractional layer of spacer film on the substrate, the fractional layers covering substantially all the substrate;
a thin main film covering the spacer nanowires;
two sets of main nanowires, each having a different response to an external magnetic field formed in main film by the interaction of the main film with spacer nanowires and forming an array of discrete stripes with different magnetic properties, said stripes broadly correlated with the average direction of the edges of the atomic terraces.

22. A magnetoresistive medium comprising:
a crystalline substrate;
stepped terraces of atomic and nanometer scale on the substrate formed by vicinally treating the substrate;
a main film covering the substrate;
a set of discrete and separated spacer nanowires on the main film provided by a fractional layer of spacer film;
two sets of main nanowires, each set having a different response to an external magnetic field formed in main film by the interaction of the main film with the spacer nanowires and forming an array of discrete stripes with different magnetic properties, said stripes broadly correlated with the average direction of the edges of the atomic terraces.

* * * * *